(12) United States Patent
Li et al.

(10) Patent No.: US 10,723,936 B2
(45) Date of Patent: Jul. 28, 2020

(54) SURFACTANT COMPOSITION, AND MANUFACTURING METHOD AND APPLICATION OF SAME

(71) Applicants: China Petroleum & Chemical Corporation, Beijing (CN); Shanghai Research Institute of Petrochemical Technology, Sinopec, Shanghai (CN)

(72) Inventors: Yingcheng Li, Shanghai (CN); Songyuan Gu, Shanghai (CN); Weidong Zhang, Shanghai (CN); Xining Bao, Shanghai (CN); Zhiqin Shen, Shanghai (CN); Hengzhi Tang, Shanghai (CN); Xiaodong Zhai, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(*) Notice: Subject to any disclaimer, the term of this patent is extended or adjusted under 35 U.S.C. 154(b) by 4 days.

(21) Appl. No.: 14/899,541

(22) PCT Filed: Jun. 17, 2014

(86) PCT No.: PCT/CN2014/000595
§ 371 (c)(1),
(2) Date: Dec. 17, 2015

(87) PCT Pub. No.: WO2014/201854
PCT Pub. Date: Dec. 24, 2014

(65) Prior Publication Data
US 2016/0122621 A1    May 5, 2016

(30) Foreign Application Priority Data

Jun. 17, 2013  (CN) .......................... 2013 1 0237544
Jun. 17, 2013  (CN) .......................... 2013 1 0237545

(51) Int. Cl.
*C09K 8/584*    (2006.01)

(52) U.S. Cl.
CPC .................... *C09K 8/584* (2013.01)

(58) Field of Classification Search
CPC .................... C09K 8/584; C09K 8/56

USPC .................................................. 507/240, 935
See application file for complete search history.

(56) References Cited

U.S. PATENT DOCUMENTS

| 4,370,243 | A | * | 1/1983 | Chen ....................... C09K 8/584 166/270.1 |
| 4,786,494 | A | * | 11/1988 | Hirota ....................... A61K 8/60 424/59 |
| 4,997,912 | A | * | 3/1991 | Wirtz .................... C07C 217/08 530/232 |
| 2012/0101010 | A1 | * | 4/2012 | Weerasooriya .......... C11D 1/06 507/259 |

FOREIGN PATENT DOCUMENTS

| CN | 102161883 A | 8/2011 |
| CN | 102485771 A | 6/2012 |
| CN | 102516971 A | 6/2012 |
| CN | 103740354 A | 4/2014 |
| WO | 2011130310 A1 | 10/2011 |

OTHER PUBLICATIONS

International Preliminary Report on Patentability for PCT/CN2014/000595 dated Dec. 18, 2015.
International Search Report for PCT/CN2014/000595 dated Dec. 24, 2014.
Gong, Y. et al., "The Solubilization of the Catanionic Surfacants Mixture," Journal of Northwest University (Natural Science Edition), vol. 30, No. 1, Feb. 2000.
Unknown, "Synergistic Effect of Oil-Displacing Surfactant With Non-Ionic Surfactant and Cationic Surfacant," Journal of Oil and Gas Technology, vol. 29, No. 4, Aug. 2007.
Search Report from Russian Patent Application No. 2016101043/03(001320) dated Jul. 24, 2017 (with translation).

* cited by examiner

*Primary Examiner* — Aiqun Li
(74) *Attorney, Agent, or Firm* — Novick, Kim & Lee, PLLC; Allen Xue

(57) ABSTRACT

This invention relates to a surfactant composition, production and use thereof in tertiary oil recovery. The present surfactant composition comprises a cationic surfactant and an anionic-nonionic surfactant, and exhibits significantly improved interfacial activity and stability as compared with the prior art. With the present surfactant composition, a flooding fluid composition for tertiary oil recovery with improved oil displacement efficiency and oil washing capability as compared with the prior art could be produced.

6 Claims, No Drawings

SURFACTANT COMPOSITION, AND MANUFACTURING METHOD AND APPLICATION OF SAME

TECHNICAL FIELD

This invention relates to a surfactant composition. Specifically, this invention relates to a surfactant composition for tertiary oil recovery, production and use thereof in tertiary oil recovery.

BACKGROUND ART

With the increase in world energy demand, rational development and utilization of crude oil has caused more and more attention, the demand on crude oil output and recovery efficiency is also getting higher and higher. The conventional (primary or secondary) crude oil recovery process generally extracts only ⅓ of the geological crude oil reserves, with about ⅔ thereof failing to be extracted. Therefore, with the increasing tense in energy consumption, enhancing oil recovery has become an important topic in the research of crude oil recovery.

The tertiary oil recovery technology is an effective process for enhancing oil recovery. Specifically, among tertiary oil recovery technologies, the chemical enhanced oil recovery (CEOR) technology represents a very important and large-scale implemented technology, including the polymer flooding technology, the surfactant flooding technology, the alkali water flooding technology and a combination thereof. The CEOR technology makes use of the combination of a physical and chemical effects, wherein the chemical action mainly resides in reducing the interfacial tension between a flooding fluid and crude oil. A surfactant contains both lipophilic (hydrophobic) and hydrophilic (lipophobic) segments, when dissolved into water, mainly adsorbed at the oil-water interface, whereby significantly reducing the oil-water interfacial tension (IFT). The reduction in the oil-water interfacial tension indicates that the surfactant is capable of defeating the cohesive force inside crude oil, dividing larger oil droplets into smaller ones, whereby increasing the passing rate of crude oil through a pore throat. The flooding function observed with a surfactant is further indicated by the effects like alteration in the surface wettability of oleophylic rock, emulsification of crude oil, increment of the surface charge density and oil droplet coalescence, all of which explain why the surfactant has been identified as a critical component in a flooding fluid.

However, the prior art flooding fluid for tertiary oil recovery suffers from such problems as poor interfacial activity of the surfactant component, leading to a relatively lower oil displacement efficiency for the flooding fluid produced therefrom, an over-complicated composition with the flooding fluid, which makes difficult the demulsification of the recovered liquid and the treatment of produced water; necessarily containing an inorganic alkali, which is harmful to the reservoir and oil wells, leading to corrosion of equipments and pipings. Further, an inorganic alkali will significantly decrease the viscosity of a polymer component, then a relatively higher amount of polymer has to be used to achieve a predetermined level of viscosity, which increases the overall cost of oil recovery. The prior art surfactant component is insufficient in the tolerance to elevated temperatures, and the tolerance to high salinity and high total dissolved salt (TDS), and tends to generate precipitation during compounding due to its poor stability.

Therefore, there is still a need for a surfactant composition, which is deprived of the problems in association with the prior art, and shows improved interfacial activity and stability as compared with the prior art.

INVENTION SUMMARY

The present inventors, on the basis of the prior art, found a novel surfactant composition, and further found that, when a flooding fluid composition for tertiary oil recovery (i.e. a flooding fluid) is produced with this surfactant composition, the aforesaid problems in association with the prior art can be solved, and then this invention is achieved.

Specifically, this invention relates to the following aspects.

1. A surfactant composition, which is characterized by comprising a cationic surfactant and an anionic-nonionic surfactant, wherein the ratio by molar of the cationic surfactant and the anionic-nonionic surfactant is 1:0.01-100 (preferably 1:0.1-10), the cationic surfactant is one or more selected from the group consisting of quaternary ammonium salts and quaternary ammonium hydroxides, the anionic-nonionic surfactant is one or more compound represented by the following formula (I),

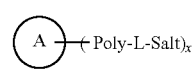
(I)

in the formula (I), the group

represents an optionally substituted x valent $C_{1-50}$ (preferably $C_{5-20}$ or $C_{8-50}$ or $C_{8-20}$) linear or branched alkyl, an optionally substituted x valent $C_{5-50}$ (preferably $C_{5-10}$ or $C_{5-8}$) monocyclic or polycyclic cycloalkyl (preferably $C_{5-7}$ monocyclic cycloalkyl, for example, cyclohexyl), an optionally substituted x valent $C_{2-50}$ (preferably $C_{5-20}$ or $C_{8-50}$ or $C_{8-20}$) linear or branched alkenyl, an optionally substituted x valent $C_{6-50}$ (preferably $C_{6-20}$) aryl or an optionally substituted x valent $C_{3-50}$ (preferably $C_{8-50}$ or $C_{8-20}$) linear or branched heteroalkyl; plural group Poly may be identical to or different from one another, each independently represents a group represented by the formula $-(O-Ru-)_yO-$; plural group L may be identical to or different from one another, each independently selected from the group consisting of an optionally substituted $C_{1-10}$ linear or branched alkylene and an optionally substituted $C_{2-10}$ linear or branched alkenylene (preferably each independently represents an optionally substituted $C_{1-5}$ linear or branched alkylene); plural group Salt may be identical to or different from one another, each independently represents a group represented by the formula $-A^-(M)_r^+$, wherein the group $A^-$ represents a carboxylate ion ($COO^-$) or a sulfonate ion ($SO_3^-$), with the proviso that at least one out of the group $A^-$ represents the carboxylate ion ($COO^-$); the numerical value x represents an integer of from 1 to 10 (preferably an integer from 1 to 4, for example, 2, 3 or 4); among plural group Poly, plural numerical value y may be identical to or different from one another, each independently represents a value of from 0 to 200 (preferably a value of from 0 to 100), with the proviso that the sum of all (i.e. x in total) numerical values y is greater than 0 and not greater than 200 (preferably greater than 0 but not greater than 100); among plural group Poly, plural group Ru may be identical to or different from one another, each independently represents a $C_{2-6}$ linear or branched alkylene (preferably each independently represents —$CH_2$—$CH_2$— or —$CH_2$—$CH(CH_3)$—), with the proviso that in at least one out of the group Poly, at least a part of the group Ru represents a $C_{3-6}$ linear or branched alkylene (preferably —$CH_2$—$CH(CH_3)$—); the group M represents alkali metal (preferably Li, Na or K), alkaline earth metal (preferably Mg or Ca) or ammonium ($NH_4$); when the group M represents alkali metal or ammonium, r=1; when the group M represents alkaline earth metal, r=0.5, wherein, the linear or branched heteroalkyl represents a group obtained by directly replacing one or more group —$CH_2$— locating inside the molecular structure of a linear or branched alkyl by a corresponding number of replacing group selected from —O—, —S— or —NR'— (wherein the group R' represents an optionally substituted $C_{1-20}$ (preferably $C_{1-10}$) linear or branched alkyl, an optionally substituted $C_{5-10}$ (preferably $C_{5-8}$ or $C_{5-7}$) monocyclic or polycyclic cycloalkyl, an optionally substituted $C_{2-20}$ (preferably $C_{2-10}$) linear or branched alkenyl or an optionally substituted $C_{6-20}$ (preferably $C_{6-10}$) aryl), or a group obtained by directly replacing one or more group

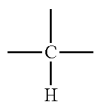

locating inside the molecular structure of a linear or branched alkyl by a corresponding number of replacing group

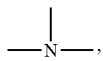

by "optionally substituted", it refers to optionally substituted by one or more substituent selected from the group consisting of oxo, hydroxyl, a $C_{1-20}$ (preferably $C_{5-15}$ or $C_{5-10}$) linear or branched alkyl, a $C_{5-10}$ (preferably $C_{5-8}$ or $C_{5-7}$) monocyclic or polycyclic cycloalkyl (for example, cyclohexyl), a $C_{2-20}$ (preferably $C_{2-10}$) linear or branched alkenyl and a $C_{6-20}$ (preferably $C_{6-10}$) aryl.

2. The surfactant composition according to any preceding aspect, wherein the cationic surfactant is one or more compound represented by the following formula (II),

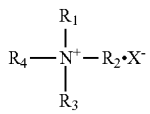

in the formula (II), the group $N^+$ represents a quaternary nitrogen cation, the groups $R_1$ to $R_4$ may be identical to or different from one another, each independently selected from the group consisting of an optionally substituted $C_{1-50}$ (preferably $C_{1-20}$) linear or branched alkyl, an optionally substituted $C_{5-50}$ (preferably $C_{5-10}$ or $C_{5-8}$) monocyclic or polycyclic cycloalkyl (preferably $C_{5-7}$ monocyclic cycloalkyl, for example, cyclohexyl), an optionally substituted $C_{2-50}$ (preferably $C_{2-20}$) linear or branched alkenyl, an optionally substituted $C_{6-50}$ (preferably $C_{6-20}$) aryl and a group represented by the formula $L_2$—(O—Ru'—)$_{y'}$$L_1$-, with the proviso that at least one out of the groups $R_1$ to $R_4$ represents an optionally substituted $C_{8-50}$ (preferably $C_{8-20}$) linear or branched alkyl or an optionally substituted $C_{8-50}$ (preferably $C_{8-20}$) linear or branched alkenyl; the group $L_1$ represents a single bond, a $C_{1-10}$ linear or branched alkylene oxy, a $C_{2-10}$ linear or branched alkenylene oxy or a $C_{6-10}$ arylene oxy (preferably a single bond or a $C_{1-5}$ linear or branched alkylene oxy); the numerical value y' represents a value of from 0 to 200 (preferably a value of from 0 to 100), excluding 0; plural group Ru' may be identical to or different from one another, each independently represents a $C_{2-6}$ linear or branched alkylene (preferably each independently represents —$CH_2$—$CH_2$— or —$CH_2$—$CH(CH_3)$—); the group $L_2$ represents hydrogen, an optionally substituted $C_{1-10}$ (preferably $C_{1-6}$) linear or branched alkyl, an optionally substituted $C_{2-10}$ (preferably $C_{2-6}$) linear or branched alkenyl or an optionally substituted $C_{6-10}$ aryl; the group $X^-$ represents a halogen ion (preferably fluoride ion, chloride ion, bromide ion or iodide ion, more preferably chloride ion) or hydroxide ion ($OH^-$), by "optionally substituted", it refers to optionally substituted by one or more substituent selected from the group consisting of a $C_{1-20}$ (preferably $C_{5-15}$ or $C_{5-10}$) linear or branched alkyl, a $C_{5-10}$ (preferably $C_{5-8}$ or $C_{5-7}$) monocyclic or polycyclic cycloalkyl (for example, cyclohexyl), a $C_{2-20}$ (preferably $C_{2-10}$) linear or branched alkenyl and a $C_{6-20}$ (preferably $C_{6-10}$) aryl.

3. The surfactant composition according to any preceding aspect, wherein the plural group Poly each independently or at least one out of the group Poly represents an ether segment represented by the formula

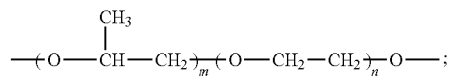

among plural group Poly, plural numerical value m may be identical to or different from one another, each independently represents a value of from 0 to 100, preferably a value of from 0 to 50, with the proviso that the sum of all (i.e. x in total) numerical values m is greater than 0 but not greater than 100 (preferably greater than 0 but not greater than 50); among plural group Poly, plural numerical value n may be identical to or different from one another, each independently represents a value of from 0 to 100, preferably a value of from 0 to 50, with the proviso that the sum of all (i.e. x in total) numerical values n is not greater than 100 (preferably not greater than 50); preferably, the sum of all (i.e. x in total) numerical values n is greater than 0, and/or, the ether segment and the group

bond to each other in a manner represented by the following formula,

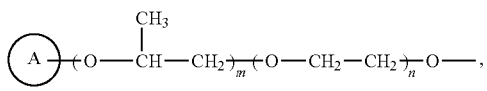

and/or
the group $-\!(\!O\!-\!Ru'\!)_{y'}$ is an ether segment represented by the formula

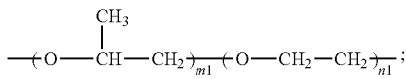

the numerical value m1 represents a value of from 0 to 100, preferably a value of from 0 to 50; the numerical value n1 represents a value of from 0 to 100, preferably a value of from 0 to 50, with the proviso that the sum of the numerical value m1 and the numerical value n1 is greater than 0 and not greater than 200 (preferably not greater than 100); preferably, the ether segment bonds to the group $L_2$ and the group $L_1$ in a manner represented by the following formula,

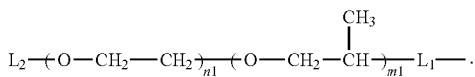

4. The surfactant composition according to any preceding aspect, wherein the anionic-nonionic surfactant is one or more selected from the group consisting of a compound represented by the following formula (I-1), a compound represented by the following formula (I-2), a compound represented by the following formula (I-3) and a compound represented by the following formula (I-4), (I-1)

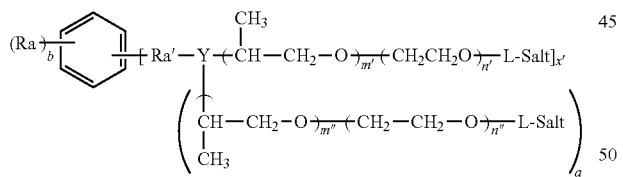

in the formula (I-1), plural group Ra may be identical to or different from one another, each independently selected from the group consisting of an optionally substituted $C_{1-20}$ linear or branched alkyl, an optionally substituted $C_{2-20}$ linear or branched alkenyl and an optionally substituted $C_{6-10}$ aryl, preferably an optionally substituted $C_{5-15}$ linear or branched alkyl and an optionally substituted $C_{6-10}$ aryl; plural group Ra' may be identical to or different from one another, each independently selected from the group consisting of a single bond, an optionally substituted $C_{1-10}$ linear or branched alkylene, an optionally substituted $C_{2-10}$ linear or branched alkenylene, carbonyl, an optionally substituted $C_{1-10}$ linear or branched alkylene carbonyl and an optionally substituted $C_{2-10}$ linear or branched alkenylene carbonyl, preferably each independently selected from the group consisting of a single bond and an optionally substituted $C_{1-6}$ linear or branched alkylene; the numerical value b represents an integer of from 0 to 3, preferably 1; plural group Y may be identical to or different from one another, each independently selected from the group consisting of N and O, with the proviso that when the group Y represents N, a=1, when the group Y represents O, a=0; the numerical value x' represents an integer from 1 to 6 (preferably an integer from 1 to 4, for example, 2, 3 or 4); plural numerical value m' may be identical to or different from one another, each independently represents a value of from 0 to 100, preferably a value of from 0 to 50, plural numerical value n' may be identical to or different from one another, each independently represents a value of from 0 to 100, preferably a value of from 0 to 50, plural numerical value m" may be identical to or different from one another, each independently represents a value of from 0 to 100, preferably a value of from 0 to 50, plural numerical value n" may be identical to or different from one another, each independently represents a value of from 0 to 100, preferably a value of from 0 to 50, with the proviso that the sum of all numerical values m' and all numerical values m" is greater than 0 but not greater than 100 (preferably greater than 0 but not greater than 50) and the sum of all numerical values n' and all numerical values n" is not greater than 100 (preferably not greater than 50), preferably the sum of all numerical values n' and all numerical values n" is greater than 0; plural group L may be identical to or different from one another, each independently selected from the group consisting of an optionally substituted $C_{1-10}$ linear or branched alkylene and an optionally substituted $C_{2-10}$ linear or branched alkenylene (preferably each independently represents an optionally substituted $C_{1-5}$ linear or branched alkylene); plural group Salt may be identical to or different from one another, each independently represents a group represented by the formula $-A^-(M)_r^+$, wherein the group $A^-$ represents a carboxylate ion ($COO^-$) or a sulfonate ion ($SO_3^-$), with the proviso that at least one out of the group $A^-$ represents the carboxylate ion ($COO^-$); the group M represents alkali metal (preferably Li, Na or K), alkaline earth metal (preferably Mg or Ca) or ammonium ($NH_4$); when the group M represents alkali metal or ammonium, r=1; when the group M represents alkaline earth metal, r=0.5, (I-2)

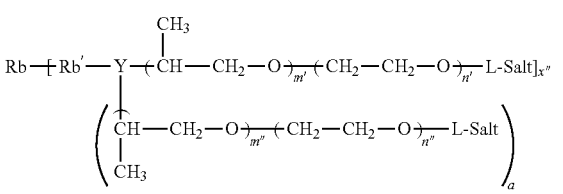

in the formula (I-2), the group Rb represents an optionally substituted $C_{1-50}$ linear or branched alkyl, an optionally substituted $C_{5-50}$ monocyclic or polycyclic cycloalkyl or an optionally substituted $C_{2-50}$ linear or branched alkenyl (preferably an optionally substituted $C_{1-29}$ linear or branched alkyl, an optionally substituted $C_{5-10}$ monocyclic or polycyclic cycloalkyl or an optionally substituted $C_{2-29}$ linear or branched alkenyl, more preferably an optionally substituted $C_{5-20}$ linear or branched alkyl, an optionally substituted $C_{5-8}$ monocyclic or polycyclic cycloalkyl or an optionally substituted $C_{5-20}$ linear or branched alkenyl, more preferably an optionally substituted $C_{8-20}$ linear or branched alkyl, an optionally substituted $C_{5-7}$ monocyclic cycloalkyl (for example, cyclohexyl) or an optionally substituted $C_{8-20}$ linear or branched alkenyl); plural group Rb' may be identical to or different from one another, each independently selected from the group consisting of a single bond and carbonyl; plural group Y may be identical to or different from one another, each independently selected from the group consisting of N and O, with the proviso that when the group Y represents N, a=1, when the group Y represents O, a=0; the numerical value x" represents an integer of from 1 to 10 (preferably an integer from 1 to 4, for example, 2, 3 or 4); plural numerical value m' may be identical to or different from one another, each independently represents a value of from 0 to 100, preferably a value of from 0 to 50, plural numerical value n' may be identical to or different from one another, each independently represents a value of from 0 to 100, preferably a value of from 0 to 50, plural numerical value m" may be identical to or different from one another, each independently represents a value of from 0 to 100, preferably a value of from 0 to 50, plural numerical value n" may be identical to or different from one another, each independently represents a value of from 0 to 100, preferably a value of from 0 to 50, with the proviso that the sum of all numerical values m' and all numerical values m" is greater than 0 but not greater than 100 (preferably greater than 0 but not greater than 50) and the sum of all numerical values n' and all numerical values n" is not greater than 100 (preferably not greater than 50), preferably the sum of all numerical values n' and all numerical values n" is greater than 0; plural group L may be identical to or different from one another, each independently selected from the group consisting of an optionally substituted $C_{1-10}$ linear or branched alkylene and an optionally substituted $C_{2-10}$ linear or branched alkenylene (preferably each independently represents an optionally substituted $C_{1-5}$ linear or branched alkylene); plural group Salt may be identical to or different from one another, each independently represents a group represented by the formula $-A^-(M)_r^+$, wherein the group $A^-$ represents a carboxylate ion ($COO^-$) or a sulfonate ion ($SO_3^-$), with the proviso that at least one out of the group $A^-$ represents the carboxylate ion ($COO^-$); the group M represents alkali metal (preferably Li, Na or K), alkaline earth metal (preferably Mg or Ca) or ammonium ($NH_4$); when the group M represents alkali metal or ammonium, r=1; when the group M represents alkaline earth metal, r=0.5,

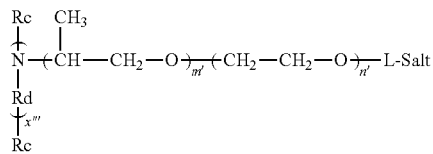

(I-3)

in the formula (I-3), plural group Rc may be identical to or different from one another, each independently selected from the group consisting of an optionally substituted $C_{1-20}$ linear or branched alkyl, an optionally substituted $C_{2-20}$ linear or branched alkenyl, an optionally substituted $C_{1-20}$ linear or branched alkyl carbonyl and an optionally substituted $C_{2-20}$ linear or branched alkenyl carbonyl (preferably each independently selected from the group consisting of an optionally substituted $C_{5-20}$ linear or branched alkyl, an optionally substituted $C_{5-20}$ linear or branched alkenyl, an optionally substituted $C_{5-20}$ linear or branched alkyl carbonyl and an optionally substituted $C_{5-20}$ linear or branched alkenyl carbonyl, more preferably each independently selected from the group consisting of an optionally substituted $C_{8-20}$ linear or branched alkyl, an optionally substituted $C_{8-20}$ linear or branched alkenyl, an optionally substituted $C_{8-20}$ linear or branched alkyl carbonyl and an optionally substituted $C_{8-20}$ linear or branched alkenyl carbonyl); plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl (preferably each independently selected from the group consisting of an optionally substituted $C_{1-5}$ linear or branched alkylene and an optionally substituted $C_{1-5}$ linear or branched alkylene carbonyl); the numerical value x''' represents an integer of from 1 to 10 (preferably an integer from 1 to 4, for example, 2, 3 or 4); plural numerical value m' may be identical to or different from one another, each independently represents a value of from 0 to 100, preferably a value of from 0 to 50, plural numerical value n' may be identical to or different from one another, each independently represents a value of from 0 to 100, preferably a value of from 0 to 50, with the proviso that the sum of all numerical values m' is greater than 0 but not greater than 100 (preferably greater than 0 but not greater than 50) and the sum of all numerical values n' is not greater than 100 (preferably not greater than 50), preferably the sum of all numerical values n' is greater than 0; plural group L may be identical to or different from one another, each independently selected from the group consisting of an optionally substituted $C_{1-10}$ linear or branched alkylene and an optionally substituted $C_{2-10}$ linear or branched alkenylene (preferably each independently represents an optionally substituted $C_{1-5}$ linear or branched alkylene); plural group Salt may be identical to or different from one another, each independently represents a group represented by the formula $-A^-(M)_r^+$, wherein the group $A^-$ represents a carboxylate ion ($COO^-$) or a sulfonate ion ($SO_3^-$), with the proviso that at least one out of the group $A^-$ represents the carboxylate ion ($COO^-$); the group M represents alkali metal (preferably Li, Na or K), alkaline earth metal (preferably Mg or Ca) or ammonium ($NH_4$); when the group M represents alkali metal or ammonium, r=1; when the group M represents alkaline earth metal, r=0.5,

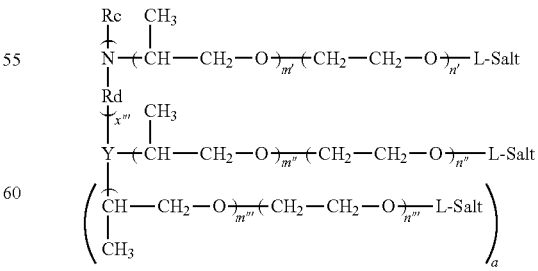

(I-4)

in the formula (I-4), the group Rc represents an optionally substituted $C_{1-20}$ linear or branched alkyl, an optionally substituted $C_{2-20}$ linear or branched alkenyl, an optionally substituted C$_{1-20}$ linear or branched alkyl carbonyl or an optionally substituted C$_{2-20}$ linear or branched alkenyl carbonyl (preferably an optionally substituted C$_{5-20}$ linear or branched alkyl, an optionally substituted C$_{5-20}$ linear or branched alkenyl, an optionally substituted C$_{5-20}$ linear or branched alkyl carbonyl or an optionally substituted C$_{5-20}$ linear or branched alkenyl carbonyl, more preferably an optionally substituted C$_{8-20}$ linear or branched alkyl, an optionally substituted C$_{8-20}$ linear or branched alkenyl, an optionally substituted C$_{8-20}$ linear or branched alkyl carbonyl or an optionally substituted C$_{8-20}$ linear or branched alkenyl carbonyl); plural group Rd may be identical to or different from one another, each independently selected from the group consisting of an optionally substituted C$_{1-10}$ linear or branched alkylene, an optionally substituted C$_{2-10}$ linear or branched alkenylene, an optionally substituted C$_{1-10}$ linear or branched alkylene carbonyl, an optionally substituted C$_{2-10}$ linear or branched alkenylene carbonyl, an optionally substituted carbonyl C$_{1-10}$ linear or branched alkylene carbonyl and an optionally substituted carbonyl C$_{2-10}$ linear or branched alkenylene carbonyl (preferably each independently selected from the group consisting of an optionally substituted C$_{1-5}$ linear or branched alkylene and an optionally substituted C$_{1-5}$ linear or branched alkylene carbonyl); the group Y represents N or O, with the proviso that when the group Y represents N, a=1, when the group Y represents O, a=0; the numerical value x'''' represents an integer of from 1 to 9 (preferably an integer from 1 to 3, more preferably 1 or 2); plural numerical value m' may be identical to or different from one another, each independently represents a value of from 0 to 100, preferably a value of from 0 to 50, plural numerical value n' may be identical to or different from one another, each independently represents a value of from 0 to 100, preferably a value of from 0 to 50, plural numerical value m'' may be identical to or different from one another, each independently represents a value of from 0 to 100, preferably a value of from 0 to 50, plural numerical value n'' may be identical to or different from one another, each independently represents a value of from 0 to 100, preferably a value of from 0 to 50, plural numerical value m''' may be identical to or different from one another, each independently represents a value of from 0 to 100, preferably a value of from 0 to 50, plural numerical value n''' may be identical to or different from one another, each independently represents a value of from 0 to 100, preferably a value of from 0 to 50, with the proviso that the sum of all numerical values m', all numerical values m'' and all numerical values m''' is greater than 0 but not greater than 100 (preferably greater than 0 but not greater than 50) and the sum of all numerical values n', all numerical values n'' and all numerical values n''' is not greater than 100 (preferably not greater than 50), preferably the sum of all numerical values n', all numerical values n'' and all numerical values n''' is greater than 0; plural group L may be identical to or different from one another, each independently selected from the group consisting of an optionally substituted C$_{1-10}$ linear or branched alkylene and an optionally substituted C$_{2-10}$ linear or branched alkenylene (preferably each independently represents an optionally substituted C$_{1-5}$ linear or branched alkylene); plural group Salt may be identical to or different from one another, each independently represents a group represented by the formula -A$^-$(M)$_r^+$, wherein the group A$^-$ represents a carboxylate ion (COO$^-$) or a sulfonate ion (SO$_3^-$), with the proviso that at least one out of the group A$^-$ represents the carboxylate ion (COO$^-$); the group M represents alkali metal (preferably Li, Na or K), alkaline earth metal (preferably Mg or Ca) or ammonium (NH$_4$); when the group M represents alkali metal or ammonium, r=1; when the group M represents alkaline earth metal, r=0.5, by "optionally substituted", it refers to optionally substituted by one or more substituent selected from the group consisting of hydroxyl, a C$_{1-20}$ (preferably C$_{5-15}$ or C$_{5-10}$) linear or branched alkyl, a C$_{5-10}$ (preferably C$_{5-8}$ or C$_{5-7}$) monocyclic or polycyclic cycloalkyl (for example, cyclohexyl), a C$_{2-20}$ (preferably C$_{2-10}$) linear or branched alkenyl and a C$_{6-20}$ (preferably C$_{6-10}$) aryl.

5. A surfactant composition, produced by mixing a cationic surfactant and an anionic-nonionic surfactant, wherein the ratio by molar of the cationic surfactant and the anionic-nonionic surfactant is 1:0.01-100 (preferably 1:0.1-10), the cationic surfactant is one or more selected from the group consisting of quaternary ammonium salts and quaternary ammonium hydroxides, the anionic-nonionic surfactant is one or more compound represented by the following formula (I),

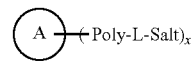

(I)

in the formula (I), the groups and the numerical values are as defined in Aspect 1.

6. A process for producing a surfactant composition, which is characterized by including the following steps:

Step (1): reacting one or more multifunctional compound carrying one or more functional group selected from the group consisting of —OH, —NH$_2$ and —NH— with one or more alkylene oxide represented by the following formula (Y) in the presence of an alkaline catalyst (preferably alkali metal hydroxide), to obtain an ether product, wherein the alkylene oxide represented by the formula (Y) comprises at least propylene oxide,

(Y)

in the formula (Y), the group Ru' represents a C$_{2-6}$ linear or branched alkylene (preferably —CH$_2$—CH$_2$— or —CH$_2$—CH(CH$_3$)—), Step (2): reacting the ether product with one or more compound represented by the following formula (Z) in the presence of an alkaline catalyst (preferably alkali metal hydroxide), whereby obtaining the anionic-nonionic surfactant,

 G-L-AS (Z)

in the formula (Z), the group G represents a halogen atom (preferably fluorine atom, chlorine atom, bromine atom and iodine atom, more preferably chlorine atom) or hydroxyl; the group L represents an optionally substituted C$_{1-10}$ linear or branched alkylene or an optionally substituted C$_{2-10}$ linear or branched alkenylene (preferably an optionally substituted C$_{1-5}$ linear or branched alkylene); the group AS represents a group represented by the formula -A$^-$(M')$_r^+$; the group A$^-$ represents a carboxylate ion (COO$^-$) or a sulfonate ion (SO$_3^-$); the group M' represents hydrogen, alkali metal (preferably Li, Na or K), alkaline earth metal (preferably Mg or Ca) or ammonium (NH$_4$); when the group M' represents hydrogen, alkali metal or ammonium, r=1; when the group M' represents alkaline earth metal, r=0.5, wherein at least one compound represented by the formula (Z) comprises the carboxylate ion (COO⁻) as the group A⁻, Step (3): mixing the anionic-nonionic surfactant and a cationic surfactant selected from the group consisting of quaternary ammonium salts and quaternary ammonium hydroxides at a ratio by molar between the cationic surfactant and the anionic-nonionic surfactant of 1:0.01-100 (preferably 1:0.1-10), to obtain the surfactant composition, wherein, by "optionally substituted", it refers to optionally substituted by one or more substituent selected from the group consisting of hydroxyl, a $C_{1-20}$ (preferably $C_{5-15}$ or $C_{5-10}$) linear or branched alkyl, a $C_{5-10}$ (preferably $C_{5-8}$ or $C_{5-7}$) monocyclic or polycyclic cycloalkyl (for example, cyclohexyl), a $C_{2-20}$ (preferably $C_{2-10}$) linear or branched alkenyl and a $C_{6-20}$ (preferably $C_{6-10}$) aryl.

7. The process according to any preceding aspect, wherein the multifunctional compound is one or more compound represented by the following formula (X),

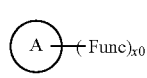

(X)

in the formula (X), the group

represents an optionally substituted x0 valent $C_{1-50}$ (preferably $C_{5-20}$ or $C_{8-50}$ or $C_{8-20}$) linear or branched alkyl, an optionally substituted x0 valent $C_{5-50}$ (preferably $C_{5-10}$ or $C_{5-8}$) monocyclic or polycyclic cycloalkyl (preferably $C_{5-7}$ monocyclic cycloalkyl, for example, cyclohexyl), an optionally substituted x0 valent $C_{2-50}$ (preferably $C_{5-20}$ or $C_{8-50}$ or $C_{8-20}$) linear or branched alkenyl, an optionally substituted x0 valent $C_{6-50}$ (preferably $C_{6-20}$) aryl or an optionally substituted x0 valent $C_{3-50}$ (preferably $C_{8-50}$ or $C_{8-20}$) linear or branched heteroalkyl; the numerical value x0 represents an integer of from 1 to 10 (preferably an integer from 1 to 4, for example, 2, 3 or 4); plural group Func may be identical to or different from one another, each independently selected from the group consisting of —OH, —NH— and —NH₂, the linear or branched heteroalkyl represents a group obtained by directly replacing one or more group —CH₂— locating inside the molecular structure of a linear or branched alkyl by a corresponding number of replacing group selected from —O—, —S— or —NR'— (wherein the group R' represents an optionally substituted $C_{1-20}$ (preferably $C_{1-10}$) linear or branched alkyl, an optionally substituted $C_{5-10}$ (preferably $C_{5-8}$ or $C_{5-7}$) monocyclic or polycyclic cycloalkyl, an optionally substituted $C_{2-20}$ (preferably $C_{2-10}$) linear or branched alkenyl or an optionally substituted $C_{6-20}$ (preferably $C_{6-10}$) aryl), or a group obtained by directly replacing one or more group

locating inside the molecular structure of a linear or branched alkyl by a corresponding number of replacing group

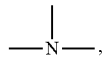

by "optionally substituted", it refers to optionally substituted by one or more substituent selected from the group consisting of oxo, hydroxyl, a $C_{1-20}$ (preferably $C_{5-15}$ or $C_{5-10}$) linear or branched alkyl, a $C_{5-10}$ (preferably $C_{5-8}$ or $C_{5-7}$) monocyclic or polycyclic cycloalkyl (for example, cyclohexyl), a $C_{2-20}$ (preferably $C_{2-10}$) linear or branched alkenyl and a $C_{6-20}$ (preferably $C_{6-10}$) aryl, the multifunctional compound is preferably one or more selected from the group consisting of a compound represented by the following formula (X-1), a compound represented by the following formula (X-2), a compound represented by the following formula (X-3) and a compound represented by the following formula (X-4),

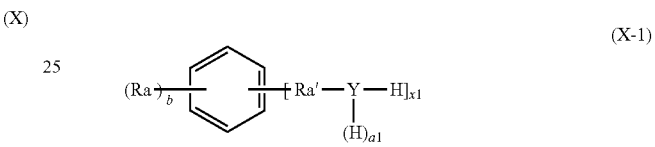

(X-1)

in the formula (X-1), plural group Ra may be identical to or different from one another, each independently selected from the group consisting of an optionally substituted $C_{1-20}$ linear or branched alkyl, an optionally substituted $C_{2-20}$ linear or branched alkenyl and an optionally substituted $C_{6-10}$ aryl, preferably an optionally substituted $C_{5-15}$ linear or branched alkyl and an optionally substituted $C_{6-10}$ aryl; plural group Ra' may be identical to or different from one another, each independently selected from the group consisting of a single bond, an optionally substituted $C_{1-10}$ linear or branched alkylene, an optionally substituted $C_{2-10}$ linear or branched alkenylene, carbonyl, an optionally substituted $C_{1-10}$ linear or branched alkylene carbonyl and an optionally substituted $C_{2-10}$ linear or branched alkenylene carbonyl, preferably each independently selected from the group consisting of a single bond and an optionally substituted $C_{1-6}$ linear or branched alkylene; the numerical value b represents an integer of from 0 to 3, preferably 1; plural group Y may be identical to or different from one another, each independently selected from the group consisting of N and O, with the proviso that when the group Y represents N, a1=1, when the group Y represents O, a1=0; the numerical value x1 represents an integer from 1 to 6 (preferably an integer from 1 to 4, for example, 2, 3 or 4), by "optionally substituted", it refers to optionally substituted by one or more substituent selected from the group consisting of hydroxyl, a $C_{1-20}$ (preferably $C_{5-15}$ or $C_{5-10}$) linear or branched alkyl, a $C_{5-10}$ (preferably $C_{5-8}$ or $C_{5-7}$) monocyclic or polycyclic cycloalkyl (for example, cyclohexyl), a $C_{2-20}$ (preferably $C_{2-10}$) linear or branched alkenyl and a $C_{6-20}$ (preferably $C_{6-10}$) aryl,

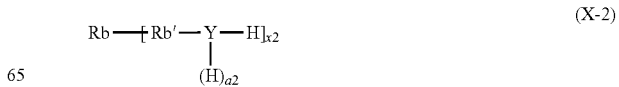

(X-2)

in the formula (X-2), the group Rb represents an optionally substituted $C_{1-50}$ linear or branched alkyl, an optionally substituted $C_{5-50}$ monocyclic or polycyclic cycloalkyl or an optionally substituted $C_{2-50}$ linear or branched alkenyl (preferably an optionally substituted $C_{1-29}$ linear or branched alkyl, an optionally substituted $C_{5-10}$ monocyclic or polycyclic cycloalkyl or an optionally substituted $C_{2-29}$ linear or branched alkenyl, more preferably an optionally substituted $C_{5-20}$ linear or branched alkyl, an optionally substituted $C_{5-8}$ monocyclic or polycyclic cycloalkyl or an optionally substituted $C_{5-20}$ linear or branched alkenyl, more preferably an optionally substituted $C_{8-20}$ linear or branched alkyl, an optionally substituted $C_{5-7}$ monocyclic cycloalkyl (for example, cyclohexyl) or an optionally substituted $C_{8-20}$ linear or branched alkenyl); plural group Rb' may be identical to or different from one another, each independently selected from the group consisting of a single bond and carbonyl; plural group Y may be identical to or different from one another, each independently selected from the group consisting of N and O, with the proviso that when the group Y represents N, a2=1, when the group Y represents O, a2=0; the numerical value x2 represents an integer of from 1 to 10 (preferably an integer from 1 to 4, for example, 2, 3 or 4), by "optionally substituted", it refers to optionally substituted by one or more substituent selected from the group consisting of hydroxyl, a $C_{1-20}$ (preferably $C_{5-15}$ or $C_{5-10}$) linear or branched alkyl, a $C_{5-10}$ (preferably $C_{5-8}$ or $C_{5-7}$) monocyclic or polycyclic cycloalkyl (for example, cyclohexyl), a $C_{2-20}$ (preferably $C_{2-10}$) linear or branched alkenyl and a $C_{6-20}$ (preferably $C_{6-10}$) aryl,

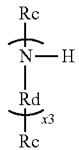

(X-3)

in the formula (X-3), plural group Rc may be identical to or different from one another, each independently selected from the group consisting of an optionally substituted $C_{1-20}$ linear or branched alkyl, an optionally substituted $C_{2-20}$ linear or branched alkenyl, an optionally substituted $C_{1-20}$ linear or branched alkyl carbonyl and an optionally substituted $C_{2-20}$ linear or branched alkenyl carbonyl (preferably each independently selected from the group consisting of an optionally substituted $C_{5-20}$ linear or branched alkyl, an optionally substituted $C_{5-20}$ linear or branched alkenyl, an optionally substituted $C_{5-20}$ linear or branched alkyl carbonyl and an optionally substituted $C_{5-20}$ linear or branched alkenyl carbonyl, more preferably each independently selected from the group consisting of an optionally substituted $C_{8-20}$ linear or branched alkyl, an optionally substituted $C_{8-20}$ linear or branched alkenyl, an optionally substituted $C_{8-20}$ linear or branched alkyl carbonyl and an optionally substituted $C_{8-20}$ linear or branched alkenyl carbonyl); plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl (preferably each independently selected from the group consisting of an optionally substituted $C_{1-5}$ linear or branched alkylene and an optionally substituted $C_{1-5}$ linear or branched alkylene carbonyl); the numerical value x3 represents an integer of from 1 to 10 (preferably an integer from 1 to 4, for example, 2, 3 or 4), by "optionally substituted", it refers to optionally substituted by one or more substituent selected from the group consisting of hydroxyl, a $C_{1-20}$ (preferably $C_{5-15}$ or $C_{5-10}$) linear or branched alkyl, a $C_{5-10}$ (preferably $C_{5-8}$ or $C_{5-7}$) monocyclic or polycyclic cycloalkyl (for example, cyclohexyl), a $C_{2-20}$ (preferably $C_{2-10}$) linear or branched alkenyl and a $C_{6-20}$ (preferably $C_{6-10}$) aryl,

in the formula (X-4), the group Rc represents an optionally substituted $C_{1-20}$ linear or branched alkyl, an optionally substituted $C_{2-20}$ linear or branched alkenyl, an optionally substituted $C_{1-20}$ linear or branched alkyl carbonyl or an optionally substituted $C_{2-20}$ linear or branched alkenyl carbonyl (preferably an optionally substituted $C_{5-20}$ linear or branched alkyl, an optionally substituted $C_{5-20}$ linear or branched alkenyl, an optionally substituted $C_{5-20}$ linear or branched alkyl carbonyl or an optionally substituted $C_{5-20}$ linear or branched alkenyl carbonyl, more preferably an optionally substituted $C_{8-20}$ linear or branched alkyl, an optionally substituted $C_{8-20}$ linear or branched alkenyl, an optionally substituted $C_{8-20}$ linear or branched alkyl carbonyl or an optionally substituted $C_{8-20}$ linear or branched alkenyl carbonyl); plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl (preferably each independently selected from the group consisting of an optionally substituted $C_{1-5}$ linear or branched alkylene and an optionally substituted $C_{1-5}$ linear or branched alkylene carbonyl); the group Y represents N or O, with the proviso that when the group Y represents N, a4=1, when the group Y represents O, a4=0; the numerical value x4 represents an integer of from 1 to 9 (preferably an integer from 1 to 3, more preferably 1 or 2), by "optionally substituted", it refers to optionally substituted by one or more substituent selected from the group consisting of hydroxyl, a $C_{1-20}$ (preferably $C_{5-15}$ or $C_{5-10}$) linear or branched alkyl, a $C_{5-10}$ (preferably $C_{5-8}$ or $C_{5-7}$) monocyclic or polycyclic cycloalkyl (for example, cyclohexyl), a $C_{2-20}$ (preferably $C_{2-10}$) linear or branched alkenyl and a $C_{6-20}$ (preferably $C_{6-10}$) aryl.

8. The process according to any preceding aspect, wherein the ratio by molar of the multifunctional compound and the alkylene oxide is 1:0-200 (preferably 1:0-100), excluding 0; the ratio by molar of the multifunctional compound and the compound represented by the formula (Z) is 1:1-10 (preferably 1:1-3); the reaction conditions in Step (1) includes a reaction temperature of from the room temperature to 300 degrees Celsius (preferably 100-200 degrees Celsius), a reaction duration of from 1 to 20 h (preferably from 1 to 10 h); the reaction conditions in Step (2) includes a reaction temperature of from the room temperature to 200 degrees Celsius (preferably 50-150 degrees Celsius), a reaction duration of from 1 to 20 h (preferably from 1 to 10 h).

9. The process according to any preceding aspect, wherein more than one alkylene oxides are used, and the multifunctional compound is made to firstly react with propylene oxide.

10. A flooding fluid composition for tertiary oil recovery, which is characterized by comprising the surfactant composition according to any preceding aspect or the surfactant composition produced in line with the process according to any preceding aspect, and water, wherein the surfactant composition accounts for 0.001-10 wt %, preferably 0.005-5 wt %, more preferably 0.02-1 wt %, further preferably 0.02-0.5 wt %, more preferably 0.02-0.35 wt %, relative to the total weight of the flooding fluid composition for tertiary oil recovery (as 100 wt %).

11. The flooding fluid composition for tertiary oil recovery according to any preceding aspect, comprising no inorganic alkali.

12. A process for producing a flooding fluid composition for tertiary oil recovery, which is characterized by mixing the surfactant composition according to any preceding aspect or the surfactant composition produced in line with the process according to any preceding aspect, at least with water, wherein the surfactant composition accounts for 0.001-10 wt %, preferably 0.005-5 wt %, more preferably 0.02-1 wt %, further preferably 0.02-0.5 wt %, more preferably 0.02-0.35 wt %, relative to the total weight of the flooding fluid composition for tertiary oil recovery (as 100 wt %).

13. A tertiary oil recovery process, which is characterized by including a step of conducting tertiary oil recovery in the presence of the surfactant composition according to any preceding aspect, the surfactant composition produced in line with the process according to any preceding aspect, the flooding fluid composition for tertiary oil recovery according to any preceding aspect, or the flooding fluid composition for tertiary oil recovery produced in line with the process according to any preceding aspect, as a flooding fluid.

14. The tertiary oil recovery process according to any preceding aspect, wherein no inorganic alkali is used.

TECHNICAL EFFECTS

The surfactant composition according to this invention exhibits, as compared with the prior art, significantly improved interfacial activity and stability. For example, at a concentration of as low as 0.01 to 0.05 wt %, the present surfactant composition can still provide a significantly ultra low interfacial tension of $10^{-3}$-$10^{-4}$ mN/m with crude oil.

The flooding fluid composition for tertiary oil recovery according to this invention, which contains the surfactant composition of this invention as the surfactant component, exhibits as compared with the prior art improved oil displacement efficiency and oil washing capability (for example, with an oil washing rate of more than 40% for crude oil), and is capable of significantly enhancing oil recovery.

The flooding fluid composition for tertiary oil recovery according to this invention is characterized by a simplified system, containing no inorganic alkali, no harm to the reservoir and oil wells, not corrosive to equipments and pipings, and not leading to difficult demulsification.

SPECIFIC MODE TO CARRY OUT THIS INVENTION

This invention will be described in details hereinafter with reference to the following specific embodiments. However, it should be noted that the protection scope of this invention should not be construed as limited to these specific embodiments, but rather determined by the attached claims.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention.

Further, to the extent that any meaning or definition of a term in this document conflicts with any meaning or definition of the same term in a document incorporated by reference, the meaning or definition assigned to that term in this document shall govern.

In the context of this specification, the term "halo" or the like refers to fluoro, chloro, bromo or iodo.

In the context of this specification, by "linear or branched heteroalkyl", it refers to a group obtained by directly replacing one or more (for example, from 1 to 4, from 1 to 3, from 1 to 2, or 1) group —CH$_2$— locating inside the molecular structure (not including that at the terminal of the main chain or any side chain in the molecular structure) of a linear or branched alkyl by a corresponding number of replacing group selected from —O—, —S— or —NR'—, or a group obtained by directly replacing one or more (for example, from 1 to 3, from 1 to 2, or 1) group

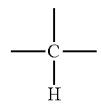

locating inside the molecular structure (not including that at the terminal of the main chain or any side chain in the molecular structure) of a linear or branched alkyl by a corresponding number of replacing group

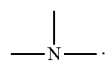

As the replacing group, it is preferably —NR'— or

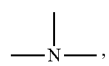

more preferably —NR'—. Herein, the group R' represents an optionally substituted $C_{1-20}$ linear or branched alkyl, an optionally substituted $C_{5-10}$ monocyclic or polycyclic cycloalkyl, an optionally substituted $C_{2-20}$ linear or branched alkenyl or an optionally substituted $C_{6-20}$ aryl. As the $C_{1-20}$ linear or branched alkyl, for example, there may be exemplified a $C_{1-10}$ linear or branched alkyl or a $C_{1-6}$ linear or branched alkyl, specifically methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. As the group R', it is preferably a $C_{1-20}$ linear or branched alkyl or a $C_{5-7}$ monocyclic cycloalkyl, specifically methyl, ethyl or cyclohexyl. Herein, by optionally substituted, it refers to optionally substituted by one or more (for example, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. It is obvious that, from the standpoint of structure stability, when plural exist, these replacing groups do not directly bond to one another. Further, the carbon atom number of the linear or branched alkyl is reduced accordingly due to the replacement of the group —CH$_2$— or

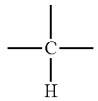

by the replacing group, however, to simplify the description, the carbon atom number of the linear or branched alkyl before the replacement is still used to refer to the carbon atom number of the resultant linear or branched heteroalkyl. As the linear or branched heteroalkyl, if specifically exemplified, a $C_4$ linear alkyl, for example,

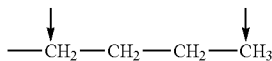

(In this formula, the groups indicated by the arrow marks do not locate inside the molecular structure of the linear alkyl, but rather at the terminal of the main chain) if directly replaced by one replacing group —O—, —CH$_2$—O— CH$_2$—CH$_3$ or —CH$_2$—CH$_2$—O—CH$_3$ will be obtained, called as $C_4$ linear heteroalkyl. Or, a $C_4$ branched alkyl, for example,

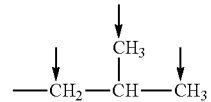

(In this FIGURE, the groups indicated by the arrow marks do not locate inside the molecular structure of the branched alkyl, but rather at the terminal of the main chain and that of the side chain) if directly replaced by one replacing group —N<,

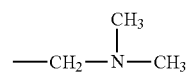

will be obtained, called as $C_4$ branched heteroalkyl. According to this invention, as the linear or branched heteroalkyl, there may be exemplified a $C_{3-50}$ linear or branched heteroalkyl, specifically a $C_{8-50}$ linear or branched heteroalkyl, a $C_{8-30}$ linear or branched heteroalkyl or a $C_{8-20}$ linear or branched heteroalkyl. The term "linear or branched heteroalkane" or the like can be interpreted similarly.

In the context of this specification, if a group is defined or described in the form of "numerical value+valent+group" or the like, it refers to a group obtained by removing a number of hydrogen atom (wherein the number of the hydrogen atom corresponds to the numerical value) from the corresponding basic structure (for example, a chain, a ring or a combination thereof) of the group, preferably refers to a group obtained by removing a number of hydrogen atom (wherein the number of the hydrogen atom corresponds to the numerical value) from a carbon atom (preferably from a saturated carbon atom and/or if the numerical value is two or more, from different carbon atoms) contained in the basic structure. For example, "3 valent linear or branched alkyl" refers to a group obtained by removing 3 (three) hydrogen atoms from a linear or branched alkane (i.e. the corresponding basic structure (chain) of the linear or branched alkyl), while "2 valent linear or branched heteroalkyl" refers to a group obtained by removing 2 (two) hydrogen atoms from a linear or branched heteroalkane (preferably from a carbon atom of the heteroalkane, or further, from two different carbon atoms in the heteroalkane). Obviously, the expression "0 valent+group" represents the basic structure itself, for example, a 0 valent alkyl corresponds to an alkane.

Unless otherwise specified, percents, parts or ratios or the like mentioned in this specification are all on a weight basis.

According to this invention, related to is a surfactant composition, which comprises a cationic surfactant and an anionic-nonionic surfactant.

According to this invention, in the surfactant composition, the ratio by molar of the cationic surfactant and the anionic-nonionic surfactant could be generally 1:0.01-100, preferably 1:0.1-10.

According to this invention, the anionic-nonionic surfactant is a compound represented by the following formula (I). As the compound, one kind or a mixture of two or more kinds at any ratio therebetween could be used.

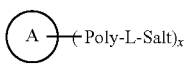  (I)

According to this invention, in the formula (I), the group

represents an optionally substituted x valent $C_{1-50}$ linear or branched alkyl, an optionally substituted x valent $C_{5-50}$ monocyclic or polycyclic cycloalkyl, an optionally substituted x valent $C_{2-50}$ linear or branched alkenyl, an optionally substituted x valent $C_{6-50}$ aryl or an optionally substituted x valent $C_{3-50}$ linear or branched heteroalkyl. As the optionally substituted x valent $C_{1-50}$ linear or branched alkyl, it is preferably an optionally substituted x valent $C_{5-20}$ linear or branched alkyl, a x valent $C_{8-50}$ linear or branched alkyl or a x valent $C_{8-20}$ linear or branched alkyl. As the optionally substituted x valent $C_{5-50}$ monocyclic or polycyclic cycloalkyl, for example, there may be exemplified an optionally substituted x valent $C_{5-10}$ monocyclic or polycyclic cycloalkyl, an optionally substituted x valent $C_{5-8}$ monocyclic or polycyclic cycloalkyl or an optionally substituted x valent $C_{5-7}$ monocyclic or polycyclic cycloalkyl, especially an optionally substituted x valent $C_{5-7}$ monocyclic cycloalkyl, for example, cyclohexyl. The optionally substituted x valent $C_{2-50}$ linear or branched alkenyl is preferably an optionally substituted x valent $C_{5-20}$ linear or branched alkenyl, an optionally substituted x valent $C_{8-50}$ linear or branched alkenyl or an optionally substituted x valent $C_{8-20}$ linear or branched alkenyl. The optionally substituted x valent $C_{6-50}$ aryl is preferably an optionally substituted x valent $C_{6-20}$ aryl, for example, phenyl or naphthyl. The optionally substituted x valent $C_{3-50}$ linear or branched heteroalkyl is preferably an optionally substituted x valent $C_{8-50}$ linear or branched heteroalkyl, an optionally substituted x valent $C_{8-30}$ linear or branched heteroalkyl or an optionally substituted x valent $C_{8-20}$ linear or branched heteroalkyl.

According to this invention, in the formula (I), plural group Poly may be identical to or different from one another, each independently represents a group represented by the formula $-(O-Ru)_y-O-$.

According to this invention, in the formula (I), among plural group Poly, plural numerical value y may be identical to or different from one another, each independently represents a value of from 0 to 200, preferably a value of from 0 to 100. Herein, the numerical value y represents an average number of the unit —O—Ru— in the group represented by the formula $-(O-Ru)_y-O-$, and thus could be a non-integer or an integer. As the numerical value y, for example, there may be exemplified 0, 2.0, 3.0, 3.5, 7.5, 10.0, 15.0, 25.0, 30.2, 35.0, 40.0, 45.5, 50.5, 55.2, 60.0, 75.5, 80.5, 85.0, 90.5 or 95.7, and so on.

According to this invention, in the formula (I), it is required that the sum of all (i.e. x in total) numerical values y (i.e. throughout the molecular structure of the compound represented by the formula (I), the overall average number of the unit —O—Ru—) is greater than 0 and not greater than 200, preferably the sum of all (i.e. x in total) numerical values y is greater than 0 but not greater than 100. In this context, throughout the molecular structure of the compound represented by the formula (I), it is necessary to contain (a certain amount of) the unit —O—Ru—. Herein, throughout the molecular structure of the compound represented by the formula (I), as the overall average number of the unit —O—Ru—, for example, there may be exemplified 0.1, 0.5, 1.5, 2.0, 3.0, 3.5, 7.5, 10.0, 15.0, 25.0, 30.2, 35.0, 40.0, 45.5, 50.5, 55.2, 60.0, 75.5, 80.5, 85.0, 90.5 or 95.7, and so on.

According to this invention, in the formula (I), among plural group Poly, plural group Ru may be identical to or different from one another, each independently represents a $C_{2-6}$ linear or branched alkylene, preferably —CH$_2$—CH$_2$—, —CH$_2$—CH(CH$_3$)— or a combination thereof, especially —CH$_2$—CH(CH$_3$)— or a combination of —CH$_2$—CH(CH$_3$)— with any other $C_{2-6}$ linear or branched alkylene. According to this invention, in the formula (I), in the group represented by the formula $-(O-Ru)_y-O-$, when the group Ru represents two or more out of the $C_{2-6}$ linear or branched alkylene, these (individual) units —O—Ru— may bond to one another at any predetermined ratio therebetween so as to form into a random, a (di- or multi-) block or an alternative copolymer segment, with the proviso that the overall average number of these units corresponds to the numeral number y. For example, when the group Ru represents a combination of —CH$_2$—CH$_2$— and —CH$_2$—CH(CH$_3$)—, and y is 2.2, the unit —O—CH$_2$—CH$_2$— and the unit

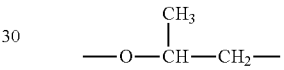

may bond to one another at any predetermined ratio therebetween (wherein for example, the ratio by molar therebetween may be from 1:99 to 99:1) so as to form into a random, a (di- or multi-) block or an alternative copolymer segment, with the proviso that the overall average number of these two units is 2.2.

According to this invention, one or more group Poly exist, wherein in at least one of the group Poly (preferably in all of the group Poly), at least a part of (or at least a certain amount of) the group Ru represents a $C_{3-6}$ linear or branched alkylene (corresponding to a non-EO unit), wherein preference is given to —CH$_2$—CH(CH$_3$)— (corresponding to a PO unit), whereby making the group Poly to comprise (a certain amount of, with a upper limit value of y) the non-EO unit (for example, the unit

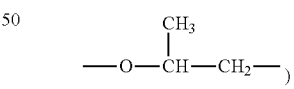

as the essential constituting unit.

According to an embodiment of this invention, in the formula (I), plural group Poly each independently or at least one of the plural group Poly represents a diblock ether segment represented by the following formula (I-A). Herein, as illustrated by the formula (I-A), the unit —O—CH$_2$—CH$_2$— and the unit

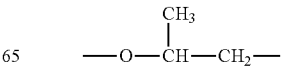

bond to each other so as to form into a (di)block copolymer segment.

formula (I-A)

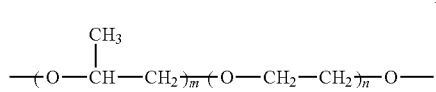

According to the embodiment of this invention, preferably, the ether segment and the group

bond to each other in a manner represented by the following formula.

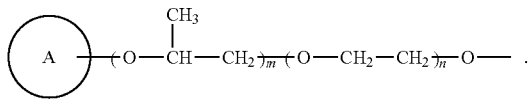

According to the embodiment of this invention, among plural group Poly (or in the group Poly), plural numerical value m may be identical to or different from one another, each independently represents a value of from 0 to 100, preferably a value of from 0 to 50. Herein, the numerical value m represents an average number of the unit

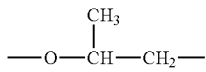

in the formula (I-A), and thus could be a non-integer or an integer. As the numerical value m, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to the embodiment of this invention, among plural group Poly (or in the group Poly), plural numerical value n may be identical to or different from one another, each independently represents a value of from 0 to 100, preferably a value of from 0 to 50. Herein, the numerical value n represents an average number of the unit —O—$CH_2$—$CH_2$— in the formula (I-A), and thus could be a non-integer or an integer. As the numerical value n, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to the embodiment of this invention, in the formula (I), when all (i.e. x in total) of the group Poly each independently represents the diblock ether segment represented by the formula (I-A), it is required that the sum of all (i.e. x in total) numerical values m (i.e. throughout the molecular structure of the compound represented by the formula (I), the overall average number of the unit

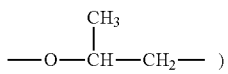

is greater than 0 but not greater than 100, preferably greater than 0 but not greater than 50. In this context, throughout the molecular structure of the compound represented by the formula (I), it is necessary to contain (a certain amount of) the unit

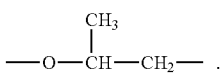

Herein, throughout the molecular structure of the compound represented by the formula (I), as the overall average number of the unit

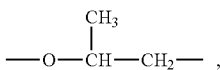

for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to the embodiment of this invention, in the formula (I), when all (i.e. x in total) of the group Poly each independently represents the diblock ether segment represented by the formula (I-A), it is required that the sum of all (i.e. x in total) numerical values n (i.e. throughout the molecular structure of the compound represented by the formula (I), the overall average number of the unit —O—$CH_2$—$CH_2$—) is not greater than 100, preferably not greater than 50. In this context, throughout the molecular structure of the compound represented by the formula (I), it is optionally to contain (a certain amount of) the unit —O—$CH_2$—$CH_2$—. Herein, throughout the molecular structure of the compound represented by the formula (I), as the overall average number of the unit —O—$CH_2$—$CH_2$—, for example, there may be exemplified 0, 0.1, 0.5, 1.2, 2.0, 2.5, 3.0, 3.5, 5.4, 7.5, 10.0, 15.0, 25.0, 30.2, 35.0, 40.0, 45.5 or 49.5, and so on.

According to the embodiment of this invention, preferably, in the formula (I), when all (i.e. x in total) the group Poly each independently represents the diblock ether segment represented by the formula (I-A), the sum of all (i.e. x in total) numerical values n (i.e. throughout the molecular structure of the compound represented by the formula (I), the overall average number of the unit —O—$CH_2$—$CH_2$—) is greater than 0. In this context, throughout the molecular structure of the compound represented by the formula (I), it is preferred to contain (a certain amount of) the unit —O—$CH_2$—$CH_2$—. Herein, throughout the molecular structure of the compound represented by the formula (I), as the overall average number of the unit —O—$CH_2$—$CH_2$—, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I), plural group L may be identical to or different from one another, each independently selected from the group consisting of an optionally substituted $C_{1-10}$ linear or branched alkylene and an optionally substituted $C_{2-10}$ linear or branched alkenylene, preferably each independently represents an optionally substituted $C_{1-5}$ linear or branched alkylene.

According to this invention, in the formula (I), plural group Salt may be identical to or different from one another, each independently represents a group represented by the formula $-A^-(M)_r^+$, wherein the group $A^-$ represents a carboxylate ion (COO⁻) or a sulfonate ion (SO₃⁻), the group M represents alkali metal (preferably Li, Na or K), alkaline earth metal (preferably Mg or Ca) or ammonium (NH₄); when the group M represents alkali metal or ammonium, r=1; when the group M represents alkaline earth metal, r=0.5.

According to this invention, in the formula (I), depending on the total number of the group Salt, the total number of the group A⁻ could be one or x, with the proviso that at least one out of the group A⁻ represents the carboxylate ion (COO⁻). In this context, throughout the molecular structure of the compound represented by the formula (I), it is necessary to exist at least one carboxylate ion (COO⁻).

According to this invention, in the formula (I), x represents the valence of the group

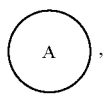, which is an integer of from 1 to 10, preferably an integer from 1 to 4, for example, 2, 3 or 4.

According to this invention, in the formula (I), unless otherwise specified, by optionally substituted, it refers to optionally substituted by one or more (for example, from 1 to 5, from 1 to 4, from 1 to 3, from 1 to 2 or 1) substituent selected from the group consisting of oxo (i.e. ), hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. As the substituent, preference is given to a $C_{5-15}$ linear or branched alkyl, more preferably a $C_{5-10}$ linear or branched alkyl or methyl or ethyl.

According to this invention, in the formula (I), when oxo exists as the substituent, it is preferred that at least one oxo exists on the carbon atom directly bonding to a N atom (if any, for example, that contained in a linear or branched heteroalkyl), so as to make the carbon atom to present in the form of carbonyl (i.e. 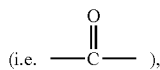), whereby introducing a structure of carbonyl directly bonding to a N atom (for example, imido) into the molecular structure of the compound represented by the formula (I). Further, to provide better hydrolysis resistance or chemical resistance, it is preferred that there is no oxo as the substituent on at least a part (preferably all) of the carbon atoms directly bonding to an O or S atom (if any), and/or, on at least a part of (preferably all) of the terminal carbon atoms (i.e. the carbon atom at a free end of and/or a un-bonded position on the molecular chain), and/or, two carbon atoms directly bonded to each other are not substituted by oxo simultaneously. By doing so, no chemically active or unstable group like an ester or aldehyde group will be introduced into the molecular structure of the compound represented by the formula (I). Specifically, assuming that the group

represents a 1 valent linear alkyl

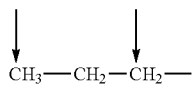

(comprising two terminal carbon atoms as indicated by the arrow marks in the formula) substituted by oxo, this group is preferably

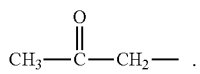.

Or, assuming that the group

is a 1 valent branched heteroalkyl

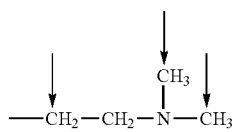

(comprising three terminal carbon atoms as indicated by the arrow marks in the formula, also comprising three carbon atoms directly bonding to a N atom) substituted by oxo, this group is preferably

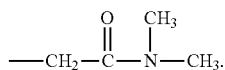.

According to an embodiment of this invention, the anionic-nonionic surfactant is a compound represented by the following formula (I-1), a compound represented by the following formula (I-2), a compound represented by the following formula (I-3) or a compound represented by the following formula (I-4). As these compounds, one kind or a mixture of two or more kinds at any ratio therebetween could be used.

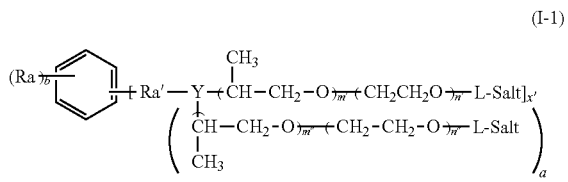
(I-1)

According to this invention, in the formula (I-1), plural group Ra may be identical to or different from one another, each independently selected from the group consisting of an optionally substituted $C_{1-20}$ linear or branched alkyl, an optionally substituted $C_{2-20}$ linear or branched alkenyl and an optionally substituted $C_{6-10}$ aryl, preferably an optionally substituted $C_{5-15}$ linear or branched alkyl and an optionally substituted $C_{6-10}$ aryl.

According to this invention, in the formula (I-1), plural group Ra' may be identical to or different from one another, each independently selected from the group consisting of a single bond, an optionally substituted $C_{1-10}$ linear or branched alkylene, an optionally substituted $C_{2-10}$ linear or branched alkenylene, carbonyl, an optionally substituted $C_{1-10}$ linear or branched alkylene carbonyl and an optionally substituted $C_{2-10}$ linear or branched alkenylene carbonyl, preferably each independently selected from the group consisting of a single bond and an optionally substituted $C_{1-6}$ linear or branched alkylene.

According to this invention, in the formula (I-1), the numerical value b represents an integer of from 0 to 3, preferably 1.

According to this invention, in the formula (I-1), the numerical value x' represents the number of the group

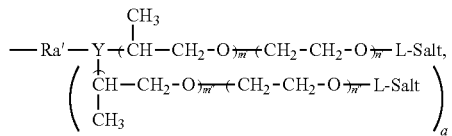

which is an integer from 1 to 6, preferably an integer from 1 to 4, for example, 2, 3 or 4. Obviously, b+x'≤6.

According to this invention, in the formula (I-1), plural group Y may be identical to or different from one another, each independently selected from the group consisting of N and O, with the proviso that when the group Y represents N, a=1, when the group Y represents O, a=0.

According to this invention, in the formula (I-1), plural numerical value m' may be identical to or different from one another, each independently represents a value of from 0 to 100, preferably a value of from 0 to 50. Herein, the numerical value m' represents an average number of the unit

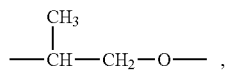, and thus could be a non-integer or an integer. As the numerical value m', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-1), plural numerical value n' may be identical to or different from one another, each independently represents a value of from 0 to 100, preferably a value of from 0 to 50. Herein, the numerical value n' represents an average number of the unit $—CH_2—CH_2—O—$, and thus could be a non-integer or an integer. As the numerical value n', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-1), plural numerical value m" may be identical to or different from one another, each independently represents a value of from 0 to 100, preferably a value of from 0 to 50. Herein, the numerical value m" represents an average number of the unit

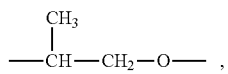

and thus could be a non-integer or an integer. As the numerical value m", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-1), plural numerical value n" may be identical to or different from one another, each independently represents a value of from 0 to 100, preferably a value of from 0 to 50. Herein, the numerical value n" represents an average number of the unit $—CH_2—CH_2—O—$, and thus could be a non-integer or an integer. As the numerical value n", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-1), it is required that the sum of all (i.e. corresponding to x') numerical values m' and all (i.e. corresponding to x'×a) numerical values m" (i.e. throughout the molecular structure of the compound represented by the formula (I-1), the overall average number of the unit

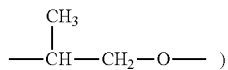)

is greater than 0 but not greater than 100, preferably greater than 0 but not greater than 50. In this context, throughout the molecular structure of the compound represented by the formula (I-1), it is necessary to contain (a certain amount of) the unit

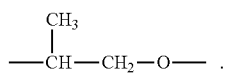.

Herein, throughout the molecular structure of the compound represented by the formula (I-1), as the overall average number of the unit

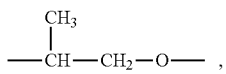

for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-1), it is required that the sum of all (i.e. corresponding to x') numerical value n' and all (i.e. corresponding to x'×a) numerical value n'' (i.e. throughout the molecular structure of the compound represented by the formula (I-1), the overall average number of the unit) —$CH_2$—$CH_2$—O—) is not greater than 100, preferably not greater than 50. As the overall average number of the unit —$CH_2$—$CH_2$—O—, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to an embodiment of this invention, preferably, in the formula (I-1), the sum of all (i.e. corresponding to x') numerical value n' and all (i.e. corresponding to x'×a) numerical values n'' (i.e. throughout the molecular structure of the compound represented by the formula (I-1), the overall average number of the unit —$CH_2$—$CH_2$—O—) is greater than 0. In this context, throughout the molecular structure of the compound represented by the formula (I-1), it is preferred to contain (a certain amount of) the unit —$CH_2$—$CH_2$—O—. Herein, throughout the molecular structure of the compound represented by the formula (I-1), as the overall average number of the unit —$CH_2$—$CH_2$—O—, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-1), plural group L may be identical to or different from one another, each independently selected from the group consisting of an optionally substituted $C_{1-10}$ linear or branched alkylene and an optionally substituted $C_{2-10}$ linear or branched alkenylene, preferably each independently represents an optionally substituted $C_{1-5}$ linear or branched alkylene.

According to this invention, in the formula (I-1), plural group Salt may be identical to or different from one another, each independently represents a group represented by the formula -$A^-(M)_r^+$, wherein the group $A^-$ represents a carboxylate ion ($COO^-$) or a sulfonate ion ($SO_3^-$), the group M represents alkaline metal (preferably Li, Na or K), alkaline earth metal (preferably Mg or Ca) or ammonium ($NH_4$). When the group M represents alkali metal or ammonium, r=1; when the group M represents alkaline earth metal, r=0.5.

According to this invention, in the formula (I-1), depending on the total number of the group Salt, the group $A^-$ could be one or more in number, wherein at least one out of the group $A^-$ represents the carboxylate ion ($COO^-$). In this context, throughout the molecular structure of the compound represented by the formula (I-1), it is necessary to exist at least one carboxylate ion ($COO^-$).

(I-2)

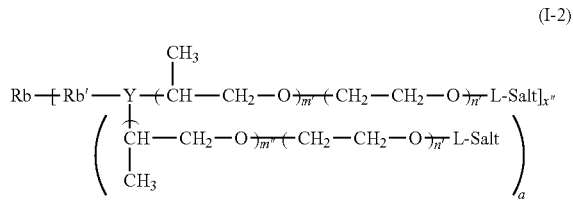

According to this invention, in the formula (I-2), the group Rb represents an optionally substituted $C_{1-50}$ linear or branched alkyl, an optionally substituted $C_{5-50}$ monocyclic or polycyclic cycloalkyl or an optionally substituted $C_{2-50}$ linear or branched alkenyl, preferably an optionally substituted $C_{1-29}$ linear or branched alkyl, an optionally substituted $C_{5-10}$ monocyclic or polycyclic cycloalkyl or an optionally substituted $C_{2-29}$ linear or branched alkenyl, more preferably an optionally substituted $C_{5-20}$ linear or branched alkyl, an optionally substituted $C_{5-8}$ monocyclic or polycyclic cycloalkyl or an optionally substituted $C_{5-20}$ linear or branched alkenyl, more preferably an optionally substituted $C_{8-20}$ linear or branched alkyl, an optionally substituted $C_{5-7}$ monocyclic cycloalkyl (for example, cyclohexyl) or an optionally substituted $C_{8-20}$ linear or branched alkenyl.

According to this invention, in the formula (I-2), plural group Rb' may be identical to or different from one another, each independently selected from the group consisting of a single bond and carbonyl.

According to this invention, in the formula (I-2), plural group Y may be identical to or different from one another, each independently selected from the group consisting of N and O, with the proviso that when the group Y represents N, a=1, when the group Y represents O, a=0.

According to this invention, in the formula (I-2), the numerical value x'' represents the number of the group

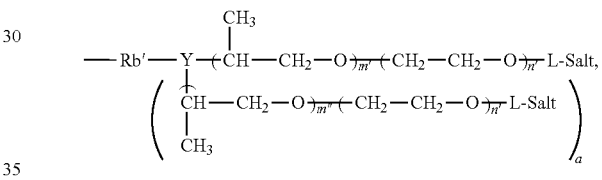

which is an integer of from 1 to 10, preferably an integer from 1 to 4, for example, 2, 3 or 4.

According to this invention, in the formula (I-2), plural numerical value m' may be identical to or different from one another, each independently represents a value of from 0 to 100, preferably a value of from 0 to 50. Herein, the numerical value m' represents an average number of the unit

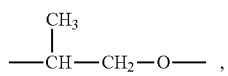

and thus could be a non-integer or an integer. As the numerical value m', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-2), plural numerical value n' may be identical to or different from one another, each independently represents a value of from 0 to 100, preferably a value of from 0 to 50. Herein, the numerical value n' represents an average number of the unit —$CH_2$—$CH_2$—O—, and thus could be a non-integer or an integer. As the numerical value n', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-2), plural numerical value m'' may be identical to or different from one another, each independently represents a value of from 0 to 100, preferably a value of from 0 to 50. Herein, the numerical value m'' represents an average number of the unit

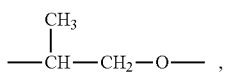

and thus could be a non-integer or an integer. As the numerical value m", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-2), plural numerical value n" may be identical to or different from one another, each independently represents a value of from 0 to 100, preferably a value of from 0 to 50. Herein, the numerical value n" represents an average number of the unit —$CH_2$—$CH_2$—O—, and thus could be a non-integer or an integer. As the numerical value n", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-2), it is required that the sum of all (i.e. corresponding to x") numerical values m' and all (i.e. corresponding to x"×a) numerical values m" (i.e. throughout the molecular structure of the compound represented by the formula (I-2), the overall average number of the unit

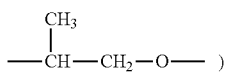

is greater than 0 but not greater than 100, preferably greater than 0 but not greater than 50. In this context, throughout the molecular structure of the compound represented by the formula (I-2), it is necessary to contain (a certain amount of) the unit

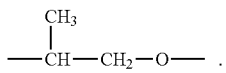

Herein, throughout the molecular structure of the compound represented by the formula (I-2), as the overall average number of the unit

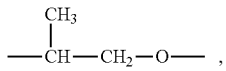

for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-2), it is required that the sum of all (i.e. corresponding to x") numerical values n' and all (i.e. corresponding to x"×a) numerical values n" (i.e. throughout the molecular structure of the compound represented by the formula (I-2), the overall average number of the unit —$CH_2$—$CH_2$—O—) is not greater than 100, preferably not greater than 50. As the overall average number of the unit —$CH_2$—$CH_2$—O—, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to an embodiment of this invention, preferably, in the formula (I-2), the sum of all (i.e. corresponding to x") numerical values n' and all (i.e. corresponding to x"×a) numerical values n" (i.e. throughout the molecular structure of the compound represented by the formula (I-2), the overall average number of the unit —$CH_2$—$CH_2$—O—) is greater than 0. In this context, throughout the molecular structure of the compound represented by the formula (I-2), it is preferred to contain (a certain amount of) the unit —$CH_2$—$CH_2$—O—. Herein, throughout the molecular structure of the compound represented by the formula (I-2), as the overall average number of the unit —$CH_2$—$CH_2$—O—, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-2), plural group L may be identical to or different from one another, each independently selected from the group consisting of an optionally substituted $C_{1-10}$ linear or branched alkylene and an optionally substituted $C_{2-10}$ linear or branched alkenylene, preferably each independently represents an optionally substituted $C_{1-5}$ linear or branched alkylene.

According to this invention, in the formula (I-2), plural group Salt may be identical to or different from one another, each independently represents a group represented by the formula -$A^-(M)_r^+$, wherein the group $A^-$ represents a carboxylate ion ($COO^-$) or a sulfonate ion ($SO_3^-$), the group M represents alkali metal (preferably Li, Na or K), alkaline earth metal (preferably Mg or Ca) or ammonium ($NH_4$). When the group M represents alkali metal or ammonium, r=1; when the group M represents alkaline earth metal, r=0.5.

According to this invention, in the formula (I-2), depending on the total number of the group Salt, the group $A^-$ could be one or more in number, wherein at least one out of the group $A^-$ represents the carboxylate ion ($COO^-$). In this context, throughout the molecular structure of the compound represented by the formula (I-2), it is necessary to exist at least one carboxylate ion ($COO^-$).

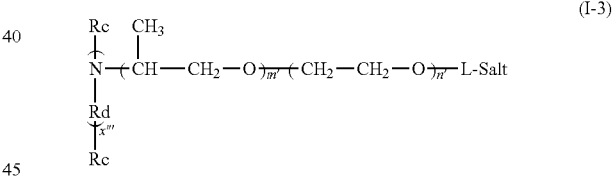

According to this invention, in the formula (I-3), plural group Rc may be identical to or different from one another, each independently selected from the group consisting of an optionally substituted $C_{1-20}$ linear or branched alkyl, an optionally substituted $C_{2-20}$ linear or branched alkenyl, an optionally substituted $C_{1-20}$ linear or branched alkyl carbonyl and an optionally substituted $C_{2-20}$ linear or branched alkenyl carbonyl, preferably each independently selected from the group consisting of an optionally substituted $C_{5-20}$ linear or branched alkyl, an optionally substituted $C_{5-20}$ linear or branched alkenyl, an optionally substituted $C_{5-20}$ linear or branched alkyl carbonyl and an optionally substituted $C_{5-20}$ linear or branched alkenyl carbonyl, more preferably each independently selected from the group consisting of an optionally substituted $C_{8-20}$ linear or branched alkyl, an optionally substituted $C_{8-20}$ linear or branched alkenyl, an optionally substituted $C_{8-20}$ linear or branched alkyl carbonyl and an optionally substituted $C_{8-20}$ linear or branched alkenyl carbonyl.

According to this invention, in the formula (I-3), plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl, preferably each independently selected from the group consisting of an optionally substituted $C_{1-5}$ linear or branched alkylene and an optionally substituted $C_{1-5}$ linear or branched alkylene carbonyl.

According to this invention, in the formula (I-3), the numerical value x''' represents the number of the unit

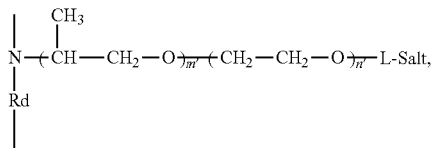

which is an integer of from 1 to 10, preferably an integer from 1 to 4, for example, 2, 3 or 4.

According to this invention, in the formula (I-3), plural numerical value m' may be identical to or different from one another, each independently represents a value of from 0 to 100, preferably a value of from 0 to 50. Herein, the numerical value m' represents an average number of the unit

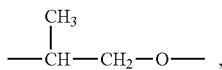

and thus could be a non-integer or an integer. As the numerical value m', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-3), plural numerical value n' may be identical to or different from one another, each independently represents a value of from 0 to 100, preferably a value of from 0 to 50. Herein, the numerical value n' represents an average number of the unit —$CH_2$—$CH_2$—O—, and thus could be a non-integer or an integer. As the numerical value n', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-3), it is required that the sum of all (i.e. corresponding to x''') numerical values m' (i.e. throughout the molecular structure of the compound represented by the formula (I-3), the overall average number of the unit

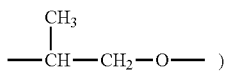

is greater than 0 but not greater than 100, preferably greater than 0 but not greater than 50. In this context, throughout the molecular structure of the compound represented by the formula (I-3), it is necessary to contain (a certain amount of) the unit

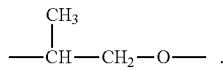

Herein, throughout the molecular structure of the compound represented by the formula (I-3), as the overall average number of the unit

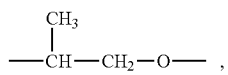

for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-3), it is required that the sum of all (i.e. corresponding to x''') numerical values n' (i.e. throughout the molecular structure of the compound represented by the formula (I-3), the overall average number of the unit —$CH_2$—$CH_2$—O—) is not greater than 100, preferably not greater than 50. As the overall average number of the unit —$CH_2$—$CH_2$—O—, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to an embodiment of this invention, preferably, in the formula (I-3), the sum of all (i.e. corresponding to x''') numerical values n' (i.e. throughout the molecular structure of the compound represented by the formula (I-3), the overall average number of the unit —$CH_2$—$CH_2$—O—) is greater than 0. In this context, throughout the molecular structure of the compound represented by the formula (I-3), it is preferred to contain (a certain amount of) the unit —$CH_2$—$CH_2$—O—. Herein, throughout the molecular structure of the compound represented by the formula (I-3), as the overall average number of the unit —$CH_2$—$CH_2$—O—, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-3), plural group L may be identical to or different from one another, each independently selected from the group consisting of an optionally substituted $C_{1-10}$ linear or branched alkylene and an optionally substituted $C_{2-10}$ linear or branched alkenylene, preferably each independently represents an optionally substituted $C_{1-5}$ linear or branched alkylene.

According to this invention, in the formula (I-3), plural group Salt may be identical to or different from one another, each independently represents a group represented by the formula -$A^-(M)_r^+$, wherein the group $A^-$ represents a carboxylate ion ($COO^-$) or a sulfonate ion ($SO_3^-$), the group M represents alkali metal (preferably Li, Na or K), alkaline earth metal (preferably Mg or Ca) or ammonium ($NH_4$). When the group M represents alkali metal or ammonium, r=1; when the group M represents alkaline earth metal, r=0.5.

According to this invention, in the formula (I-3), depending on the total number of the group Salt, the group $A^-$ could be one or more in number, wherein at least one out of the group $A^-$ represents the carboxylate ion ($COO^-$). In this context, throughout the molecular structure of the compound represented by the formula (I-3), it is necessary to exist at least one carboxylate ion ($COO^-$).

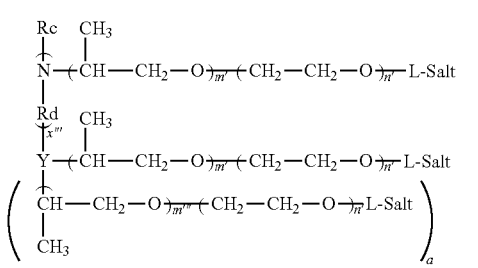

(I-4)

According to this invention, in the formula (I-4), the group Rc represents an optionally substituted $C_{1-20}$ linear or branched alkyl, an optionally substituted $C_{2-20}$ linear or branched alkenyl, an optionally substituted $C_{1-20}$ linear or branched alkyl carbonyl or an optionally substituted $C_{2-20}$ linear or branched alkenyl carbonyl, preferably an optionally substituted $C_{5-20}$ linear or branched alkyl, an optionally substituted $C_{5-20}$ linear or branched alkenyl, an optionally substituted $C_{5-20}$ linear or branched alkyl carbonyl or an optionally substituted $C_{5-20}$ linear or branched alkenyl carbonyl, more preferably an optionally substituted $C_{8-20}$ linear or branched alkyl, an optionally substituted $C_{8-20}$ linear or branched alkenyl, an optionally substituted $C_{8-20}$ linear or branched alkyl carbonyl or an optionally substituted $C_{8-20}$ linear or branched alkenyl carbonyl.

According to this invention, in the formula (I-4), plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl, preferably each independently selected from the group consisting of an optionally substituted $C_{1-5}$ linear or branched alkylene and an optionally substituted $C_{1-5}$ linear or branched alkylene carbonyl.

According to this invention, in the formula (I-4), the group Y represents N or O, with the proviso that when the group Y represents N, a=1, when the group Y represents O, a=0.

According to this invention, in the formula (I-4), the numerical value x"" represents the number of the unit

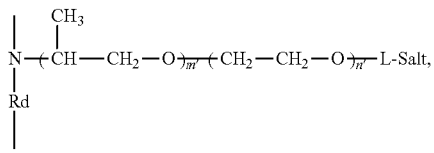

which is an integer of from 1 to 9, preferably an integer from 1 to 3, more preferably 1 or 2.

According to this invention, in the formula (I-4), plural numerical value m' may be identical to or different from one another, each independently represents a value of from 0 to 100, preferably a value of from 0 to 50. Herein, the numerical value m' represents an average number of the unit

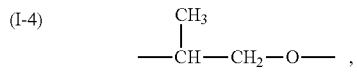

and thus could be a non-integer or an integer. As the numerical value m', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), plural numerical value n' may be identical to or different from one another, each independently represents a value of from 0 to 100, preferably a value of from 0 to 50. Herein, the numerical value n' represents an average number of the unit —$CH_2$—$CH_2$—O—, and thus could be a non-integer or an integer. As the numerical value n', for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), plural numerical value m" may be identical to or different from one another, each independently represents a value of from 0 to 100, preferably a value of from 0 to 50. Herein, the numerical value m" represents an average number of the unit

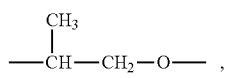

and thus could be a non-integer or an integer. As the numerical value m", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), plural numerical value n" may be identical to or different from one another, each independently represents a value of from 0 to 100, preferably a value of from 0 to 50. Herein, the numerical value n" represents an average number of the unit —$CH_2$—$CH_2$—O—, and thus could be a non-integer or an integer. As the numerical value n", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), plural numerical value m'" may be identical to or different from one another, each independently represents a value of from 0 to 100, preferably a value of from 0 to 50. Herein, the numerical value m'" represents an average number of the unit

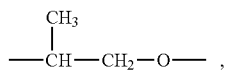

and thus could be a non-integer or an integer. As the numerical value m'", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), plural numerical value n'" may be identical to or different from one another, each independently represents a value of from 0 to 100, preferably a value of from 0 to 50. Herein, the numerical value n'" represents an average number of the unit —$CH_2$—$CH_2$—O—, and thus could be a non-integer or an integer. As the numerical value n", for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), it is required that the sum of all (i.e. corresponding to x'''') numerical values m', all (i.e. corresponding to 1) numerical value m'' and all (i.e. corresponding to a) numerical values m''' (i.e. throughout the molecular structure of the compound represented by the formula (I-4), the overall average number of the unit

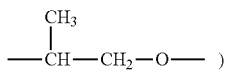  )

is greater than 0 but not greater than 100, preferably greater than 0 but not greater than 50. In this context, throughout the molecular structure of the compound represented by the formula (I-4), it is necessary to contain (a certain amount of) the unit

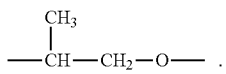 .

Herein, throughout the molecular structure of the compound represented by the formula (I-4), as the overall average number of the unit

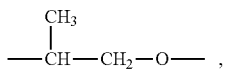 , for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), it is required that the sum of all (i.e. corresponding to x'''') numerical values n', all (i.e. corresponding to 1) numerical values n'' and all (i.e. corresponding to a) numerical values n''' (i.e. throughout the molecular structure of the compound represented by the formula (I-4), the overall average number of the unit —$CH_2$—$CH_2$—O—) is not greater than 100, preferably not greater than 50. As the overall average number of the unit —$CH_2$—$CH_2$—O—, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to an embodiment of this invention, preferably, in the formula (I-4), the sum of all (i.e. corresponding to x'''') numerical values n', all (i.e. corresponding to 1) numerical values n'' and all (i.e. corresponding to a) numerical values n''' (i.e. throughout the molecular structure of the compound represented by the formula (I-4), the overall average number of the unit —$CH_2$—$CH_2$—O—) is greater than 0. In this context, throughout the molecular structure of the compound represented by the formula (I-4), it is preferred to contain (a certain amount of) the unit —$CH_2$—$CH_2$—O—. Herein, throughout the molecular structure of the compound represented by the formula (I-4), as the overall average number of the unit —$CH_2$—$CH_2$—O—, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (I-4), plural group L may be identical to or different from one another, each independently selected from the group consisting of an optionally substituted $C_{1-10}$ linear or branched alkylene and an optionally substituted $C_{2-10}$ linear or branched alkenylene, preferably an optionally substituted $C_{1-5}$ linear or branched alkylene.

According to this invention, in the formula (I-4), plural group Salt may be identical to or different from one another, each independently represents a group represented by the formula -$A^-(M)_r^+$, wherein the group $A^-$ represents a carboxylate ion ($COO^-$) or a sulfonate ion ($SO_3^-$), the group M represents alkali metal (preferably Li, Na or K), alkaline earth metal (preferably Mg or Ca) or ammonium ($NH_4$). when the group M represents alkali metal or ammonium, r=1; when the group M represents alkaline earth metal, r=0.5.

According to this invention, in the formula (I-4), depending on the total number of the group Salt, the group $A^-$ could be one or more in number, wherein at least one out of the group $A^-$ represents the carboxylate ion ($COO^-$). In this context, throughout the molecular structure of the compound represented by the formula (I-4), it is necessary to exist at least one carboxylate ion ($COO^-$).

According to this invention, in the formula (I-1), the formula (I-2), the formula (I-3) and the formula (I-4), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. As the substituent, preference is given to a $C_{5-15}$ linear or branched alkyl, more preferably a $C_{5-10}$ linear or branched alkyl or methyl or ethyl.

According to this invention, the anionic-nonionic surfactant or the compound represented by the formula (I) may be commercially available, or could be produced in any conventional manner, for example, in line with a process comprising the following Step (1) and Step (2).

Step (1): reacting one or more multifunctional compound carrying one or more functional group selected from the group consisting of —OH, —$NH_2$ and —NH— with one or more alkylene oxide represented by the following formula (Y) in the presence of an alkaline catalyst, to obtain an ether product.

(Y)

According to this invention, in the formula (Y), the group Ru' represents a $C_{2-6}$ linear or branched alkylene, wherein preference is given to —$CH_2$—$CH_2$— and/or —$CH_2$—CH($CH_3$)—, more preferably a combination of —$CH_2$—$CH_2$— and —$CH_2$—CH($CH_3$)—.

According to this invention, in Step (1), as the alkylene oxide represented by the formula (Y), for example, there may be exemplified ethylene oxide, propylene oxide, butylene oxide, hexene oxide, and so on. As these alkylene oxides, one kind or a mixture of two or more kinds at any ratio therebetween could be used, for example, a combination of propylene oxide and ethylene oxide.

According to this invention, one or more of the alkylene oxide represented by the formula (Y) is used, with the proviso that the alkylene oxide comprises at least propylene oxide. The propylene oxide could if needed be used in combination with any other alkylene oxide represented by the formula (Y) (especially ethylene oxide). In this combination, the ratio by molar of propylene oxide to said other alkylene oxide represented by the formula (Y) (especially ethylene oxide), for example, could be 1:0.1-10, but not limiting thereto.

According to this invention, in Step (1), as the alkaline catalyst, any alkaline catalyst conventionally used in this field for a similar purpose may be used as such, wherein preference is given to alkali metal hydroxide, especially NaOH or KOH. As the alkaline catalyst, one kind or a mixture of two or more kinds at any ratio therebetween could be used.

According to this invention, in Step (1), as the amount of the alkaline catalyst to be used, any amount conventionally used in this field may be mentioned, but could be generally determined such that the ratio by molar of the multifunctional compound and the alkaline catalyst is 1:0.001-10, preferably 1:0.001-5.

According to this invention, in Step (1), the ratio by molar of the multifunctional compound and the alkylene oxide could be generally 1:0-200, preferably 1:0-100, excluding 0, more preferably 1:0.1-50.

According to this invention, in Step (1), the reaction temperature could be generally from the room temperature to 300 degrees Celsius, preferably 100-200 degrees Celsius, the reaction duration could be generally 1-20 h, preferably from 1 to 10 h, while the reaction pressure could be any pressure suitable for this reaction, for example, the normal pressure.

According to a preferred embodiment of this invention, in Step (1), as the alkylene oxide represented by the formula (Y), if two or more thereof are used in combination (comprising at least propylene oxide), the multifunctional compound is made to firstly react with (at least a partial or whole amount of) propylene oxide, then (preferably after partial or total completion of the reaction with propylene oxide) with any other alkylene oxide (for example, ethylene oxide).

According to this invention, upon completion of Step (1), the thus obtained reaction product mixture could be used as such as the ether product for the succeeding Step (2), without any separation or purification thereto.

According to this invention, in Step (1), as the multifunctional compound, any compound carrying one or more (for example, from 1 to 10, preferably from 1 to 4, for example, 2, 3 or 4) functional group selected from the group consisting of —OH, —NH$_2$ and —NH— could be used, without any specific limitation thereto. The functional group has an active hydrogen, which is capable of initiating the ring open (polymerization) reaction of the alkylene oxide, whereby introducing a (poly)ether segment into the molecular structure of the multifunctional compound. As the multifunctional compound, one kind or a mixture of two or more kinds at any ratio therebetween could be used. Further, the multifunctional compound may be commercially available, or could be produced in a conventional manner.

According to this invention, in Step (1), as the multifunctional compound, there is specifically exemplified a compound represented by the following formula (X). As the compound represented by the formula (X), one kind or a mixture of two or more kinds at any ratio therebetween could be used.

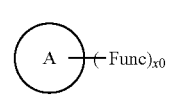

(X)

According to this invention, in the formula (X), the group

represents an optionally substituted x0 valent $C_{1-50}$ linear or branched alkyl, an optionally substituted x0 valent $C_{5-50}$ monocyclic or polycyclic cycloalkyl, an optionally substituted x0 valent $C_{2-50}$ linear or branched alkenyl, an optionally substituted x0 valent $C_{6-50}$ aryl or an optionally substituted x0 valent $C_{3-50}$ linear or branched heteroalkyl. As the optionally substituted x0 valent $C_{1-50}$ linear or branched alkyl, it is preferably an optionally substituted x0 valent $C_{5-20}$ linear or branched alkyl, a x0 valent $C_{8-50}$ linear or branched alkyl or a x0 valent $C_{8-20}$ linear or branched alkyl. As the optionally substituted x0 valent $C_{5-50}$ monocyclic or polycyclic cycloalkyl, for example, there may be exemplified an optionally substituted x0 valent $C_{5-10}$ monocyclic or polycyclic cycloalkyl, an optionally substituted x0 valent $C_{5-8}$ monocyclic or polycyclic cycloalkyl or an optionally substituted x0 valent $C_{5-7}$ monocyclic or polycyclic cycloalkyl, especially an optionally substituted x0 valent $C_{5-7}$ monocyclic cycloalkyl. As the optionally substituted x0 valent $C_{2-50}$ linear or branched alkenyl, it is preferably an optionally substituted x0 valent $C_{5-20}$ linear or branched alkenyl, an optionally substituted x0 valent $C_{8-50}$ linear or branched alkenyl or an optionally substituted x0 valent $C_{8-20}$ linear or branched alkenyl. As the optionally substituted x0 valent $C_{6-50}$ aryl, it is preferably an optionally substituted x0 valent $C_{6-20}$ aryl. As the optionally substituted x0 valent $C_{3-50}$ linear or branched heteroalkyl, it is preferably an optionally substituted x0 valent $C_{8-50}$ linear or branched heteroalkyl or an optionally substituted x0 valent $C_{8-20}$ linear or branched heteroalkyl.

According to this invention, in the formula (X), plural group Func may be identical to or different from one another, each independently selected from the group consisting of —OH, —NH— and —NH$_2$, preferably each independently selected from the group consisting of —OH and —NH$_2$.

According to this invention, in the formula (X), the numerical value x0 generally represents the valence of the group

, which is an integer of from 1 to 10, preferably an integer from 1 to 4, for example, 2, 3 or 4. However, it is reasonable to a person skilled in the art that when the group Func represents —NH—, the group

is to be interrupted by this —NH— at any (acceptable) position. Herein, the numerical value x0 (or at least a part thereof, depending on the total number of —NH—) represents how many times this interruption occurs (hereinafter referred to as interruption number), and accordingly, does not represent the valence of the group

any more. In this context, the valence of the group

could be reduced to a value of as low as 0, for example, in the case that all (i.e. x0 in total) of the group Func represent —NH—. When plural —NH— exist, the group

is to be interrupted by these groups —NH— at any (acceptable) position for a corresponding number of times. By interruption, it means that the group —NH— enters inside the molecular structure of the group

rather than locates at a terminal of the main chain or any side chain in the molecular structure thereof. It is preferred that two or more of these groups —NH— do not directly bond to one another. Specifically, assuming that the group Func is —NH—, x0 is 1 (with an interruption number of 1), while the group

represents a $C_4$ linear alkane (i.e. a 0 valent $C_4$ linear alkyl)

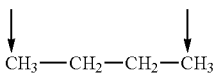

(the terminals of the main chain in the molecular structure being indicated by the arrow marks in the formula), the compound represented by the formula (X) could be $CH_3$—$CH_2$—NH—$CH_2$—$CH_3$ or $CH_3$—$CH_2$—$CH_2$—NH—$CH_3$.

According to this invention, in the formula (X), in the definition of the group

by optionally substituted, it refers to optionally substituted by one or more (for example, from 1 to 5, from 1 to 4, from 1 to 3, from 1 to 2 or 1) substituent selected from the group consisting of oxo

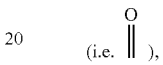

hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. As the substituent, it is preferably a $C_{5-15}$ linear or branched alkyl, more preferably a $C_{5-10}$ linear or branched alkyl, or methyl or ethyl.

According to an embodiment of this invention (referred to as Embodiment A), in the formula (X), in the definition of the group

when oxo exists as the substituent, it is preferred that at least one oxo exists on the carbon atom directly bonding to a N atom (if any, for example, a N atom originated from a linear or branched heteroalkyl), so as to make the carbon atom to present in the form of carbonyl

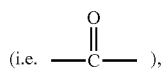

whereby introducing a structure (for example, imido) of carbonyl directly bonding to a N atom into the molecular structure of the compound represented by the formula (X). Further, to provide better hydrolysis resistance or chemical resistance, it is preferred that there is no oxo as the substituent on at least a part (preferably all) of the carbon atoms directly bonding to an O or S atom (if any), and/or, on at least a part of (preferably all) of the terminal carbon atom (i.e. the carbon atom at a free end and/or a un-bonded position of the molecular chain) (excluding any terminal carbon atom directly bonding to the group Func in the group

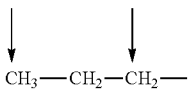

when the group Func represents —NH— or —NH$_2$, see the Embodiment B hereinafter), and/or, two carbon atoms directly bonding to each other are not substituted by oxo simultaneously. By doing so, no chemically active or unstable group like an ester or aldehyde group will be introduced into the molecular structure of the compound represented by the formula (X). Specifically, assuming that the group

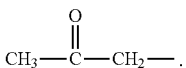

represents a 1 valent linear alkyl $$CH_3-CH_2-CH_2-$$

(comprising two terminal carbon atoms as indicated by the arrow marks in the formula) substituted by oxo, this group is preferably

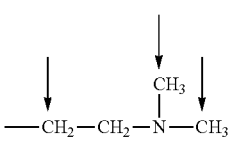

Or, assuming that the group

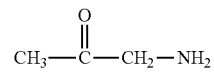

represents a 1 valent branched heteroalkyl $$-CH_2-CH_2-N(CH_3)-CH_3$$

(comprising three terminal carbon atoms as indicated by the arrow marks in the formula, also comprising three carbon atoms directly bonding to a N atom) substituted by oxo, this group is preferably

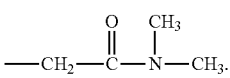

According to an embodiment of this invention (referred to as Embodiment B), when the group Func represents —NH— or —NH$_2$, in the formula (X), when oxo exists as the substituent, it is preferred that at least one oxo is positioned at the carbon atom directly bonding to the group Func, or in other words, at least one out of all carbon atoms directly bonding to the group Func has oxo thereon as the substituent, whereby introducing into the compound represented by the formula (X) a moiety (for example, amido) formed by directly bonding carbonyl to a N atom. Specifically, assuming that the group

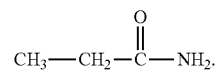

represents a 1 valent linear alkyl CH$_3$—CH$_2$—CH$_2$— substituted by oxo, the group Func represents —NH$_2$, then the compound represented by the formula (X), in addition to the $$CH_3-\overset{O}{\underset{\|}{C}}-CH_2-NH_2$$

preferred by Embodiment A, could be further $$CH_3-CH_2-\overset{O}{\underset{\|}{C}}-NH_2.$$

According to this invention, in Step (1), as the multifunctional compound, there may be exemplified a compound represented by the following formula (X-1), a compound represented by the following formula (X-2), a compound represented by the following formula (X-3) and a compound represented by the following formula (X-4). As the compound, one kind or a mixture of two or more kinds at any ratio therebetween could be used.

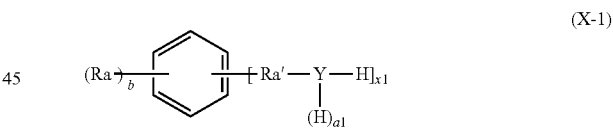

(X-1)

According to this invention, in the formula (X-1), plural group Ra may be identical to or different from one another, each independently selected from the group consisting of an optionally substituted C$_{1-20}$ linear or branched alkyl, an optionally substituted C$_{2-20}$ linear or branched alkenyl and an optionally substituted C$_{6-10}$ aryl, preferably an optionally substituted C$_{5-15}$ linear or branched alkyl and an optionally substituted C$_{6-10}$ aryl.

According to this invention, in the formula (X-1), plural group Ra' may be identical to or different from one another, each independently selected from the group consisting of a single bond, an optionally substituted C$_{1-10}$ linear or branched alkylene, an optionally substituted C$_{2-10}$ linear or branched alkenylene, carbonyl, an optionally substituted C$_{1-10}$ linear or branched alkylene carbonyl and an optionally substituted C$_{2-10}$ linear or branched alkenylene carbonyl, preferably each independently selected from the group consisting of a single bond and an optionally substituted C$_{1-6}$ linear or branched alkylene.

According to this invention, in the formula (X-1), the numerical value b represents an integer of from 0 to 3, preferably 1.

According to this invention, in the formula (X-1), the numerical value x1 represents the number of the group

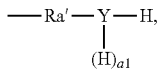

which is an integer from 1 to 6, preferably an integer from 1 to 4, for example, 2, 3 or 4. Obviously, $b+x1 \leq 6$.

According to this invention, in the formula (X-1), plural group Y may be identical to or different from one another, each independently selected from the group consisting of N and O, with the proviso that when the group Y represents N, a1=1, when the group Y represents O, a1=0.

According to this invention, in the formula (X-1), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. As the substituent, it is preferably a $C_{5-15}$ linear or branched alkyl, more preferably a $C_{5-10}$ linear or branched alkyl, or methyl or ethyl.

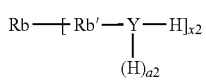

According to this invention, in the formula (X-2), the group Rb represents an optionally substituted $C_{1-50}$ linear or branched alkyl, an optionally substituted $C_{5-50}$ monocyclic or polycyclic cycloalkyl or an optionally substituted $C_{2-50}$ linear or branched alkenyl, preferably an optionally substituted $C_{1-29}$ linear or branched alkyl, an optionally substituted $C_{5-10}$ monocyclic or polycyclic cycloalkyl or an optionally substituted $C_{2-29}$ linear or branched alkenyl, more preferably an optionally substituted $C_{5-20}$ linear or branched alkyl, an optionally substituted $C_{5-8}$ monocyclic or polycyclic cycloalkyl or an optionally substituted $C_{5-20}$ linear or branched alkenyl, more preferably an optionally substituted $C_{8-20}$ linear or branched alkyl, an optionally substituted $C_{5-7}$ monocyclic cycloalkyl (for example, cyclohexyl) or an optionally substituted $C_{8-20}$ linear or branched alkenyl.

According to this invention, in the formula (X-2), plural group Rb' may be identical to or different from one another, each independently selected from the group consisting of a single bond and carbonyl.

According to this invention, in the formula (X-2), plural group Y may be identical to or different from one another, each independently selected from the group consisting of N and O, with the proviso that when the group Y represents N, a2=1, when the group Y represents O, a2=0.

According to this invention, in the formula (X-2), the numerical value x2 represents the number of the group

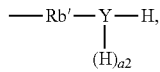

which is an integer of from 1 to 10, preferably an integer from 1 to 4, for example, 2, 3 or 4.

According to this invention, in the formula (X-2), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. As the substituent, it is preferably a $C_{5-15}$ linear or branched alkyl, more preferably a $C_{5-10}$ linear or branched alkyl, or methyl or ethyl.

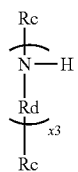

According to this invention, in the formula (X-3), plural group Rc may be identical to or different from one another, each independently selected from the group consisting of an optionally substituted $C_{1-20}$ linear or branched alkyl, an optionally substituted $C_{2-20}$ linear or branched alkenyl, an optionally substituted $C_{1-20}$ linear or branched alkyl carbonyl and an optionally substituted $C_{2-20}$ linear or branched alkenyl carbonyl, preferably each independently selected from the group consisting of an optionally substituted $C_{5-20}$ linear or branched alkyl, an optionally substituted $C_{5-20}$ linear or branched alkenyl, an optionally substituted $C_{5-20}$ linear or branched alkyl carbonyl and an optionally substituted $C_{5-20}$ linear or branched alkenyl carbonyl, more preferably each independently selected from the group consisting of an optionally substituted $C_{8-20}$ linear or branched alkyl, an optionally substituted $C_{8-20}$ linear or branched alkenyl, an optionally substituted $C_{8-20}$ linear or branched alkyl carbonyl and an optionally substituted $C_{8-20}$ linear or branched alkenyl carbonyl.

According to this invention, in the formula (X-3), plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl, preferably each independently selected from the group consisting of an optionally substituted $C_{1-5}$ linear or branched alkylene and an optionally substituted $C_{1-5}$ linear or branched alkylene carbonyl.

According to this invention, in the formula (X-3), the numerical value x3 represents the number of the unit

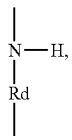

which is an integer of from 1 to 10, preferably an integer from 1 to 4, for example, 2, 3 or 4.

According to this invention, in the formula (X-3), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. As the substituent, it is preferably a $C_{5-15}$ linear or branched alkyl, more preferably a $C_{5-10}$ linear or branched alkyl, or methyl or ethyl.

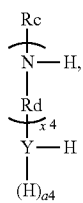

(X-4)

According to this invention, in the formula (X-4), the group Rc represents an optionally substituted $C_{1-20}$ linear or branched alkyl, an optionally substituted $C_{2-20}$ linear or branched alkenyl, an optionally substituted $C_{1-20}$ linear or branched alkyl carbonyl or an optionally substituted $C_{2-20}$ linear or branched alkenyl carbonyl, preferably each independently represents an optionally substituted $C_{5-20}$ linear or branched alkyl, an optionally substituted $C_{5-20}$ linear or branched alkenyl, an optionally substituted $C_{5-20}$ linear or branched alkyl carbonyl or an optionally substituted $C_{5-20}$ linear or branched alkenyl carbonyl, more preferably each independently represents an optionally substituted $C_{8-20}$ linear or branched alkyl, an optionally substituted $C_{8-20}$ linear or branched alkenyl, an optionally substituted $C_{8-20}$ linear or branched alkyl carbonyl or an optionally substituted $C_{8-20}$ linear or branched alkenyl carbonyl.

According to this invention, in the formula (X-4), plural group Rd may be identical to or different from one another, each independently selected from the group consisting of an optionally substituted $C_{1-10}$ linear or branched alkylene, an optionally substituted $C_{2-10}$ linear or branched alkenylene, an optionally substituted $C_{1-10}$ linear or branched alkylene carbonyl, an optionally substituted $C_{2-10}$ linear or branched alkenylene carbonyl, an optionally substituted carbonyl $C_{1-10}$ linear or branched alkylene carbonyl and an optionally substituted carbonyl $C_{2-10}$ linear or branched alkenylene carbonyl, preferably each independently selected from the group consisting of an optionally substituted $C_{1-5}$ linear or branched alkylene and an optionally substituted $C_{1-5}$ linear or branched alkylene carbonyl.

According to this invention, in the formula (X-4), the group Y represents N or O, with the proviso that when the group Y represents N, a4=1, when the group Y represents O, a4=0.

According to this invention, in the formula (X-4), the numerical value x4 represents the number of the unit

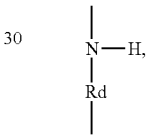

which is an integer of from 1 to 9, preferably an integer from 1 to 3, more preferably 1 or 2.

According to this invention, in the formula (X-4), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. As the substituent, it is preferably a $C_{5-15}$ linear or branched alkyl, more preferably a $C_{5-10}$ linear or branched alkyl, or methyl or ethyl.

According to this invention, the aforesaid multifunctional compound, the compound represented by the formula (X), the compound represented by the formula (X-1), the compound represented by the formula (X-2), the compound represented by the formula (X-3) or the compound represented by the formula (X-4), could be commercially available or produced in any conventional manner. For example, the compound represented by the formula (X-2) (wherein, Y=N, Rb' is carbonyl), i.e.

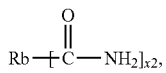

could be produced by reacting a compound represented by the following formula (X-2-1) (wherein, the group Rb and the numerical value x2 are as defined in the formula (X-2), the group $R_{ac}$ is H or a $C_{1-4}$ linear or branched alkyl) with an amidating agent (for example, diisopropanol amine) in the presence of an alkaline catalyst (referred to as amidating step).

$$Rb\text{-}[\text{-}COOR_{ac}]_{x2} \qquad (X\text{-}2\text{-}1)$$

According to this invention, the amidating step could be conducted in any conventional manner, wherein the reaction temperature could be generally 100-200 degrees Celsius, the reaction duration could be generally 1-10 h, the reaction pressure could be the normal pressure or any pressure suitable for this reaction.

According to this invention, in the amidating step, as the alkaline catalyst, any alkaline catalyst conventionally used in this field for a similar purpose may be used as such, wherein preference is given to alkali metal hydroxide, especially NaOH or KOH. As the alkaline catalyst, one kind or a mixture of two or more kinds at any ratio therebetween could be used. As the amount of the alkaline catalyst to be used, any amount conventionally used in this field may be mentioned, but could be generally determined such that the alkaline catalyst accounts for 0.2-20 wt %, preferably 0.5-15 wt % of the total weight of the compound represented by the formula (X-2-1) and the amidating agent.

According to this invention, in the amidating step, the ratio by molar of the compound represented by the formula (X-2-1) and the amidating agent could be generally 1:1-15, 1:1-10, 1:1-8, 1:1-5 or 1:2-4, but not limiting thereto, which could be any ratio by molar sufficient to convert all (i.e. x2 in total) of the group —$COOR_{ac}$ into its corresponding amido.

According to this invention, upon completion of the amidating step, by any known separation method (for example, vacuum suction), any unreacted amidating agent is removed from the reaction product mixture, so as to obtain a compound represented by the formula (X-2) (wherein, Y=N, Rb' is carbonyl), without needing any further purification or separation.

Step (2): reacting the/an ether product with one or more compound(s) represented by the following formula (Z) in the presence of an alkaline catalyst, whereby obtaining the anionic-nonionic surfactant (including the compound represented by the formula (I)).

According to this invention, the ether product to be used in Step (2) as the starting material could be the ether product directly obtained from Step (1), or may be commercially available, for example, those sold under the name of alkylphenol polyoxyethylene polyoxypropylene ether. Herein, if a commercially available ether product is used, it is preferred that prior to Step (2), the ether product is alkalized at a temperature of from the room temperature to 100 degrees Celsius in the presence of an alkaline catalyst for 1-10 h (referred to as alkalizing step). The thus obtained alkalized product could be used as such as the ether product for Step (2). In the alkalizing step, the ratio by molar of the ether product and the alkaline catalyst could be generally 1:1-10, preferably 1:1-5, but not limiting thereto. Of course, the ether product directly obtained from Step (1) could be or not be treated by this alkalizing step.

According to this invention, in Step (2) and the alkalizing step, as the alkaline catalyst, any alkaline catalyst conventionally used in this field for a similar purpose may be used as such, wherein preference is given to alkali metal hydroxide, especially NaOH or KOH. As the alkaline catalyst, one kind or a mixture of two or more kinds at any ratio therebetween could be used. For a simplified operation, the alkaline catalyst to be used in Step (2) and/or alkalizing step may be the same as that to be used in Step (1).

According to this invention, in Step (2) and the alkalizing step, as the amount of the alkaline catalyst to be used, any amount conventionally used in this field may be mentioned, but could be generally determined such that the ratio by molar of the ether product and the alkaline catalyst is 1:1-10, preferably 1:1-5. As aforesaid, Step (2) is generally conducted after Step (1) and/or the alkalizing step. In this context, given that a certain amount of alkaline catalyst has been used in Step (1) or the alkalizing step, some amount of the alkaline catalyst may remain from these steps; if this amount is sufficient in catalyzing Step (2), no further alkaline catalyst will be added to Step (2), or if needed, a supplementary amount thereof will be added, which is obvious to a person skilled in the art.

$$G\text{-}L\text{-}AS \qquad (Z)$$

According to this invention, in the formula (Z), the group G represents a halogen atom or hydroxyl, preferably a halogen atom. As the halogen atom, for example, there may be exemplified fluorine atom, chlorine atom, bromine atom and iodine atom, preferably chlorine atom.

According to this invention, in the formula (Z), the group L represents an optionally substituted $C_{1-10}$ linear or branched alkylene or an optionally substituted $C_{2-10}$ linear or branched alkenylene, preferably an optionally substituted $C_{1-5}$ linear or branched alkylene.

According to this invention, in the formula (Z), the group AS represents a group represented by the formula $-A^-(M')_r^+$, wherein the group $A^-$ represents a carboxylate ion ($COO^-$) or a sulfonate ion ($SO_3^-$), the group M' represents hydrogen, alkali metal (preferably Li, Na or K), alkaline earth metal (preferably Mg or Ca) or ammonium ($NH_4$), preferably alkali metal (preferably Li, Na or K) or alkaline earth metal (preferably Mg or Ca).

According to this invention, when the group M' represents hydrogen, alkali metal or ammonium, r=1; when the group M' represents alkaline earth metal, r=0.5.

According to an embodiment of this invention, in the formula (Z), when the group $A^-$ represents the carboxylate ion ($COO^-$), the group G represents the halogen atom, when the group $A^-$ represents the sulfonate ion ($SO_3^-$), the group G represents the halogen atom or hydroxyl.

According to this invention, one or more compounds represented by the formula (Z) will be used, wherein in at least one compound represented by the formula (Z), the group $A^-$ represents a carboxylate ion ($COO^-$). In this context, to conduct Step (2), it is required that at least a compound represented by the formula (Z) bearing a carboxylate ion ($COO^-$) group be used.

According to this invention, in the formula (Z), by optionally substituted, it refers to optionally substituted by one or more (for example, from 1 to 5, from 1 to 4, from 1 to 3, from 1 to 2 or 1) substituent selected from the group consisting of hydroxyl, a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. As the substituent, it is preferably a $C_{5-15}$ linear or branched alkyl, more preferably a $C_{5-10}$ linear or branched alkyl, or methyl or ethyl.

According to this invention, in Step (2), the ratio by molar of the multifunctional compound or the ether product and the compound represented by the formula (Z) is 1:1-10, preferably 1:1-4, 1:1-3 or 1: 2-5.

According to this invention, in Step (2), the reaction temperature could be generally from the room temperature to 200 degrees Celsius, preferably 50-100 degrees Celsius, the reaction duration could be generally 1-20 h, preferably from 1 to 10 h, while the reaction pressure could be any pressure suitable for this reaction, for example, the normal pressure.

According to this invention, upon completion of Step (2), by any known separation method, the reaction product mixture obtained from Step (2) is treated, whereby isolating the anionic-nonionic surfactant. As the separation method, for example, there may be exemplified a method wherein firstly, into the reaction product mixture obtained from Step (2), an aqueous acid solution (for example, an aqueous solution of HCl, an aqueous solution of $H_2SO_4$, an aqueous solution of phosphoric acid, an aqueous solution of $NaHSO_4$, or an aqueous solution of $KHSO_4$) is introduced till a pH value of from 1 to 3 is reached, then oil-aqueous phase separated, whereby obtaining the anionic-nonionic surfactant as the oil phase.

According to this invention, upon completion of Step (2), if needed, the thus obtained anionic-nonionic surfactant could be further made into contact with a neutralizing agent, whereby any free acid (for example, a free carboxylic acid or a free sulfonic acid) group on the anionic-nonionic surfactant being converted into its corresponding salt (hereinafter referred to as neutralizing step). As the neutralizing agent, for example, there may be exemplified alkali metal (preferably Li, Na or K) hydroxides, alkaline earth metal (preferably Mg or Ca) hydroxides or aqueous ammonia. As the neutralizing agent, one kind or a mixture of two or more kinds at any ratio therebetween could be used. As the way to conduct the neutralizing step, for example, there may be exemplified a method wherein into the anionic-nonionic surfactant, a certain amount of the neutralizing agent in the form of an aqueous solution or an aqueous suspension is introduced till a pH value of 7-9 or 8-10 is reached, then water is removed therefrom (for example, by evaporation under heat or vacuum), but not limiting thereto.

According to this invention, the anionic-nonionic surfactant (including the compound represented by the formula (I)) could be presented, produced or used in the form of one single kind of compound or a mixture of two or more kinds. All these forms are covered by this invention and identified as being effective and desirable in this invention. In this context, according to this invention, it is not absolutely necessary to further purify the thus produced anionic-nonionic surfactant, or to further isolate one or more specific compound from the thus produced anionic-nonionic surfactant (if as a mixture). Nevertheless, as the purification or isolation method, there may be exemplified column chromatography or preparative chromatography.

According to this invention, the surfactant composition is produced by mixing a cationic surfactant and the anionic-nonionic surfactant. In this context, this invention further relates to a process for producing a surfactant composition, including a step of mixing a cationic surfactant and the anionic-nonionic surfactant (hereinafter referred to as mixing step).

According to this invention, in the surfactant composition, the cationic surfactant and the anionic-nonionic surfactant may each independently present, or associate with each other due to interaction between cations and anions, or even chemically react with each other (for example, by eliminating a compound represented by the formula $(M)_r^+ X^-$, wherein the group $X^-$ is as defined in the hereinafter described formula (II)) to form a new compound, without any specific limitation thereto. These forms are all covered by this invention, not limited by any literal wording.

According to this invention, in the mixing step, the ratio by molar of the cationic surfactant and the anionic-nonionic surfactant could be generally 1:0.01-100, preferably 1:0.1-10.

According to this invention, the mixing step may generally follow the aforesaid Step (2), whereby sometimes referred to as Step (3).

According to this invention, the mixing step or Step (3) could be conducted in the presence of water. The amount of water to be used is determined such that the cationic surfactant and the anionic-nonionic surfactant could be thoroughly mixed with each other, without any specific limitation thereto. Further, for an easy mixing, the anionic-nonionic surfactant and/or the cationic surfactant could be used in the form of an aqueous solution.

According to this invention, the cationic surfactant is one or more selected from the group consisting of quaternary ammonium salts and quaternary ammonium hydroxides. As the quaternary ammonium salts and the quaternary ammonium hydroxides, those conventionally used in this field for producing a flooding fluid composition for tertiary oil recovery may be used as such. As the cationic surfactant, one kind or a mixture of two or more kinds at any ratio therebetween could be used.

According to a preferred embodiment of this invention, the cationic surfactant is a compound represented by the following formula (II). As the compound, one kind or a mixture of two or more kinds at any ratio therebetween could be used.

According to this invention, in the formula (II), the group $N^+$ represents a quaternary nitrogen cation, whereby introducing a quaternary ammonium group into the compound represented by the formula (II).

According to this invention, in the formula (II), the groups $R_1$ to $R_4$ may be identical to or different from one another, each independently selected from the group consisting of an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl, an optionally substituted $C_{6-50}$ aryl and a group represented by the formula $L_2\text{-}(\text{O}\text{—}Ru')_{y'}L_1\text{-}$.

According to an embodiment of this invention, in the formula (II), at least one (for example, two at most) out of the groups $R_1$ to $R_4$ represents a group represented by the formula $L_2\text{-}(\text{O}\text{—}Ru')_{y'}L_1\text{-}$.

According to this invention, in the formula (II), it is required that at least one out of the groups $R_1$ to $R_4$ represents an optionally substituted $C_{8-50}$ linear or branched alkyl or an optionally substituted $C_{8-50}$ linear or branched alkenyl, preferably an optionally substituted $C_{8-50}$ linear or branched alkyl.

According to an embodiment of this invention, in the formula (II), the groups $R_1$ to $R_4$ may be identical to or different from one another, each independently represents an optionally substituted $C_{1-50}$ linear or branched alkyl, preferably an optionally substituted $C_{1-20}$ linear or branched alkyl. Herein, it is required that at least one out of the groups $R_1$ to $R_4$ represents an optionally substituted $C_{8-50}$ linear or branched alkyl, preferably at least one out of the groups $R_1$ to $R_4$ represents an optionally substituted $C_{8-20}$ linear or branched alkyl.

According to an embodiment of this invention, in the formula (II), when the groups $R_1$ to $R_4$ are all alkyl, it is preferred that the total carbon atom number of these groups $R_1$ to $R_4$ are 40 or less.

According to this invention, in the formula (II), in the definition of the groups $R_1$ to $R_4$, as the $C_{1-50}$ linear or branched alkyl, for example, there may be exemplified a $C_{1-20}$ linear or branched alkyl, a $C_{1-10}$ linear or branched alkyl or a $C_{1-6}$ linear or branched alkyl, specifically methyl or ethyl, and so on. As the $C_{5-50}$ monocyclic or polycyclic cycloalkyl, for example, there may be exemplified a $C_{5-10}$ monocyclic or polycyclic cycloalkyl, a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-50}$ linear or branched alkenyl, for example, there may be exemplified a $C_{2-20}$ linear or branched alkenyl, a $C_{2-10}$ linear or branched alkenyl or a $C_{2-6}$ linear or branched alkenyl, specifically vinyl, propenyl or allyl, and so on. As the $C_{6-50}$ aryl, for example, there may be exemplified a $C_{6-20}$ aryl or a $C_{6-10}$ aryl, specifically phenyl or naphthyl.

According to this invention, in the formula (II), in the definition of the groups $R_1$ to $R_4$, as the $C_{8-50}$ linear or branched alkyl, for example, there may be exemplified a $C_{8-20}$ linear or branched alkyl or a $C_{16-20}$ linear or branched alkyl, specifically hexadecyl, octadecyl, octyl, decyl, dodecyl, and so on. As the $C_{8-50}$ linear or branched alkenyl, for example, there may be exemplified a $C_{8-20}$ linear or branched alkenyl or a $C_{16-20}$ linear or branched alkenyl, specifically hexadecenyl, octadecenyl, octenyl, decenyl, dodecenyl, and so on.

According to an embodiment of this invention, in the formula (II), the group $X^-$ represents a halogen ion (including fluoride ion, chloride ion, bromide ion or iodide ion) or hydroxide ion ($OH^-$), wherein preference is given to a halogen ion, more preferably chloride ion.

According to this invention, in the formula (II), in the group represented by the formula $L_2\text{-}(\text{O}\text{—}Ru')_{y'}L_1\text{-}$, the group $L_1$ represents a single bond, a $C_{1-10}$ linear or branched alkylene oxy, a $C_{2-10}$ linear or branched alkenylene oxy or a $C_{6-10}$ arylene oxy, preferably a single bond or a $C_{1-5}$ linear or branched alkylene oxy, especially a single bond. Obviously, any terminal O atom in the group $L_1$ bonds to the group $Ru'$.

According to this invention, in the formula (II), in the group represented by the formula $L_2\text{-}(\text{O}\text{—}Ru')_{y'}L_1\text{-}$, the numerical value y' represents a value of from 0 to 200, excluding 0. Preferably, the numerical value y' represents a value of from 0 to 100, excluding 0. Herein, the numerical value y' represents an average number of the unit —O—Ru'— in the group represented by the formula $L_2\text{-}(\text{O}\text{—}Ru')_{y'}L_1\text{-}$, and thus could be a non-integer or an integer. As the numerical value y', for example, there may be exemplified 0.1, 0.5, 2.0, 3.0, 3.5, 7.5, 10.0, 15.0, 25.0, 30.2, 35.0, 40.0, 45.5, 50.5, 55.2, 60.0, 75.5, 80.5, 85.0, 90.5 or 95.7, and so on.

According to this invention, in the formula (II), in the group represented by the formula $L_2\text{-}(\text{O}\text{—}Ru')_{y'}L_1\text{-}$, plural group Ru' may be identical to or different from one another, each independently represents a $C_{2-6}$ linear or branched alkylene, preferably —$CH_2$—$CH_2$— or —$CH_2$—$CH(CH_3)$—. Herein, in the group represented by the formula $L_2\text{-}(\text{O}\text{—}Ru')_{y'}L_1\text{-}$, when the group Ru' represents two or more out of the $C_{2-6}$ linear or branched alkylene, these (different) units —O—Ru'— may bond to one another at any predetermined ratio therebetween so as to form into a random, a (di- or multi-) block or an alternative copolymer segment, with the proviso that the overall (average) number of these units corresponds to the numeral value y'. For example, assuming that the group Ru' represents the combination of —$CH_2$—$CH_2$— and —$CH_2$—$CH(CH_3)$— and y' is 2.2, the unit —O—$CH_2$—$CH_2$— and the unit

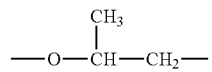

could bond to each other so as to form a (di- or multi-) block, alternative, or random copolymer segment at any predetermined ratio therebetween (wherein for example, the ratio by molar therebetween could be 1:99 to 99:1), with the proviso that the total (average) number of these two units is 2.2.

According to an embodiment of this invention, in the formula (II), in the group represented by the formula $L_2\text{-}(\text{O}\text{—}Ru')_{y'}L_1\text{-}$, it is preferred that at least a part of (at least a certain amount of) the group Ru' represents a $C_{3-6}$ linear or branched alkylene (corresponding to a non-EO unit), wherein preference is given to —$CH_2$—$CH(CH_3)$— (corresponding to the unit

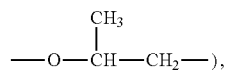

whereby making the group represented by the formula $L_2\text{-}(\text{O}\text{—}Ru')_{y'}L_1\text{-}$ to comprise (a certain amount of, with a upper limit value of y') the non-EO unit (for example, the unit

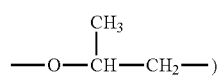

as the essential constituting unit.

According to an embodiment of this invention, in the formula (II), in the group represented by the formula $L_2\text{-}(\text{O}\text{—}Ru')_{y'}L_1\text{-}$, the group $\text{-}(\text{O}\text{—}Ru')_{y'}$ represents a (di-block)ether segment represented by the following formula (II-1). Herein, as illustrated by the formula (II-1), the unit —O—CH$_2$—CH$_2$— and the unit

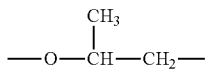

bond into a (di)block copolymer segment.

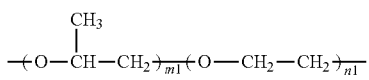
(II-1)

According to the embodiment of this invention, preferably, the ether segment represented by the formula (II-1) bonds to the group L$_2$ and the group L$_1$ in a manner represented by the following formula,

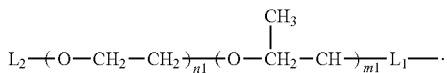

According to the embodiment of this invention, in the formula (II-1), the numerical value m1 represents a value of from 0 to 100, preferably a value of from 0 to 50. Herein, the numerical value m1 represents an average number of the unit

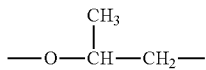

in the ether segment represented by the formula (II-1), and thus could be a non-integer or an integer. As the numerical value m1, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to the embodiment of this invention, in the formula (II-1), the numerical value n1 represents a value of from 0 to 100, preferably a value of from 0 to 50. Herein, the numerical value n1 represents an average number of the unit —O—CH$_2$—CH$_2$— in the ether segment represented by the formula (II-1), and thus could be a non-integer or an integer. As the numerical value n1, for example, there may be exemplified 0, 0.5, 1.2, 2.0, 2.5, 3.0, 3.5, 5.4, 7.5, 10.0, 15.0, 25.0, 30.2, 35.0, 40.0, 45.5 or 50.5, and so on.

According to the embodiment of this invention, in the formula (II-1), the sum of the numerical value m1 and the numerical value n1 (i.e. throughout the ether segment represented by the formula (II-1), the overall average number of the unit

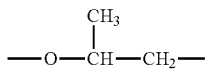

and the unit —O—CH$_2$—CH$_2$—) is greater than 0 and not greater than 200, preferably not greater than 100. In this context, in the ether segment represented by the formula (II-1), it is necessary to contain (a certain amount of) the unit —O—CH$_2$—CH$_2$— and/or the unit

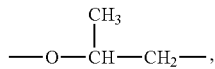

preferably, necessary to contain (a certain amount of) the unit

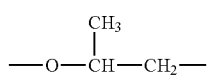

(i.e. the numerical value m1 being greater than 0), or necessary to contain (a certain amount of) the unit —O—CH$_2$—CH$_2$— and the unit

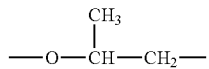

(i.e. the numerical value m1 being greater than 0, and the numerical value n1 greater than 0). Herein, in the ether segment represented by the formula (II-1), as the overall average number of these two units, for example, there may be exemplified 0.1, 0.5, 1.2, 2.0, 2.5, 3.0, 3.5, 5.4, 7.5, 10.0, 15.0, 25.0, 30.2, 35.0, 40.0, 45.5 or 50.5, and so on.

According to this invention, in the formula (II), in the group represented by the formula L$_2$-(-O—Ru'-)$_y$L$_1$-, the group L$_2$ represents hydrogen, an optionally substituted C$_{1-10}$ linear or branched alkyl, an optionally substituted C$_{2-10}$ linear or branched alkenyl or an optionally substituted C$_{6-10}$ aryl. As the C$_{1-10}$ linear or branched alkyl, for example, there may be exemplified a C$_{1-6}$ linear or branched alkyl, specifically methyl or ethyl, and so on. As the C$_{2-10}$ linear or branched alkenyl, for example, there may be exemplified a C$_{2-6}$ linear or branched alkenyl, specifically vinyl, propenyl or allyl, and so on. As the C$_{6-10}$ aryl, specifically phenyl or naphthyl.

According to this invention, in the formula (II), by optionally substituted, it refers to optionally substituted by one or more (for example, from 1 to 5, from 1 to 4, from 1 to 3, from 1 to 2 or 1) substituent selected from the group consisting of a C$_{1-20}$ linear or branched alkyl, a C$_{5-10}$ monocyclic or polycyclic cycloalkyl, a C$_{2-20}$ linear or branched alkenyl and a C$_{6-20}$ aryl. As the C$_{1-20}$ linear or branched alkyl, for example, there may be exemplified a C$_{5-15}$ linear or branched alkyl or a C$_{5-10}$ linear or branched alkyl, or methyl or ethyl, and so on. As the C$_{5-10}$ monocyclic or polycyclic cycloalkyl, for example, there may be exemplified a C$_{5-8}$ monocyclic or polycyclic cycloalkyl or a C$_{5-7}$ monocyclic or polycyclic cycloalkyl, especially a C$_{5-7}$ monocyclic cycloalkyl, specifically cyclopentyl or cyclohexyl. As the C$_{2-20}$ linear or branched alkenyl, for example, there may be exemplified a C$_{2-10}$ linear or branched alkenyl, specifically vinyl, propenyl or allyl, and so on. As the C$_{6-20}$ aryl, for example, there may be exemplified a C$_{6-10}$ aryl, specifically phenyl or naphthyl. As the substituent, it is preferably a C$_{5-15}$ linear or branched alkyl, more preferably a C$_{5-10}$ linear or branched alkyl, or methyl or ethyl.

According to this invention, the cationic surfactant or the compound represented by the formula (II) may be commercially available or produced in a conventional manner. For example, as the method for producing a compound represented by the formula (II) (wherein at least one out of the groups $R_1$ to $R_4$ represents a group represented by the formula $L_2$-(O—Ru'-)$_y$-$L_1$-, hereinafter referred to as cationic-nonionic surfactant), for example, there may be exemplified a method comprising the following Step (II-1) to Step (II-4).

Step (II-1): reacting an amine represented by the following formula (II-X) with an alkylene oxide represented by the following formula (II-Y) in the presence of an acidic catalyst, to obtain an ether product B.

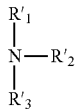
(II-X)

According to this invention, in the formula (II-X), the group $R'_1$ to $R'_3$ may be identical to or different from one another, each independently selected from the group consisting of an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl, an optionally substituted $C_{6-50}$ aryl and a group represented by the formula H-$L'_1$-.

According to this invention, in the formula (II-X), it is required that at least one (for example, two at most) out of the groups $R'_1$ to $R'_3$ represents a group represented by the formula H-$L'_1$-.

According to this invention, in the formula (II-X), it is further required that at least one out of the groups $R'_1$ to $R'_3$ represents an optionally substituted $C_{8-50}$ linear or branched alkyl or an optionally substituted $C_{8-50}$ linear or branched alkenyl, preferably an optionally substituted $C_{8-50}$ linear or branched alkyl.

According to this invention, in the formula (II-X), in the definition of the groups $R'_1$ to $R'_3$, as the $C_{1-50}$ linear or branched alkyl, for example, there may be exemplified a $C_{1-20}$ linear or branched alkyl, a $C_{1-10}$ linear or branched alkyl or a $C_{1-6}$ linear or branched alkyl, specifically methyl or ethyl, and so on. As the $C_{5-50}$ monocyclic or polycyclic cycloalkyl, for example, there may be exemplified a $C_{5-10}$ monocyclic or polycyclic cycloalkyl, a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-50}$ linear or branched alkenyl, for example, there may be exemplified a $C_{2-20}$ linear or branched alkenyl, a $C_{2-10}$ linear or branched alkenyl or a $C_{2-6}$ linear or branched alkenyl, specifically vinyl, propenyl or allyl, and so on. As the $C_{6-50}$ aryl, for example, there may be exemplified a $C_{6-20}$ aryl or a $C_{6-10}$ aryl, specifically phenyl or naphthyl.

According to this invention, in the formula (II-X), in the definition of the group $R'_1$ to $R'_3$, as the $C_{8-50}$ linear or branched alkyl, for example, there may be exemplified a $C_{8-20}$ linear or branched alkyl or a $C_{16-20}$ linear or branched alkyl, specifically hexadecyl, octadecyl, octyl, decyl, dodecyl, and so on. As the $C_{8-50}$ linear or branched alkenyl, for example, there may be exemplified a $C_{8-20}$ linear or branched alkenyl or a $C_{16-20}$ linear or branched alkenyl, specifically hexadecenyl, octadecenyl, octenyl, decenyl, dodecenyl, and so on.

According to this invention, in the formula (II-X), in the group represented by the formula H-$L'_1$-, the group $L'_1$ represents a single bond, a $C_{1-10}$ linear or branched alkylene oxy, a $C_{2-10}$ linear or branched alkenylene oxy or a $C_{6-10}$ arylene oxy, preferably a single bond or a $C_{1-5}$ linear or branched alkylene oxy, especially a single bond. Obviously, any terminal O atom in the group $L'_1$ bonds to H.

(II-Y)

According to this invention, in the formula (II-Y), the group Ru' represents a $C_{2-6}$ linear or branched alkylene, wherein preference is given to —$CH_2$—$CH_2$— and/or —$CH_2$—$CH(CH_3)$—, more preferably a combination of —$CH_2$—$CH_2$— and —$CH_2$—$CH(CH_3)$—.

According to this invention, in Step (II-1), as the alkylene oxide represented by the formula (II-Y), for example, there may be exemplified ethylene oxide, propylene oxide, butylene oxide, hexene oxide, and so on. As these alkylene oxides, one kind or a mixture of two or more kinds at any ratio therebetween could be used, for example, a combination of ethylene oxide and propylene oxide.

According to this invention, one or more alkylene oxide represented by the formula (II-Y) is used, preferably at least propylene oxide is used. Propylene oxide may if needed co-use with any other alkylene oxide represented by the formula (II-Y) (especially ethylene oxide). In this combination, the ratio by molar of propylene oxide and said other alkylene oxide represented by the formula (II-Y) (especially ethylene oxide), for example, may be 1:0.1-10, but not limiting thereto.

According to this invention, in Step (II-1), as the acidic catalyst, any acidic catalyst conventionally used in this field for a similar purpose may be used as such, wherein preference is given to a Lewis acid, especially boron trifluoride diethyl ether complex. As the acidic catalyst, one kind or a mixture of two or more kinds at any ratio therebetween could be used.

According to this invention, in Step (II-1), as the amount of the acidic catalyst to be used, any amount conventionally used in this field may be mentioned, but could be generally determined such that the ratio by molar of the amine represented by the formula (II-X) and the acidic catalyst is 1:1-10, preferably 1:1-5.

According to this invention, in Step (IIA), the ratio by molar of the amine represented by the formula (II-X) and the alkylene oxide could be generally 1:0-200, preferably 1:0-100, excluding 0, more preferably 1:0.1-50.

According to this invention, in Step (IIA), the reaction temperature could be generally from the room temperature to 300 degrees Celsius, preferably 100-200 degrees Celsius, the reaction duration could be generally 1-20 h, preferably from 1 to 10 h, while the reaction pressure could be any pressure suitable for this reaction, for example, the normal pressure.

According to a preferred embodiment of this invention, in Step (II-1), as the alkylene oxide represented by the formula (II-Y), if two or more (preferably comprising at least propylene oxide) are used as a combination, the amine is made to firstly react with (at least a partial or a whole amount of) propylene oxide, and then (preferably upon partial or totally completion of the reaction with propylene oxide) react with any other alkylene oxide (for example, ethylene oxide).

According to this invention, upon completion of Step (II-1), the thus obtained reaction product mixture could be used as such as the ether product B to conduct the succeeding Step (II-2) without any separation or purification thereto, or simply after separated off the acidic catalyst (for example, by washing).

Step (II-2): reacting the ether product B and the quaternizing agent represented by the following formula (II-A), whereby obtaining the cationic-nonionic surfactant.

$$R'_4\text{—}X' \tag{II-A}$$

According to this invention, in the formula (II-A), the group $R'_4$ represents an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl or an optionally substituted $C_{6-50}$ aryl, preferably an optionally substituted $C_{1-50}$ linear or branched alkyl or an optionally substituted $C_{2-50}$ linear or branched alkenyl. As the $C_{1-50}$ linear or branched alkyl, for example, there may be exemplified a $C_{1-20}$ linear or branched alkyl, a $C_{1-10}$ linear or branched alkyl or a $C_{1-6}$ linear or branched alkyl, specifically methyl or ethyl, and so on. As the $C_{5-50}$ monocyclic or polycyclic cycloalkyl, for example, there may be exemplified a $C_{5-10}$ monocyclic or polycyclic cycloalkyl, a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-50}$ linear or branched alkenyl, for example, there may be exemplified a $C_{2-20}$ linear or branched alkenyl, a $C_{2-10}$ linear or branched alkenyl or a $C_{2-6}$ linear or branched alkenyl, specifically vinyl, propenyl or allyl, and so on. As the $C_{6-50}$ aryl, for example, there may be exemplified a $C_{6-20}$ aryl or a $C_{6-10}$ aryl, specifically phenyl or naphthyl.

According to this invention, in the formula (II-A), the group X' represents a halogen atom, including fluorine atom, chlorine atom, bromine atom and iodine atom, wherein preference is given to chlorine atom.

According to this invention, in Step (II-2), the ratio by molar of the ether product B and the quaternizing agent represented by the formula (II-A) could be generally 1:0.1-200, preferably 1:0.1-50.

According to this invention, in Step (II-2), the reaction temperature could be generally 0-300 degrees Celsius, preferably 50-200 degrees Celsius, the reaction duration could be generally 1-20 h, preferably from 1 to 10 h, while the reaction pressure could be any pressure suitable for this reaction, for example, the normal pressure.

According to this invention, Step (II-2) could be conducted in the presence of or in the absence of a catalyst. As the catalyst, any catalyst conventionally used in this field for a similar purpose may be used as such, specifically KI. As the amount of the catalyst to be used, any amount conventionally used in this field may be mentioned, e.g. 0.5-3.0 wt %, especially 1.0-2.0 wt %.

According to this invention, upon completion of Step (II-2), any separation method conventionally used in this field could be used to treat the reaction product mixture obtained from Step (II-2), whereby isolating the cationic-nonionic surfactant. As the separation method, for example, there may be exemplified extraction under an alkali condition.

Step (II-3): if needed, at least a part (or all) of the quaternary ammonium salt group on the molecular structure of the thus obtained cationic-nonionic surfactant being converted into the corresponding quaternary ammonium hydroxide group, and/or, at least a part (or all) of the quaternary ammonium hydroxide group on the molecular structure of the thus obtained cationic-nonionic surfactant being converted into the corresponding quaternary ammonium salt group.

According to this invention, Step (II-3) is an optional step, not an indispensable step.

According to this invention, Step (II-3) could be conducted in any conventional manner, for example, by electrolyzation or ion exchanging, without any specific limitation to. Step (II-4): reacting the cationic-nonionic surfactant with a compound represented by the following formula (II-Z) in the presence of an alkaline catalyst (referred to as Step (II-4A)), and/or, prior to Step (II-2), reacting the ether product B with a compound represented by the following formula (II-Z) in the presence of an alkaline catalyst (referred to as Step (II-4B)).

In the context of this invention, the product obtained from Step (II-1) and the product obtained from Step (II-4B) are indiscriminately referred to as ether product B, and the product obtained from Step (II-2), the product obtained from Step (II-3) and the product obtained from Step (II-4A) are indiscriminately referred to as cationic-nonionic surfactant.

According to this invention, Step (II-4) is an optional step, not an indispensable step.

$$G\text{-}L_2' \tag{II-Z}$$

According to this invention, in the formula (II-Z), the group G represents a halogen atom, including fluorine atom, chlorine atom, bromine atom and iodine atom, wherein preference is given to chlorine atom.

According to this invention, in the formula (II-Z), the group $L_2'$ represents an optionally substituted $C_{1-10}$ linear or branched alkyl, an optionally substituted $C_{2-10}$ linear or branched alkenyl or an optionally substituted $C_{6-10}$ aryl. As the $C_{1-10}$ linear or branched alkyl, for example, there may be exemplified a $C_{1-6}$ linear or branched alkyl, specifically methyl or ethyl, and so on. As the $C_{2-10}$ linear or branched alkenyl, for example, there may be exemplified a $C_{2-6}$ linear or branched alkenyl, specifically vinyl, propenyl or allyl, and so on. As the $C_{6-10}$ aryl, there may be exemplified phenyl or naphthyl.

According to this invention, in Step (II-4), as the alkaline catalyst, any alkaline catalyst conventionally used in this field for a similar purpose may be used as such, wherein preference is given to alkali metal hydroxide, especially NaOH or KOH. As the alkaline catalyst, one kind or a mixture of two or more kinds at any ratio therebetween could be used.

According to this invention, in Step (II-4), as the amount of the alkaline catalyst to be used, any amount conventionally used in this field may be mentioned, but could be generally determined such that the ratio by molar of the cationic-nonionic surfactant or the ether product B and the alkaline catalyst is 1:1-10, preferably 1:1-5.

According to this invention, in Step (II-4), the ratio by molar of the cationic-nonionic surfactant or the ether product B and the compound represented by the formula (II-Z) could be generally 1:1-10, preferably 1:1-4 or 1:2-5.

According to this invention, in Step (II-4), the reaction temperature could be generally from the room temperature to 200 degrees Celsius, preferably 50-100 degrees Celsius, the reaction duration could be generally 1-20 h, preferably from 1 to 10 h, while the reaction pressure could be any pressure suitable for this reaction, for example, the normal pressure.

According to this invention, upon completion of Step (II-4), any conventional separation method could be used to treat the reaction product mixture obtained from Step (II-4), whereby isolating the cationic-nonionic surfactant or the ether product B as the reaction product. As the separation method, for example, there may be exemplified nanofiltration.

According to this invention, in the process for producing the cationic-nonionic surfactant, by optionally substituted, it refers to optionally substituted by one or more (for example, from 1 to 5, from 1 to 4, from 1 to 3, from 1 to 2 or 1) substituent selected from the group consisting of a $C_{1-20}$ linear or branched alkyl, a $C_{5-10}$ monocyclic or polycyclic cycloalkyl, a $C_{2-20}$ linear or branched alkenyl and a $C_{6-20}$ aryl. As the $C_{1-20}$ linear or branched alkyl, for example, there may be exemplified a $C_{5-15}$ linear or branched alkyl or a $C_{5-10}$ linear or branched alkyl, or methyl or ethyl, and so on. As the $C_{5-10}$ monocyclic or polycyclic cycloalkyl, for example, there may be exemplified a $C_{5-8}$ monocyclic or polycyclic cycloalkyl or a $C_{5-7}$ monocyclic or polycyclic cycloalkyl, especially a $C_{5-7}$ monocyclic cycloalkyl, specifically cyclopentyl or cyclohexyl. As the $C_{2-20}$ linear or branched alkenyl, for example, there may be exemplified a $C_{2-10}$ linear or branched alkenyl, specifically vinyl, propenyl or allyl, and so on. As the $C_{6-20}$ aryl, for example, there may be exemplified a $C_{6-10}$ aryl, specifically phenyl or naphthyl. As the substituent, it is preferably a $C_{5-15}$ linear or branched alkyl, more preferably a $C_{5-10}$ linear or branched alkyl, or methyl or ethyl.

According to this invention, the cationic-nonionic surfactant could be presented, produced or used in the form of one single kind of compound or a mixture of two or more kinds. All these forms are covered by this invention and identified as being effective and desirable in this invention. In this context, according to this invention, it is not absolutely necessary to further purify the thus produced cationic-nonionic surfactant, or to further isolate one or more specific compound from the thus produced cationic-nonionic surfactant (if as a mixture). Nevertheless, as the purification or isolation method, there may be exemplified column chromatography or preparative chromatography.

The surfactant composition according to this invention, since there exists a strong electrostatic attraction between the opposite anionic charges and cationic charges, which significantly increases the amount of the surfactant molecule adsorbed at the interface and significantly reduces the critical micelle concentration, exhibits a much higher interfacial activity as compared with one single surfactant. At the same time, thanks to the significantly higher interfacial activity of the present surfactant composition, an aqueous solution thereof exhibits significantly lowered interfacial tension for crude oil, whereby facilitating reduction of the cohesive force inside crude oil, which facilitates outflow of crude oil and greatly enhances the oil displacement efficiency. On the other hand, the present surfactant composition can change the surface wettability of crude oil. Specifically, the cationic surfactant in the surfactant composition desorbs the negatively charged groups adsorbed on a solid surface by reacting with same, whereby changing the oil wetable surface into a neutral or water wetable surface, decreasing the adhesion work of crude oil to the solid surface, which will facilitate stripping of crude oil. At the same time, the present surfactant composition solubilizes crude oil, which helps to wash down any crude oil attached to strata rock or sand, whereby enhancing the oil recovery. In this context, the surfactant composition according to this invention is particularly suitable for producing a flooding fluid composition for tertiary oil recovery (a flooding fluid).

According to an embodiment of this invention, further related to is a flooding fluid composition for tertiary oil recovery, which comprises the surfactant composition of this invention as aforesaid and water.

According to this invention, in the flooding fluid composition for tertiary oil recovery, on the basis of the total weight of the flooding fluid composition for tertiary oil recovery (as 100 wt %), the surfactant composition accounts for generally 0.001-10 wt %, preferably 0.005-5 wt %, more preferably 0.02-1 wt %, further preferably 0.02-0.5 wt %.

According to this invention, the flooding fluid composition for tertiary oil recovery could further (if needed) comprise an additive conventionally used in this field for this purpose, including but not limiting to, a cationic water-soluble polymer, an anionic water-soluble polymer, or a fatty alcohol ether (as the solvent), and so on. As the additive, one kind or a mixture of two or more kinds at any ratio therebetween could be used, at an amount conventionally used in this field.

According to this invention, as the cationic water-soluble polymer, for example, there may be exemplified polyacrylamide. The polyacrylamide may have a number averaged molecular weight of generally from 10000000 to 40000000, preferably from 10000000 to 30000000, at an amount of 0.05-5.0 wt %, preferably 0.1-0.5 wt %, on the basis of the total weight of the flooding fluid composition for tertiary oil recovery, but not limiting thereto.

According to this invention, the flooding fluid composition for tertiary oil recovery exhibits a high oil displacement efficiency and a high oil washing capability even in the absence of an inorganic alkali as a component. In this context, according to a preferred embodiment of this invention, the present flooding fluid composition for tertiary oil recovery contains no (or is not intentionally added with) inorganic alkali as a component. As the inorganic alkali, for example, there may be exemplified any inorganic alkaline compound conventionally used in this field for or with a flooding fluid composition for tertiary oil recovery, especially alkali metal carbonates, for example, sodium carbonate, sodium bicarbonate, and so on.

According to this invention, the flooding fluid composition for tertiary oil recovery could be produced in line with the following process.

According to this invention, the process for producing the flooding fluid composition for tertiary oil recovery includes a step of mixing the surfactant composition of this invention as aforesaid with water (and if needed, the aforesaid additive) till homogeneous.

According to this invention, the surfactant composition or the flooding fluid composition for tertiary oil recovery could be used in a tertiary oil recovery process, and exhibits significantly improved oil displacement efficiency and oil washing capability (for example, with an oil washing rate of more than 40% for crude oil) as compared with the prior art, whereby significantly enhancing crude oil recovery. In this context, this invention further relates to a tertiary oil recovery process, including a step of conducting tertiary oil recovery in the presence of as a flooding fluid, the surfactant composition of this invention as aforesaid or the flooding fluid composition for tertiary oil recovery of this invention as aforesaid.

According to a preferred embodiment of this invention, when conducting the tertiary oil recovery process, no inorganic alkali will be used or be intentionally involved. In this context, the tertiary oil recovery process of this invention shows no harm to the reservoir and oil wells, not corrosive to equipments and pipings, and causes no demulsification difficulty.

EXAMPLE

The present invention is further illustrated by using the following examples, but not limiting to same.

Example I-1a

Alkyl phenol polyoxypropylene polyoxyethylene ether and NaOH at a ratio by molar of 1:3 were introduced into a reactor, alkalized at 60 degrees Celsius for 5 h, and then at a ratio by molar between alkyl phenol polyoxypropylene polyoxyethylene ether and the carboxylating agent of 1:1 there was added chloroacetic acid, heated to 100 degrees Celsius and reacted for 1 h, upon completion of the reaction, neutralized with a 5 wt % aqueous solution of HCl to a pH value of 2, allowed to stand for layer separation, separated off the aqueous phase, the oil phase was adjusted with a 10 wt % aqueous NaOH solution to a pH value of 8, dried under vacuum, to obtain a sodium alkyl phenol polyoxypropylene polyoxyethylene ether carboxylate.

Polyoxypropylene ether (n=2) triethyl ammonium hydroxide and the thus produced sodium alkyl phenol polyoxypropylene polyoxyethylene ether carboxylate were dissolved into water respectively, stirred for 30 minutes, and formulated into a 0.3 wt % aqueous solution, and then the thus obtained solutions at a ratio by molar between the cationic surfactant and the anionic-nonionic surfactant of 1:10 were mixed till homogenous, to obtain the surfactant composition 1a, the particulars of which were listed in Table 1a.

Example I-2a

Alkyl phenol polyoxypropylene polyoxyethylene ether and NaOH at a ratio by molar of 1:4 were introduced into a reactor, alkalized at 80 degrees Celsius for 2 h, and then at a ratio by molar between alkyl phenol polyoxypropylene polyoxyethylene ether and the carboxylating agent of 1:1.5 there was added chloropropionic acid, cooled to 50 degrees Celsius and reacted for 18 h, and then neutralized with a HCl solution to a pH value of less than 3, and then oil-aqueous phase separated, the oil phase was neutralized with a 10 wt % aqueous $Ca(HCO_3)_2$ solution, upon completion of the reaction, then neutralized with a 5 wt % aqueous solution of HCl to a pH value of 2, allowed to stand for layer separation, separated off the aqueous phase, the oil phase was adjusted with a 10 wt % aqueous $Ca(OH)_2$ suspension to a pH value of 8, dried under vacuum, to obtain a calcium alkyl phenol polyoxypropylene polyoxyethylene ether carboxylate.

Dodecyl trimethyl ammonium chloride and the thus produced calcium alkyl phenol polyoxypropylene polyoxyethylene ether carboxylate were dissolved into water respectively, stirred for 30 minutes, and formulated into a 0.3 wt % aqueous solution, and then these solutions at a ratio by molar of 1:0.9 between the cationic surfactant and the anionic-nonionic surfactant were mixed till homogenous, to obtain the surfactant composition 2a, the particulars of which were listed in Table 1a.

Example I-3a

Alkyl phenol polyoxypropylene polyoxyethylene ether and KOH at a ratio by molar of 1:1 were introduced into a reactor, alkalized at the room temperature for 10 h, and then at a ratio by molar between alkyl phenol polyoxypropylene polyoxyethylene ether and the carboxylating agent of 1:3 there was added sodium chloroacetate, heated to 80 degrees Celsius and reacted for 8 h, upon completion of the reaction, then neutralized with a 5 wt % aqueous solution of HCl to a pH value of 2, allowed to stand for layer separation, separated off the aqueous phase, the oil phase was adjusted with a 10 wt % aqueous KOH solution to a pH value of 8, dried under vacuum, to obtain a potassium alkyl phenol polyoxypropylene polyoxyethylene ether carboxylate.

Bisoctadecyl (polyoxypropylene ether (n=3.1)) dimethyl ammonium chloride and the thus produced potassium alkyl phenol polyoxypropylene polyoxyethylene ether carboxylate were dissolved into water respectively, stirred for 30 minutes, and formulated into a 0.3 wt % aqueous solution, and then the thus obtained solutions at a ratio by molar between the cationic surfactant and the anionic-nonionic surfactant of 1:4 were mixed till homogenous, to obtain the surfactant composition 3a, the particulars of which were listed in Table 1a.

Example I-4a

Alkyl phenol polyoxypropylene polyoxyethylene ether and NaOH at a ratio by molar of 1:3 were introduced into a reactor, alkalized at 65 degrees Celsius for 2 h, and then at a ratio by molar between alkyl phenol polyoxypropylene polyoxyethylene ether and the carboxylating agent of 1:2 there was added chloropropionic acid, heated to 75 degrees Celsius and reacted for 9 h, upon completion of the reaction, then neutralized with a 5 wt % aqueous HCl solution to a pH value of 2, allowed to stand for layer separation, separated off the aqueous phase, the oil phase was adjusted with a 10 wt % aqueous NaOH solution to a pH value of 8, dried under vacuum, to obtain a sodium alkyl phenol polyoxypropylene polyoxyethylene ether carboxylate.

Tetraoctyl ammonium chloride and the thus produced sodium alkyl phenol polyoxypropylene polyoxyethylene ether carboxylate were dissolved into water respectively, stirred for 30 minutes, and formulated into a 0.3 wt % aqueous solution, and then the thus obtained solutions at a ratio by molar between the cationic surfactant and the anionic-nonionic surfactant of 1:6 were mixed till homogenous, to obtain the surfactant composition 4a, the particulars of which were listed in Table 1a.

Example I-5a

Alkyl phenol polyoxypropylene polyoxyethylene ether and NaOH at a ratio by molar of 1:3 were introduced into a reactor, alkalized at 65 degrees Celsius for 2 h, and then at a ratio by molar between alkyl phenol polyoxypropylene polyoxyethylene ether and the carboxylating agent of 1:2 there was added chloropropionic acid, heated to 75 degrees Celsius and reacted for 9 h, upon completion of the reaction, then neutralized with a 5 wt % aqueous HCl solution to a pH value of 2, allowed to stand for layer separation, separated off the aqueous phase, the oil phase was adjusted with a 10 wt % aqueous NaOH solution to a pH value of 8, dried under vacuum, to obtain a sodium alkyl phenol polyoxypropylene polyoxyethylene ether carboxylate. The sodium alkyl phenol polyoxypropylene polyoxyethylene ether carboxylate was formulated into a 10 wt % dichloromethane solution, and then sulfonated in a falling-film sulfonation reactor into a sodium alkyl phenol polyoxypropylene polyoxyethylene ether carboxylate sulfonic acid. The solvent dichloromethane was removed by rotary evaporation, the resultant was adjusted with a 50 wt % NaOH solution, to obtain a sodium alkyl phenol polyoxypropylene polyoxyethylene ether carboxylate sulfonate.

Dodecyl trimethyl ammonium chloride and the thus produced sodium alkyl phenol polyoxypropylene polyoxyethylene ether carboxylate sulfonate were dissolved into water respectively, stirred for 30 minutes, and formulated into a 0.3 wt % aqueous solution, and then the thus obtained solutions at a ratio by molar between the cationic surfactant and the anionic-nonionic surfactant of 1:4 were mixed till homogenous, to obtain the surfactant composition I-5a, the particulars of which were listed in Table I-1a.

Example I-6a

Alkyl naphthol polyoxypropylene polyoxyethylene ether and NaOH at a ratio by molar of 1:3 were introduced into a reactor, alkalized at 65 degrees Celsius for 2 h, and then at a ratio by molar between alkyl naphthol polyoxypropylene polyoxyethylene ether and the carboxylating agent of 1:2 there was added chloropropionic acid, heated to 75 degrees Celsius and reacted for 9 h, upon completion of the reaction, then neutralized with a 5 wt % aqueous HCl solution to a pH value of 2, allowed to stand for layer separation, separated off the aqueous phase, the oil phase was adjusted with a 10 wt % aqueous NaOH solution to a pH value of 8, dried under vacuum, to obtain a sodium alkyl naphthol polyoxypropylene polyoxyethylene ether carboxylate. The sodium alkyl naphthol polyoxypropylene polyoxyethylene ether carboxylate was formulated into a 10 wt % dichloromethane solution, then sulfonated in a falling-film sulfonation reactor into a sodium alkyl naphthol polyoxypropylene polyoxyethylene ether carboxylate disulfonic acid. The solvent dichloromethane was removed by rotary evaporation, then the resultant was adjusted with a 50 wt % NaOH solution, to obtain a sodium alkyl naphthol polyoxypropylene polyoxyethylene ether carboxylate disulfonate.

Benzyl triethyl ammonium chloride and the thus produced sodium alkyl naphthol polyoxypropylene polyoxyethylene ether carboxylate disulfonate were dissolved into water respectively, stirred for 30 minutes, and formulated into a 0.3 wt % aqueous solution, and then the thus obtained solutions at a ratio by molar between the cationic surfactant and the anionic-nonionic surfactant of 1:2 were mixed till homogenous, to obtain the surfactant composition I-6a, the particulars of which were listed in Table I-1a.

Example I-7a

Alkyl benzenediol polyoxypropylene polyoxyethylene ether and NaOH at a ratio by molar of 1:3 were introduced into a reactor, alkalized at 65 degrees Celsius for 2 h, and then at a ratio by molar between alkyl benzenediol polyoxypropylene polyoxyethylene ether and the carboxylating agent of 1:2 there was added chloropropionic acid, heated to 75 degrees Celsius and reacted for 9 h, upon completion of the reaction, then neutralized with a 5 wt % aqueous HCl solution to a pH value of 2, allowed to stand for layer separation, separated off the aqueous phase, the oil phase was adjusted with a 10 wt % aqueous NaOH solution to a pH value of 8, dried under vacuum, to obtain a sodium alkyl benzenediol polyoxypropylene polyoxyethylene ether carboxylate. The sodium alkyl benzenediol polyoxypropylene polyoxyethylene ether carboxylate was formulated into a 10 wt % dichloromethane solution, and then sulfonated in a falling-film sulfonation reactor into alkyl benzenediol di(sodium polyoxypropylene polyoxyethylene ether carboxylate) sulfonic acid. The solvent dichloromethane was removed by rotary evaporation, then the resultant was adjusted with a 50 wt % NaOH solution, to obtain a sodium alkyl benzenediol di(sodium polyoxypropylene polyoxyethylene ether carboxylate) sulfonate.

Trioctyl (polyoxyethylene ether (n=2) polyoxypropylene ether (n=3.6)) ammonium chloride and the thus produced sodium alkyl benzenediol di(sodium polyoxypropylene polyoxyethylene ether carboxylate) sulfonate were dissolved into water respectively, stirred for 30 minutes, and formulated into a 0.3 wt % aqueous solution, and then the thus obtained solutions at a ratio by molar between the cationic surfactant and the anionic-nonionic surfactant of 1:3 were mixed till homogenous, to obtain the surfactant composition I-7a, the particulars of which were listed in Table I-1a.

Example I-8a

The surfactant composition produced by Example I-3a and a 0.15 wt % aqueous solution of polyacrylamide (having a molecular weight of 26,000,000) were mixed till homogenous, to obtain a flooding fluid composition for tertiary oil recovery.

TABLE 1a

The particulars of the surfactant composition

| Example I- | the structure of the cationic surfactant | the structure of the anionic-nonionic surfactant 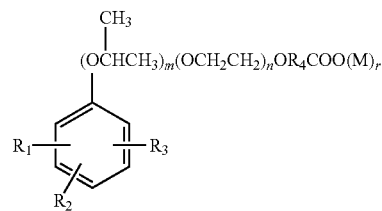 | 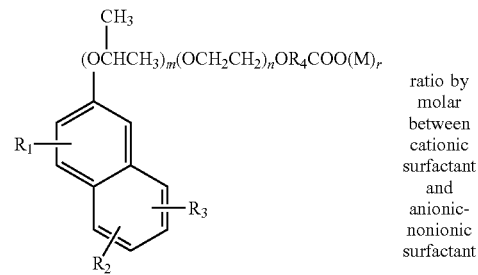 | ratio by molar between cationic surfactant and anionic-nonionic surfactant |
|---|---|---|---|---|
| 1a | polyoxypropylene ether (n = 2) triethyl ammonium hydroxide | $m = 50$, $n = 34.5$, $R_1 = R_2 = R_3 = H$, $R_4 = $ —$CH_2$—, $r = 1$, $M = Na$ | | 1:10 |

TABLE 1a-continued

| | | | |
|---|---|---|---|
| 2a | dodecyl trimethyl ammonium chloride | $m = 28$, $n = 7.6$, $R_1 = -C_6H_4SO_3(Ca)_{0.5}$, $R_2 = R_3 = H$, $R_4 = -C_2H_4-$, $r = 0.5$, $M = Ca$ | | 1:0.9 |
| 3a | bis(polyoxypropylene ether (n = 3.1)) dimethyl ammonium chloride | $m = 39$, $n = 50$, $R_1 = -C_6H_5$, $R_1 = R_2 = H$, $R_4 = CH_2$, $r = 1$, $M = K$ | | 1:4 |
| 4a | tetraoctyl ammonium chloride | $m = 20$, $n = 20$, $R_1 = -C_6H_4COONa$, $R_1 = R_2 = H$, $R_4 = C_3H_6$, $r = 1$, $M = Na$ | | 1:6 |
| 5a | dodecyl trimethyl ammonium chloride | $m = 5$, $n = 14.5$, $R_1 = -C_{12}H_{25}$, $R_2 = -SO_3Na$, $R_3 = H$, $R_4 = -CH_2-$, | | 1:4 |
| 6a | benzyl triethyl ammonium chloride | | $m = 15$, $n = 25$, $R_1 = -C_{18}H_{37}$, $R_2 = R_3 = -SO_3Na$, $R_4 = -CH_2-$ | 1:2 |
| 7a | trioctyl (polyoxyethylene ether (n = 2) polyoxypropylene ether (n = 3.6)) ammonium chloride | $R_1 = -C_{17}H_{35}$, $R_2 = -SO_3Na$, $R_3 = -(OCH(CH_3)CH_2)_{m1}(OCH_2CH_2)_{n1}CH_2COONa$, $R_4 = -CH_2-$, $m + m1 = 25$, $n + n1 = 11$ | | 1:3 |

Example I-5a Interfacial Performance Test of the Surfactant Composition

TX-500C type spinning drop interfacial tensiometer was used to identify the oil-water interfacial tension between each surfactant composition and the IV5-11 reservoir crude oil from the Henan Shuanghe Oilfield, with a test temperature of 81 degrees Celsius, a formation water of $NaHCO_3$ type, a TDS of 7947 mg/L, a chloride ion content of 2002 mg/L, a $Ca^{2+}$ content of 20 mg/L, a $Mg^{2+}$ content of 12.2 mg/L, a surfactant composition concentration of 0.3 wt %.

TABLE 1a

The oil-water interfacial tension between the surfactant composition and the IV5-11 reservoir crude oil from the Henan Shuanghe Oilfield

| Example I- | interfacial tension (mN/m) |
|---|---|
| 1a | 0.0059 |
| 2a | 0.0068 |
| 3a | 0.0001 |
| 4a | 0.0062 |
| 5a | 0.0003 |
| 6a | 0.0030 |
| 7a | 0.0070 |
| 8a | 0.0010 |

As can be seen from Table 1a, the surfactant composition produced by each of Example I-1a to 4a exhibits desirable interfacial performance with the crude oil from the Henan Oilfield. Example I-8a reveals that, the thus produced surfactant composition still exhibits desirable interfacial performance, even after compounded with a polymer.

The surfactant composition produced by Example I-3a was formulated into different concentrations, each was tested the oil-water interfacial tension with the IV5-11 reservoir crude oil from the Henan Shuanghe Oilfield. The results were listed in Table 2a.

TABLE 2a

The oil-water interfacial tension between the surfactant composition 3a (at different concentrations) and the IV5-11 reservoir crude oil from the Henan Shuanghe Oilfield

| | surfactant composition concentration (wt %) | | | | | |
|---|---|---|---|---|---|---|
| | 0.01 | 0.02 | 0.05 | 0.1 | 0.2 | 0.3 |
| interfacial tension (mN/m) | 0.006 | 0.003 | 0.0008 | 0.0003 | 0.0002 | 0.0001 |

These results reveal that, the surfactant composition of this invention exhibits a relatively higher oil-water interfacial activity with the crude oil from the Henan Oilfield.

TX-500C type spinning drop interfacial tensiometer was used to identify the oil-water interfacial tension between the surfactant composition produced by Example I-4a and a crude oil from the third oil plant of the Zhongyuan Oilfield, with a test temperature of 80 degrees Celsius, a formation water with a TDS of 79439 mg/L, a $Ca^{2+}$ content of 592 mg/L, a $Mg^{2+}$ content of 2871 mg/L, a surfactant composition concentration of 0.3 wt %. The oil-water interfacial tension was observed as low as 0.002 mN/m. This tensiometer was further used to identify the oil-water interfacial tension between the surfactant composition produced by Example I-6a and a crude oil from the fifth oil plant of the Zhongyuan Oilfield, with a test temperature of 80 degrees Celsius, a formation water with a TDS of 200000 mg/L, a $Ca^{2+}$ content of 800 mg/L, a $Mg^{2+}$ content of 3600 mg/L, a surfactant composition concentration of 0.3 wt %. The oil-water interfacial tension was observed as low as 0.0006 mN/m. This reveals that the surfactant composition of this invention shows versatile applicability, not only to a reservoir with a low TDS, but also to a reservoir at elevated temperatures and high salinity, with desirable interfacial performances.

TABLE 1a

The oil-water interfacial tension between the surfactant composition and the IV5-11 reservoir crude oil from the Henan Shuanghe Oilfield

| Example I- | crude oil from the third oil plant of the Zhongyuan Oilfield | crude oil from the fifth oil plant of the Zhongyuan Oilfield |
|---|---|---|
| 1a | 0.008 | 0.01 |
| 2a | 0.009 | 0.015 |

TABLE 1a-continued

The oil-water interfacial tension between the surfactant composition and the IV5-11 reservoir crude oil from the Henan Shuanghe Oilfield

| Example I- | crude oil from the third oil plant of the Zhongyuan Oilfield | crude oil from the fifth oil plant of the Zhongyuan Oilfield |
| --- | --- | --- |
| 3a | 0.01 | 0.009 |
| 4a | 0.009 | 0.02 |
| 5a | 0.0087 | 0.012 |
| 6a | 0.0008 | 0.007 |
| 7a | 0.0005 | 0.0006 |

Example I-6a Oil Washing Capability Test of the Surfactant Composition

The IV5-11 reservoir oil sand from the Henan Shuanghe Oilfield at an oil:sand ratio of 1:4 (by weight) was aged at 81 degrees Celsius for 7 days, stirred for 5 minutes every 2 hours. Then 5 g of the thus aged oil sand and a 0.3 wt % surfactant solution at an oil sand:solution ratio by weight of 1:10 were mixed till homogenous, aged at the reservoir temperature for 48 h, then crude oil in the solution was extracted with petroleum ether, adjusted with a 50 ml colorimetric tube to a metered volume, colorimetric analysized with a spectrophotometer at a wavelength of 430 nm. The concentration of crude oil in the surfactant solution was calculated by referring to the standard curve.

TABLE 3a

The oil washing performance of the surfactant composition

| Example I- | oil washing rate % |
| --- | --- |
| 1a | 61.5 |
| 2a | 63.5 |
| 3a | 68.9 |
| 4a | 66.7 |
| 5a | 72.4 |
| 6a | 75.6 |
| 7a | 77.3 |
| 8a | 65.2 |

Example I-7a Study on the Oil Displacement Performance of the Surfactant Composition The oil displacement test was performed on a cylindrical natural core of sandstone having a length of 30 cm, a diameter of 2.5 cm and a permeability of 1.5 μm². The core was firstly injected with the IV5-11 reservoir formation water from the Henan Shuanghe Oilfield till no crude oil was found in the effluent, then with a 0.3 PV (pore volume of the core) of the surfactant composition, then with water till no crude oil was found in the effluent. The results were listed in Table 4a.

TABLE 5a

The test results of the oil displacement

| surfactant composition No. | Increased oil recovery % OOIP |
| --- | --- |
| 1a | 7.2 |
| 2a | 7.5 |
| 3a | 7.9 |
| 4a | 7.3 |

TABLE 5a-continued

The test results of the oil displacement

| surfactant composition No. | Increased oil recovery % OOIP |
| --- | --- |
| 5a | 8.2 |
| 6a | 8.8 |
| 7a | 9.5 |
| 8a | 10.3 |

Comparative Example I-1a

According to Gong Yujun et. al, Journal of Northwest University (Natural Science Edition), Vol. 30 (1), pp. 28 to 31, February 2000, hexadecyl trimethyl ammonium bromide (CTAB) and sodium dodecyl sulfate (SDS) were combined at a ratio by molar of 1:1.5, and tested at a concentration of 0.3 wt % for its oil-water interfacial tension, oil washing rate and oil displacement performance with the IV5-11 reservoir crude oil from the Henan Shuanghe Oilfield. The results were listed as follows.

TABLE 6a

The performance of the reference flooding fluid

| interfacial tension (mN/m) | oil washing rate % | increased oil recovery % OOIP |
| --- | --- | --- |
| 0.03 | 45.6 | 2.8 |

Comparative Example I-2a

According to Huang Hongdu et. al, Journal of Oil and Gas Technology, Vol. 29(4), August 2007 (pp. 101 to 104), 0.01 wt % hexadecyl trimethyl ammonium bromide, 0.02 wt % anionic petroleum sulfonate salt and 1.8 wt % $Na_2CO_3$ were combined, and tested at a concentration of 0.3 wt % for its oil-water interfacial tension, oil washing rate and oil displacement performance with the IV5-11 reservoir crude oil from the Henan Shuanghe Oilfield. The results were listed as follows.

TABLE 7a

The performance of the reference flooding fluid

| interfacial tension (mN/m) | oil washing rate % | increased oil recovery % OOIP |
| --- | --- | --- |
| 0.008 | 56.3 | 4.2 |

Example I-1b $C_5H_{11}OH$ and NaOH at a ratio by molar of 1:5 were mixed and stirred for 30 minutes, and then there was added a predetermined amount of propylene oxide, reacted at 140 degrees Celsius for 10 h, and then there was added a predetermined amount of ethylene oxide, further reacted at 140 degrees Celsius for 1 h; and then at a ratio by molar between $C_5H_{11}OH$ and the carboxylating agent of 1:1 there was added sodium chloroacetate, further reacted at 50 degrees Celsius for 20 h, then neutralized with a 5 wt % aqueous HCl solution to a pH value of 2, allowed to stand for layer separation, separated off the aqueous phase, the oil phase was adjusted with a 10 wt % aqueous NaOH solution to a pH value of 8, dried under vacuum, to obtain an anionic-nonionic surfactant.

Phenyl trimethyl ammonium chloride and the thus produced anionic-nonionic surfactant were dissolved into water respectively, stirred for 30 minutes, formulated into a 0.3 wt % aqueous solution, and then the thus obtained solutions at a ratio by molar between the cationic surfactant and the anionic-nonionic surfactant of 1:10 were mixed till homogenous, to obtain the surfactant composition 1b, the particulars of which were listed in Table 1b.

Example I-2b

Fatty alcohol $C_{20}H_{41}OH$ and KOH at a ratio by molar of 1:2.5 were mixed and stirred for 30 minutes, then there was added a predetermined amount of propylene oxide, reacted at 100 degrees Celsius for 10 h; and then there was added a predetermined amount of ethylene oxide, reacted at 140 degrees Celsius for 10 h, and then at a ratio by molar between the fatty alcohol and the carboxylating agent of 1:1.5 there was added $ClCH_2CH_2COOH$, further reacted at 100 degrees Celsius for 1 h, then neutralized with a 5 wt % aqueous solution of HCl to a pH value of 2, allowed to stand for layer separation, separated off the aqueous phase, the oil phase was adjusted with a 10 wt % aqueous KOH solution to a pH value of 8, dried under vacuum, to obtain an anionic-nonionic surfactant.

Decyl triethyl ammonium hydroxide and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:7 were mixed till homogenous, to obtain the surfactant composition 2b, the particulars of which were listed in Table 1b.

Example I-3b

Fatty alcohol $C_{14}H_{29}OH$ and NaOH at a ratio by molar of 1:4 were mixed and stirred for 30 minutes, then there was added a predetermined amount of propylene oxide, reacted at 140 degrees Celsius for 5 h; and then there was added a predetermined amount of ethylene oxide, reacted at 160 degrees Celsius for 6 h; and then at a ratio by molar between the fatty alcohol and the carboxylating agent of 1:1.5 there was added $ClCH_2COOH$, further reacted at 70 degrees Celsius for 8 h, then neutralized with a 5 wt % aqueous solution of HCl to a pH value of 2, allowed to stand for layer separation, separated off the aqueous phase, the oil phase was adjusted with a 10 wt % aqueous $Mg(OH)_2$ suspension to a pH value of 8, dried under vacuum, to obtain an anionic-nonionic surfactant.

Triethyl (polyoxyethylene ether (n=2) polyoxypropylene ether (n=3)) ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.3 were mixed till homogenous, to obtain the surfactant composition 3b, the particulars of which were listed in Table 1b.

Example I-4b

Fatty alcohol $C_{16}H_{33}OH$ and NaOH at a ratio by molar of 1:5 were mixed and stirred for 30 minutes, and then there was added a predetermined amount of propylene oxide, reacted at 140 degrees Celsius for 1 h, and then there was added a predetermined amount of ethylene oxide, further reacted at 140 degrees Celsius for 4 h; and then at a ratio by molar between the fatty alcohol and the carboxylating agent of 1:2 there was added $ClCH_2COOH$, further reacted at 80 degrees Celsius for 5 h, then neutralized with a 5 wt % aqueous solution of HCl to a pH value of 2, allowed to stand for layer separation, separated off the aqueous phase, the oil phase was adjusted with a 10 wt % aqueous $Ca(OH)_2$ suspension to a pH value of 8, dried under vacuum, to obtain an anionic-nonionic surfactant.

Benzyl triethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:5 were mixed till homogenous, to obtain the surfactant composition 4b, the particulars of which were listed in Table 1b.

Example I-5b

Fatty alcohol $C_{10}H_{21}OH$ and NaOH at a ratio by molar of 1:5 were mixed and stirred for 30 minutes, then there was added a predetermined amount of propylene oxide, reacted at 140 degrees Celsius for 10 h, and then there was added a predetermined amount of ethylene oxide, further reacted at 150 degrees Celsius for 8 h; and then at a ratio by molar between the fatty alcohol and the carboxylating agent of 1:2 there was added $ClCH_2COONa$, then neutralized with a 5 wt % aqueous solution of HCl to a pH value of 2, allowed to stand for layer separation, separated off the aqueous phase, the oil phase was adjusted with a 10 wt % aqueous ammonia to a pH value of 8, dried under vacuum, to obtain an anionic-nonionic surfactant.

Tetrabutyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:0.4 were mixed till homogenous, to obtain the surfactant composition 5b, the particulars of which were listed in Table 1b.

Example I-6b

The surfactant composition produced by Example I-5b and a 0.15 wt % aqueous solution of polyacrylamide (having a molecular weight of 26000000) were mixed till homogenous, to obtain a flooding fluid composition for tertiary oil recovery.

TABLE 1b

The particles of the surfactant composition

| Example I- | the structure of the cationic surfactant | the structure of the anionic-nonionic surfactant $R_1(OCHCH_2)_m(OCH_2CH_2)_nOR'COO(M)r$ $\|$ $CH_3$ | ratio by molar between cationic surfactant and anionic-nonionic surfactant |
|---|---|---|---|
| 1b | phenyl trimethyl ammonium chloride | $R = -C_5H_{11}$, $R' = -CH_2$, $m = 16$, $n = 0.5$, $r = 1$, $M = Na$ | 1:10 |
| 2b | decyl triethyl ammonium hydroxide | $R = -C_{20}H_{41}$, $R' = -CH_2CH_2$, $m = 2.3$, $r = 1$, $n = 8.2$, $M = K$ | 1:7 |
| 3b | triethyl (polyoxyethylene ether (n = 2)) polyoxypropylene ether (n = 3) ammonium chloride | $R = -C_{14}H_{29}$, $R' = -CH_2$, $m = 50$, $n = 30$, $r = 0.5$, $M = Mg$ | 1:1.3 |
| 4b | benzyl triethyl ammonium chloride | $R = -C_{16}H_{33}$, $R' = -CH_2$, $m = 0.5$, $n = 7$, $r = 0.5$, $M = Ca$ | 1:5 |
| 5b | tetrabutyl ammonium chloride | $R = -C_{10}H_{21}$, $R' = -CH_2$, $m = 3.2$, $n = 10$, $r = 1$, $M = NH_4$ | 1:0.4 |

Example I-7b Interfacial Performance Test of the Surfactant Composition

TX-500C type spinning drop interfacial tensiometer was used to identify the oil-water interfacial tension between each surfactant composition and the IV5-11 reservoir crude oil from the Henan Shuanghe Oilfield, at a surfactant composition concentration of 0.3 wt %, with a test temperature of 81 degrees Celsius, a formation water of $NaHCO_3$ type, a TDS of 7947 mg/L, a chloride ion content of 2002 mg/L, a $Ca^{2+}$ content of 20 mg/L, a $Mg^{2+}$ content of 12.2 mg/L.

TABLE 2c

The oil-water interfacial tension between the surfactant composition and the IV5-11 reservoir crude oil from the Henan Shuanghe Oilfield

| Example I- | interfacial tension (mN/m) |
|---|---|
| 1b | 0.0075 |
| 2b | 0.0062 |
| 3b | 0.0040 |
| 4b | 0.0003 |
| 5b | 0.0075 |
| 6b | 0.0005 |

As can be seen from Table 2c, the surfactant composition produced by each of Example I-1b to 5b exhibits desirable interfacial performance with the crude oil from the Henan Oilfield. Example I-6b reveals that, the thus produced surfactant composition still exhibits desirable interfacial performance, even after compounded with a polymer.

The surfactant composition produced by Example I-5b was formulated into different concentrations, each was tested the oil-water interfacial tension with the IV5-11 reservoir crude oil from the Henan Shuanghe Oilfield. The results were listed in Table 3b.

TABLE 3b

The oil-water interfacial tension between the surfactant composition 3b (at different concentrations) and the IV5-11 reservoir crude oil from the Henan Shuanghe Oilfield

| | surfactant composition concentration (wt %) | | | | | |
|---|---|---|---|---|---|---|
| | 0.01 | 0.02 | 0.05 | 0.1 | 0.2 | 0.3 |
| interfacial tension (mN/m) | 0.005 | 0.003 | 0.002 | 0.0003 | 0.0002 | 0.0001 |

These results reveal that, the surfactant composition of this invention exhibits a relatively higher oil-water interfacial activity for the crude oil from the Henan Oilfield.

TX-500C type spinning drop interfacial tensiometer was used to identify the oil-water interfacial tension between the surfactant composition produced by Example I-3c and a crude oil from the third oil plant of the Zhongyuan Oilfield, with a test temperature of 80 degrees Celsius, a formation water with a TDS of 79439 mg/L, a $Ca^{2+}$ content of 592 mg/L, a $Mg^{2+}$ content of 2871 mg/L, a surfactant composition concentration of 0.3 wt %. The oil-water interfacial tension was observed as low as 0.001 mN/m. This reveals that the surfactant composition of this invention shows versatile applicability, not only to a reservoir with a low TDS, but also to a reservoir at elevated temperatures and high salinity, with desirable interfacial performances.

Example I-6b Oil Washing Capability Test of the Surfactant Composition

The IV5-11 reservoir oil sand from the Henan Shuanghe Oilfield at an oil:sand ratio of 1:4 (by weight) was aged at 81 degrees Celsius for 7 days, stirred for 5 minutes every 2 hours. Then 5 g of the thus aged oil sand and a 0.3 wt % solution of the surfactant composition at an oil sand:solution ratio of 1:10 (by weight) were mixed till homogenous, aged at the reservoir temperature for 48 h, then crude oil in the solution was extracted with petroleum ether, adjusted with a 50 ml colorimetric tube to a metered volume, colorimetric analysized with a spectrophotometer at a wavelength of 430 nm. The concentration of crude oil in the surfactant solution was calculated by referring to the standard curve.

TABLE 4b

The oil washing performance of the surfactant composition

| Example I- | oil washing rate % |
|---|---|
| 1b | 64.0 |
| 2b | 59.4 |
| 3b | 55.9 |
| 4b | 65.1 |
| 5b | 52.9 |
| 6b | 60.8 |

Example I-6b Study on the Oil Displacement Performance of the Surfactant Composition The oil displacement test was performed on a cylindrical natural core of sandstone having a length of 30 cm, a diameter of 2.5 cm and a permeability of 1.5 µm$^2$. The core was firstly injected with the IV5-11 reservoir formation water from the Henan Shuanghe Oilfield till no crude oil was found in the effluent, then with a 0.3 PV (pore volume of the core) of the surfactant composition, then with water till no crude oil was found in the effluent. The results were listed in Table 5b.

TABLE 5b

Oil displacement test results of the surfactant composition

| Example I- | increased oil recovery % OOIP |
|---|---|
| 1b | 7.9 |
| 2b | 6.2 |
| 3b | 7.0 |
| 4b | 9.1 |
| 5b | 6.3 |
| 6b | 8.2 |

Example II-1

Dodecyl amine and KOH at a ratio by molar of 1:2 were introduced into a reactor, stirred for 30 minutes, and then there was added a predetermined amount of propylene oxide, reacted at 200 degrees Celsius for 1 h, then there was added a predetermined amount of ethylene oxide, reacted at 160 degrees Celsius for 3 h; finally there was added chloroacetic acid at a ratio by molar between dodecyl amine and the carboxylating agent of 1:1, further reacted at 50 degrees Celsius for 20 h, upon completion of the reaction, the reaction mixture was adjusted with a 5 wt % aqueous HCl solution to a pH value of 1, allowed to stand for layer separation. separated off the aqueous phase, the oil phase was adjusted with a 10 wt % aqueous KOH solution to a pH value of 8, water was removed by vacuum evaporation, to obtain an anionic-nonionic surfactant.

Octadecyl dimethyl benzyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:0.1 were mixed till homogenous, to obtain the surfactant composition II-1, the particulars of which were listed in Table II-1.

Example II-2 o-phenyl aniline and NaOH at a ratio by molar of 1:6 were introduced into a reactor, stirred for 30 minutes, there was added a predetermined amount of ethylene oxide, reacted at 160 degrees Celsius for 3 h, then there was added a predetermined amount of ethylene oxide, reacted at 160 degrees Celsius for 7 h; finally there was added a mixture of sodium chloroacetate and sodium chloromethyl sulfonate (at a ratio by molar of 1:1) at a ratio by molar between o-phenyl aniline and the carboxylating agent of 1:5, further reacted at 50 degrees Celsius for 14 h, upon completion of the reaction, the reaction mixture was adjusted with a 5 wt % aqueous HCl solution to a pH value of 1, allowed to stand for layer separation. separated off the aqueous phase, while the oil phase was adjusted with a 10 wt % aqueous NaOH solution to a pH value of 9, water was removed by vacuum evaporation, to obtain an anionic-nonionic surfactant.

Tetrabutyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:0.5 were mixed till homogenous, to obtain the surfactant composition II-2, the particulars of which were listed in Table II-1.

Example II-3

Cyclohexylamine and NaOH at a ratio by molar of 1:4 were introduced into a reactor, stirred for 30 minutes, there was added a predetermined amount of propylene oxide, reacted at 100 degrees Celsius for 20 h, then there was added a predetermined amount of ethylene oxide, reacted at 150 degrees Celsius for 8 h; finally there was added chloroacetic acid at a ratio by molar between cyclohexylamine and the carboxylating agent of 1:2, further reacted at 150 degrees Celsius for 16 h, upon completion of the reaction, the reaction mixture was adjusted with a 5 wt % aqueous HCl solution to a pH value of 2, allowed to stand for layer separation. separated off the aqueous phase, while the oil phase was adjusted with a 10 wt % aqueous NaOH solution to a pH value of 9, removing the solvent under vacuum, to obtain an anionic-nonionic surfactant.

Tributyl (polyoxyethylene ether (n=1.6)) polyoxypropylene ether (n=2.7) ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:10 were mixed till homogenous, to obtain the surfactant composition II-3, the particulars of which were listed in Table II-1.

Example II-4

2-naphthyl amine and NaOH at a ratio by molar of 1:4 were introduced into a reactor, stirred for 30 minutes, there was added a predetermined amount of propylene oxide, reacted at 120 degrees Celsius for 15 h, then there was added a predetermined amount of ethylene oxide, reacted at 130 degrees Celsius for 15 h; finally there was added sodium chloroacetate at a ratio by molar between 2-naphthyl amine and the carboxylating agent of 1:7, further reacted at 75 degrees Celsius for 16 h, upon completion of the reaction, the reaction mixture was adjusted with a 5 wt % aqueous HCl solution to a pH value of 2, allowed to stand for layer separation. separated off the aqueous phase, while the oil phase was adjusted with a 10 wt % aqueous NaOH solution to a pH value of 8, dried under vacuum, to obtain an anionic-nonionic surfactant.

Decyl triethyl ammonium hydroxide and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:6 were mixed till homogenous, to obtain the surfactant composition II-4, the particulars of which were listed in Table II-1.

Example II-5

Hexadecyl amine and NaOH at a ratio by molar of 1:2 were introduced into a reactor, stirred for 30 minutes, there was added a predetermined amount of propylene oxide, reacted at 150 degrees Celsius for 10 h, then there was added sodium chloroacetate at a ratio by molar between hexadecyl amine and the carboxylating agent of 1:5, further reacted at 60 degrees Celsius for 14 h, upon completion of the reaction, the reaction mixture was adjusted with a 5 wt % aqueous HCl solution to a pH value of 2, allowed to stand for layer separation. separated off the aqueous phase, the oil phase was adjusted with a 10 wt % aqueous $Ca(OH)_2$ suspension to a pH value of 9, dried under vacuum, to obtain an anionic-nonionic surfactant.

Phenyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.4 were mixed till homogenous, to obtain the surfactant composition II-5, the particulars of which were listed in Table II-1.

Example II-6

Octadecyl amine and NaOH at a ratio by molar of 1:2 were introduced into a reactor, stirred for 30 minutes, there was added a predetermined amount of propylene oxide reacted at 180 degrees Celsius for 3 h, then there was added a predetermined amount of ethylene oxide, reacted at 100 degrees Celsius for 20 h; then there was added sodium chloroacetate at a ratio by molar between octadecyl amine and the carboxylating agent of 1:3, further reacted at 70 degrees Celsius for 12 h, upon completion of the reaction, the reaction mixture was adjusted with a 5 wt % aqueous HCl solution to a pH value of 2, allowed to stand for layer separation. separated off the aqueous phase, the oil phase was adjusted with a 10 wt % aqueous $Mg(OH)_2$ suspension to a pH value of 9, dried under vacuum, to obtain an anionic-nonionic surfactant.

Benzyl triethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.8 were mixed till homogenous, to obtain the surfactant composition II-6, the particulars of which were listed in Table II-1.

Example II-7

Oleyl amine and NaOH at a ratio by molar of 1:2 were introduced into a reactor, stirred for 30 minutes, there was added a predetermined amount of propylene oxide, reacted at 160 degrees Celsius for 3 h, then there was added a predetermined amount of ethylene oxide, reacted at 120 degrees Celsius for 12 h; finally there was added a mixture of sodium chloroacetate and sodium chloromethyl sulfonate (at a ratio by molar of 1:1) at a ratio by molar between oleyl amine and the carboxylating agent of 1:5, further reacted at 55 degrees Celsius for 12 h. Upon completion of the reaction, the reaction mixture was adjusted with a 5 wt % aqueous HCl solution to a pH value of 3, allowed to stand for layer separation, separated off the aqueous phase, the oil phase was adjusted with a 10 wt % aqueous ammonia to a pH value of 10, water was removed by vacuum evaporation, to obtain an anionic-nonionic surfactant.

Dodecyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:2.5 were mixed till homogenous, to obtain the surfactant composition II-7, the particulars of which were listed in Table II-1.

Example II-8

Octadecyl amine and NaOH at a ratio by molar of 1:4 were introduced into a reactor, stirred for 30 minutes, there was added a predetermined amount of propylene oxide, reacted at 160 degrees Celsius for 4 h, then there was added a predetermined amount of ethylene oxide; then there was added sodium chloroacetate at a ratio by molar between octadecyl amine the carboxylating agent of 1:5, further reacted at 50 degrees Celsius for 14 h. Upon completion of the reaction, the reaction mixture was adjusted with a 5 wt % aqueous HCl solution to a pH value of 2, allowed to stand for layer separation, separated off the aqueous phase, the oil phase was adjusted with a 10 wt % aqueous $Mg(OH)_2$ suspension to a pH value of 9, water was removed by vacuum evaporation, to obtain an anionic-nonionic surfactant.

Hexadecyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:8 were mixed till homogenous, to obtain the surfactant composition II-8, the particulars of which were listed in Table II-1.

Example II-9

Aniline and NaOH at a ratio by molar of 1:3 were introduced into a reactor, stirred for 30 minutes, there was added a predetermined amount of propylene oxide, reacted at 160 degrees Celsius for 3 h, then there was added a predetermined amount of ethylene oxide, reacted at 160 degrees Celsius for 7 h; finally there was added sodium chloroacetate at a ratio by molar between aniline and the carboxylating agent of 1:3, further reacted at 80 degrees Celsius for 8 h, upon completion of the reaction, the reaction mixture was adjusted with a 5 wt % aqueous HCl solution to a pH value of 2, allowed to stand for layer separation. separated off the aqueous phase, while the oil phase was adjusted with a 10 wt % aqueous NaOH solution to a pH value of 9, dried under vacuum, to obtain an anionic-nonionic surfactant.

Bisoctadecyl dimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:4 were mixed till homogenous, to obtain the surfactant composition II-9, the particulars of which were listed in Table II-1.

Example II-10

Cyclohexylamine and NaOH at a ratio by molar of 1:3 were introduced into a reactor, stirred for 30 minutes, there was added a predetermined amount of propylene oxide, reacted at 160 degrees Celsius for 5 h, then there was added a predetermined amount of ethylene oxide, reacted at 150 degrees Celsius for 8 h; finally there was added sodium chloroacetate at a ratio by molar between cyclohexylamine and the carboxylating agent of 1:3, further reacted at 80 degrees Celsius for 8 h, upon completion of the reaction, the reaction mixture was adjusted with a 5 wt % aqueous HCl solution to a pH value of 2, allowed to stand for layer separation, separated off the aqueous phase, the oil phase was adjusted with a 10 wt % aqueous ammonia to a pH value of 9, dried under vacuum, to obtain an anionic-nonionic surfactant.

Dodecyl dimethyl (polyoxyethylene ether (n=3.1)) polyoxypropylene ether (n=1.8) ammonium chloride and the thus produced anionic-nonionic surfactant were dissolved into water respectively, stirred for 30 minutes, formulated into a 0.3 wt % aqueous solution, and then the thus obtained solutions at a ratio by molar between the cationic surfactant and the anionic-nonionic surfactant of 1:1.3 were mixed till homogenous, to obtain the surfactant composition II-10, the particulars of which were listed in Table II-1.

Example II-11

Aniline and NaOH at a ratio by molar of 1:2 were introduced into a reactor, stirred for 30 minutes, there was added a predetermined amount of propylene oxide, reacted at 160 degrees Celsius for 5 h, then there was added a predetermined amount of ethylene oxide, reacted at 150 degrees Celsius for 8 h; finally there was added sodium chloroacetate at a ratio by molar between cyclohexylamine and the carboxylating agent of 1:2, further reacted at 60 degrees Celsius for 8 h, upon completion of the reaction, the reaction mixture was adjusted with a 5 wt % aqueous HCl solution to a pH value of 2, allowed to stand for layer separation, separated off the aqueous phase, dried under vacuum, to obtain an intermediate. The intermediate was formulated into a 10 wt % dichloromethane solution, sulfonated in a falling-film sulfonation reactor. The solvent dichloromethane was removed by rotary evaporation, then the resultant was adjusted with a 50 wt % $NH_4OH$ solution, to obtain an anionic-nonionic surfactant.

Bisdodecyl dimethyl ammonium chloride and the thus produced anionic-nonionic surfactant were dissolved into water respectively, stirred for 30 minutes, formulated into a 0.3 wt % aqueous solution, and then the thus obtained solutions at a ratio by molar between the cationic surfactant and the anionic-nonionic surfactant of 1:1.3 were mixed till homogenous, to obtain the surfactant composition II-11, the particulars of which were listed in Table II-1.

Example II-12

The surfactant composition produced by Example II-6 and a 0.15 wt % aqueous solution of polyacrylamide (having a molecular weight of 26000000) were mixed till homogenous, to obtain a flooding fluid composition for tertiary oil recovery.

TABLE II-1

The particulars of the surfactant composition

| Example II- | the structure of the catanoic surfactant | the structure of the anionic-nonionic surfactant $$RN \begin{matrix} (CHCH_3CH_2O)_{m1}(CH_2CH_2O)_{n1}R_1Y_1 \\ \diagdown \\ (CHCH_3CH_2O)_{m2}(CH_2CH_2O)_{n2}R_2Y_2 \end{matrix}$$ | ratio by molar between catanoic surfactant and anionic-nonionic surfactant |
|---|---|---|---|
| 1 | octadecyl dimethyl benzyl ammonium chloride | $R = -C_{12}H_{25}$, $R_1 = R_2 = CH_2$, $m_1 + m_2 = 30$, $n_1 + n_2 = 40$, $Y_1 = Y_2 = -COOK$ | 1:0.1 |
| 2 | tetrabutyl ammonium chloride | $R = -C_{12}H_9$, $R_1 = R_2 = CH_2$, $m_1 + m_2 = 10$, $n_1 + n_2 = 5$, one out of $Y_1$ and $Y_2$ representing $-COONa$, while the other representing $-SO_3Na$. | 1:0.5 |
| 3 | tributyl (polyoxyethylene ether (n = 1.6)) polyoxypropylene ether (n = 2.7) ammonium chloride | $R = -C_6H_{11}$, $R_1 = R_2 = (CH_2)_6$, $m_1 + m_2 = 22$, $n_1 + n_2 = 40$, $Y_1 = Y_2 = -COONa$ | 1:10 |
| 4 | decyl triethyl ammonium hydroxide | $R = -C_{10}H_7$, $R_1 = R_2 = CH_2CH(OH)CH_2$, $m_1 + m_2 = 8$, $n_1 + n_2 = 15$, $Y_1 = Y_2 = -COONa$ | 1:6 |
| 5 | phenyl trimethyl ammonium chloride | $R = -C_{16}H_{33}$, $R_1 = R_2 = CH_2$, $m_1 + m_2 = 0.5$, $n_1 + n_2 = 5$, $Y_1 = Y_2 = -COO(Ca)_{0.5}$ | 1:1.4 |
| 6 | benzyl triethyl ammonium chloride | $R = -C_{18}H_{37}$, $R_1 = R_2 = CH_2$, $m_1 + m_2 = 8$, $n_1 + n_2 = 2$, $Y_1 = Y_2 = -COO(Mg)_{0.5}$ | 1:1.8 |
| 7 | dodecyl trimethyl ammonium chloride | $R = -C_{18}H_{35}$, $R_1 = R_2 = CH_2CH_2$, $m_1 + m_2 = 12$, $n_1 + n_2 = 6$, one out of $Y_1$ and $Y_2$ representing $-COONH_4$, while the other representing $-SO_3NH_4$. | 1:2.5 |
| 8 | hexadecyl trimethyl ammonium chloride | $R = -C_{18}H_{37}$, $R_1 = R_2 CH_2CH_2$, $m_1 + m_2 = 8$, $n_1 + n_2 = 0$, $Y_1 = Y_2 = -COO(Mg)_{0.5}$ | 1:8 |
| 9 | bisoctadecyl dimethyl ammonium chloride | $R = -C_6H_5$, $R_1 = R_2 = CH_2$, $m_1 + m_2 = 50$, $n_1 + n_2 = 32$, $Y_1 = Y_2 = -COONa$ | 1:4 |
| 10 | dodecyl dimethyl (polyoxyethylene ether | $R = -C_6H_{11}$, $R_1 = R_2 = CH_2$, $m_1 + m_2 = 35$, $n_1 + n_2 = 50$, $Y_1 = Y_2 = -COONH_4$ | 1:1.3 |

TABLE II-1-continued

The particulars of the surfactant composition the structure of the anionic-nonionic surfactant $$RN \begin{matrix} (CHCH_3CH_2O)_{m1}(CH_2CH_2O)_{n1}R_1Y_1 \\ \diagdown \\ (CHCH_3CH_2O)_{m2}(CH_2CH_2O)_{n2}R_2Y_2 \end{matrix}$$

| Example II- | the structure of the catanoic surfactant | (anionic-nonionic structure) | ratio by molar between catanoic surfactant and anionic-nonionic surfactant |
|---|---|---|---|
| 11 | (n = 3.1)) (polyoxypropylene ether (n = 1.8)) ammonium chloride decyl triethyl ammonium hydroxide | R = —$C_6H_4SO_3Na$, $R_1 = R_2 = CH_2$, $m_1 + m_2 = 35$, $n_1 + n_2 = 50$, $Y_1 = Y_2 =$ —$COONH_4$ | 1:1.7 |

Example II-12 Interfacial Performance Test of the Surfactant Composition

TX-500C type spinning drop interfacial tensiometer was used to identify the oil-water interfacial tension between each surfactant composition and the IV5-11 reservoir crude oil from the Henan Shuanghe Oilfield, at a surfactant composition concentration of 0.3 wt %, with a test temperature of 81 degrees Celsius, a formation water of $NaHCO_3$ type, a TDS of 7947 mg/L, a chloride ion content of 2002 mg/L, a $Ca^{2+}$ content of 20 mg/L, a $Mg^{2+}$ content of 12.2 mg/L.

TABLE II-1

The oil-water interfacial tension between the surfactant composition and the IV5-11 reservoir crude oil from the Henan Shuanghe Oilfield

| Example II- | interfacial tension (mN/m) |
|---|---|
| 1 | 0.0071 |
| 2 | 0.0060 |
| 3 | 0.0055 |
| 4 | 0.0041 |
| 5 | 0.0008 |
| 6 | 0.0002 |
| 7 | 0.0028 |
| 8 | 0.0009 |
| 9 | 0.0005 |
| 10 | 0.0004 |
| 11 | 0.0037 |
| 12 | 0.0023 |

As can be seen from Table II-1, the surfactant composition produced by each of Example II-1 to 10 exhibits desirable interfacial performance with the crude oil from the Henan Oilfield. Example II-11 reveals that, the thus produced surfactant composition still exhibits desirable interfacial performance, even after compounded with a polymer.

The surfactant composition produced by Example II-10 was formulated into different concentrations, each was tested the oil-water interfacial tension with the IV5-11 reservoir crude oil from the Henan Shuanghe Oilfield. The results were listed in Table II-2.

TABLE II-2

The oil-water interfacial tension between the surfactant composition II-10 (at different concentrations) and the IV5-11 reservoir crude oil from the Henan Shuanghe Oilfield

| | surfactant composition concentration (wt %) | | | | | |
|---|---|---|---|---|---|---|
| | 0.01 | 0.02 | 0.05 | 0.1 | 0.2 | 0.3 |
| interfacial tension (mN/m) | 0.0056 | 0.004 | 0.002 | 0.001 | 0.0006 | 0.0004 |

These results reveals that, the surfactant composition of this invention exhibits a relatively higher oil-water interfacial activity for the crude oil from the Henan Oilfield.

TX-500C type spinning drop interfacial tensiometer was used to identify the oil-water interfacial tension between the surfactant composition produced by Example II-6 and a crude oil from the third oil plant of the Zhongyuan Oilfield, with a test temperature of 80 degrees Celsius, a formation water with a TDS of 79439 mg/L, a $Ca^{2+}$ content of 592 mg/L, a $Mg^{2+}$ content of 2871 mg/L, a surfactant composition concentration of 0.3 wt %. The oil-water interfacial tension was observed as low as 0.002 mN/m. This reveals that the surfactant composition of this invention shows versatile applicability, not only to a reservoir with a low TDS, but also to a reservoir at elevated temperatures and high salinity, with desirable interfacial performances.

Example II-13 Oil Washing Capability Test of the Surfactant Composition

The IV5-11 reservoir oil sand from the Henan Shuanghe Oilfield at an oil:sand ratio of 1:4 (by weight) was aged at 81 degrees Celsius for 7 days, stirred for 5 minutes every 2 hours. Then 5 g of the thus aged oil sand and a 0.3 wt % solution of the surfactant composition at an oil sand:solution ratio of 1:10 (by weight) were mixed till homogenous, aged at the reservoir temperature for 48 h, then crude oil in the solution was extracted with petroleum ether, adjusted with a 50 ml colorimetric tube to a metered volume, colorimetric analysized with a spectrophotometer at a wavelength of 430 nm. The concentration of crude oil in the surfactant solution was calculated by referring to the standard curve.

TABLE II-4

The oil washing performance of the surfactant composition

| Example II- | oil washing rate % |
|---|---|
| 1 | 53.1 |
| 2 | 54.8 |
| 3 | 56.2 |
| 4 | 59.0 |
| 5 | 66.8 |
| 6 | 68.8 |
| 7 | 66.5 |
| 8 | 65.1 |
| 9 | 69.7 |
| 10 | 68.9 |
| 11 | 73.6 |

Example II-14 Study on the Oil Displacement Performance of the Surfactant Composition The oil displacement test was performed on a cylindrical natural core of sandstone having a length of 30 cm, a diameter of 2.5 cm and a permeability of 1.5 μm$^2$. The core was firstly injected with the IV5-11 reservoir formation water from the Henan Shuanghe Oilfield till no crude oil was found in the effluent, then with a 0.3 PV (pore volume of the core) of the surfactant composition, then with water till no crude oil was found in the effluent. The results were listed in Table II-5.

TABLE II-5

Oil displacement test results of the surfactant composition

| Example II- | increased oil recovery % OOIP |
|---|---|
| 1 | 5.5 |
| 2 | 5.8 |
| 3 | 6.1 |
| 4 | 6.3 |
| 5 | 8.0 |
| 6 | 9.2 |
| 7 | 7.4 |
| 8 | 8.2 |
| 9 | 7.9 |
| 10 | 8.6 |
| 11 | 9.3 |

Example II-15

Cyclohexylamine and NaOH at a ratio by molar of 1:3 were introduced into a reactor, stirred for 30 minutes, at a ratio by molar of cyclohexylamine:ethylene oxide:propylene oxide=1:10:34, firstly there was added propylene oxide, reacted at 160 degrees Celsius for 3 h, then there was added ethylene oxide, reacted at 160 degrees Celsius for 7 h; finally there was added sodium chloroacetate at a ratio by molar between cyclohexylamine and the carboxylating agent of 1:1.5, further reacted at 80 degrees Celsius for 8 h, upon completion of the reaction, the reaction mixture was adjusted with a 5 wt % aqueous HCl solution to a pH value of 2, allowed to stand for layer separation, separated off the aqueous phase, while the oil phase was adjusted with a 10 wt % aqueous NaOH solution to a pH value of 9, water was removed by vacuum evaporation, whereby obtaining the following anionic-nonionic surfactant, wherein $m_1+m_2=34$, $n_1+n_2=10$:

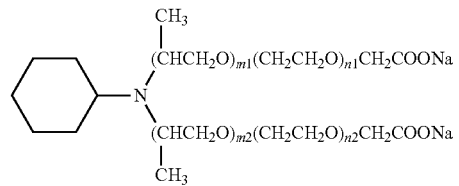

Comparative Example II-1

According to Gong Yujun et. al, Journal of Northwest University (Natural Science Edition), Vol. 30 (1), pp. 28 to 31, February 2000, hexadecyl trimethyl ammonium bromide (CTAB) and sodium dodecyl sulfate (SDS) were combined at a ratio by molar of 1:1.5, and tested at a concentration of 0.3 wt % for its oil-water interfacial tension, oil washing rate and oil displacement performance with the IV5-11 reservoir crude oil from the Henan Shuanghe Oilfield. The results were listed as follows.

TABLE 6

The performance of the reference flooding fluid

| interfacial tension (mN/m) | oil washing rate % | increased oil recovery % OOIP |
|---|---|---|
| 0.03 | 45.6 | 2.8 |

Comparative Example II-2

According to Huang Hongdu et. al, Journal of Oil and Gas Technology, Vol. 29(4), August 2007 (pp. 101 to 104), 0.01 wt % hexadecyl trimethyl ammonium bromide, 0.02 wt % anionic petroleum sulfonate salt and 1.8 wt % Na$_2$CO$_3$ were combined, and tested at a concentration of 0.3 wt % for its oil-water interfacial tension, oil washing rate and oil displacement performance with the IV5-11 reservoir crude oil from the Henan Shuanghe Oilfield. The results were listed as follows.

TABLE 7

The performance of the reference flooding fluid

| interfacial tension (mN/m) | oil washing rate % | increased oil recovery % OOIP |
|---|---|---|
| 0.008 | 56.3 | 4.2 |

Example II-1a

C$_5$H$_{11}$COOCH$_3$ and diisopropanol amine at a ratio by molar of 1:1.5 were introduced into a reactor, at the same time, there was added NaOH at an amount of 0.8% relative to the total weight of this mass, reacted at 200 degrees Celsius for 3 h; and then excess diisopropanol amine was remove under vacuum; and then there was added a predetermined amount of propylene oxide, reacted at 150 degrees Celsius for 5 h; then there was added sodium chloroacetate at a ratio by molar between C$_5$H$_{11}$COOCH$_3$ and the carboxylating agent of 1:1, further reacted at 50 degrees Celsius for 20 h, finally neutralized with a 5 wt % aqueous HCl solution to a pH value of 1, allowed to stand for layer separation, separated off the aqueous phase, the oil phase was adjusted with a 1.0 wt % aqueous NaOH solution to a pH value of 7, to obtain an anionic-nonionic surfactant.

Tetraethyl ammonium chloride and the thus produced anionic-nonionic surfactant were dissolved into water respectively, stirred for 30 minutes, formulated into a 0.3 wt % aqueous solution, and then the thus obtained solutions at a ratio by molar between the cationic surfactant and the anionic-nonionic surfactant of 1:8 were mixed till homogenous, to obtain the surfactant composition II-1a, the particulars of which were listed in Table II-1a.

Example II-2a $C_{20}H_{41}COOH$ and diisopropanol amine at a ratio by molar of 1:1.8 were introduced into a reactor, at the same time, there was added KOH at an amount of 0.5% relative to the total weight of this mass, reacted at 180 degrees Celsius for 5 h; and then excess diisopropanol amine was remove under vacuum; and then there was added a predetermined amount of ethylene oxide, reacted at 160 degrees Celsius for 5 h; then there was added sodium chloroacetate at a ratio by molar between $C_{20}H_{41}COOH$ and the carboxylating agent of 1:1.5, further reacted at 80 degrees Celsius for 8 h, finally neutralized with a 5 wt % aqueous HCl solution to a pH value of 3, allowed to stand for layer separation, separated off the aqueous phase, the oil phase was adjusted with a 10 wt % aqueous KOH solution to a pH value of 9, to obtain an anionic-nonionic surfactant.

Tetrabutyl ammonium chloride and the thus produced anionic-nonionic surfactant were dissolved into water respectively, stirred for 30 minutes, formulated into a 0.3 wt % aqueous solution, and then the thus obtained solutions at a ratio by molar between the cationic surfactant and the anionic-nonionic surfactant of 1:10 were mixed till homogenous, to obtain the surfactant composition II-2a, the particulars of which were listed in Table II-1a.

Example II-3a $C_{14}H_{29}COOCH_3$ and diisopropanol amine at a ratio by molar of 1:1 were introduced into a reactor, at the same time, there was added KOH at an amount of 15% relative to the total weight of this mass, reacted at 160 degrees Celsius for 8 h; and then excess diisopropanol amine was remove under vacuum; and then there was added a predetermined amount of propylene oxide, reacted at 150 degrees Celsius for 5 h, there was added a predetermined amount of ethylene oxide, reacted at 150 degrees Celsius for 5 h; then there was added $Br(CH_2)_5COOH$ at a ratio by molar between $C_{14}H_{29}COOCH_3$ and the carboxylating agent of 1:2, further reacted at 100 degrees Celsius for 1 h, finally neutralized with a 5 wt % aqueous HCl solution to a pH value of 2, allowed to stand for layer separation, separated off the aqueous phase, the oil phase was neutralized with a 10 wt % aqueous $Mg(OH)_2$ suspension to a pH value of 8, to obtain an anionic-nonionic surfactant.

Tetraoctyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.4 were mixed till homogenous, to obtain the surfactant composition II-3a, the particulars of which were listed in Table II-1a.

Example II-4a $C_{16}H_{33}COOCH_3$ and diisopropanol amine at a ratio by molar of 1:2 were introduced into a reactor, at the same time, there was added KOH at an amount of 0.5% relative to the total weight of this mass, reacted at 160 degrees Celsius for 5 h; and then excess diisopropanol amine was remove under vacuum; and then there was added a predetermined amount of propylene oxide, reacted at 160 degrees Celsius for 6 h, there was added a predetermined amount of ethylene oxide, reacted at 150 degrees Celsius for 3 h; then there was added a mixture of sodium chloroacetate and sodium chloromethyl sulfonate (at a ratio by molar of 1:1) at a ratio by molar between $C_{20}H_{41}COOH$ and the carboxylating agent of 1:1.5, further reacted at 70 degrees Celsius for 10 h, finally neutralized with a 5 wt % aqueous HCl solution to a pH value of 2, allowed to stand for layer separation, separated off the aqueous phase, the oil phase was neutralized with a 10 wt % aqueous $Ca(OH)_2$ suspension to a pH value of 8, to obtain an anionic-nonionic surfactant.

Decyl triethyl ammonium hydroxide and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:6 were mixed till homogenous, to obtain the surfactant composition II-4a, the particulars of which were listed in Table II-1a.

Example II-5a $C_{10}H_{21}COOCH_3$ and diisopropanol amine at a ratio by molar of 1:1.5 were introduced into a reactor, at the same time, there was added NaOH at an amount of 1.0% relative to the total weight of this mass, reacted at 150 degrees Celsius for 6 h; and then excess diisopropanol amine was remove under vacuum; and then there was added a predetermined amount of propylene oxide, reacted at 140 degrees Celsius for 2 h, there was added a predetermined amount of ethylene oxide, reacted at 140 degrees Celsius for 5 h; then there was added sodium chloroacetate at a ratio by molar between $C_{10}H_{21}COOCH_3$ and the carboxylating agent of 1:3, further reacted at 60 degrees Celsius for 16 h, finally neutralized with a 5 wt % aqueous HCl solution to a pH value of 2, allowed to stand for layer separation, separated off the aqueous phase, the oil phase was neutralized with a 10 wt % aqueous ammonia to a pH value of 8, to obtain an anionic-nonionic surfactant.

Phenyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:0.5 were mixed till homogenous, to obtain the surfactant composition II-5a, the particulars of which were listed in Table II-1a.

Example II-6a $C_{18}H_{37}COOCH_3$ and diisopropanol amine at a ratio by molar of 1:1.5 were introduced into a reactor, at the same time, there was added KOH at an amount of 0.8% relative to the total weight of this mass, reacted at 180 degrees Celsius for 3 h; and then excess diisopropanol amine was remove under vacuum; and then there was added a predetermined amount of propylene oxide, reacted at 180 degrees Celsius for 2 h, there was added a predetermined amount of ethylene oxide, reacted at 180 degrees Celsius for 2 h; then at a ratio by molar between $C_{18}H_{37}COOCH_3$ and the sulfonating agent of 1:3 there was added sodium chloromethyl sulfonate, reacted at 120 degrees Celsius for 12 h, finally neutralized with a 5 wt % aqueous HCl solution to a pH value of 2, allowed to stand for layer separation, separated off the aqueous phase, the oil phase was neutralized with a 10 wt % aqueous NaOH solution to a pH value of 8, to obtain an anionic-nonionic surfactant.

Benzyl triethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.8 were mixed till homogenous, to obtain the surfactant composition II-6a, the particulars of which were listed in Table II-1a.

Example II-7a $C_{18}H_{37}COOCH_3$ and diisopropanol amine at a ratio by molar of 1:1.5 were introduced into a reactor, at the same time, there was added KOH at an amount of 0.8% relative to the total weight of this mass, reacted at 180 degrees Celsius for 3 h; and then excess diisopropanol amine was remove under vacuum; and then there was added a predetermined amount of propylene oxide, reacted at 180 degrees Celsius for 2 h, there was added a predetermined amount of ethylene oxide, reacted at 180 degrees Celsius for 2 h; then at a ratio by molar between $C_{18}H_{37}COOCH_3$ and the sulfonating agent of 1:4 there was added hydroxyethyl sodium sulfonate, reacted at 180 degrees Celsius for 10 h, finally neutralized with a 5 wt % aqueous HCl solution to a pH value of 2, allowed to stand for layer separation, separated off the aqueous phase, the oil phase was neutralized with a 10 wt % aqueous $Ca(OH)_2$ suspension to a pH value of 8, to obtain an anionic-nonionic surfactant.

Tributyl (polyoxyethylene ether (n=1.6)) polyoxypropylene ether (n=2.7) ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:2.5 were mixed till homogenous, to obtain the surfactant composition II-7a, the particulars of which were listed in Table II-1a.

Example II-8a $C_8H_{17}COOCH_3$ and diisopropanol amine at a ratio by molar of 1:1.5 were introduced into a reactor, at the same time, there was added KOH at an amount of 0.6% relative to the total weight of this mass, reacted at 160 degrees Celsius for 8 h; and then excess diisopropanol amine was remove under vacuum; and then there was added a predetermined amount of propylene oxide, reacted at 160 degrees Celsius for 3 h, there was added a predetermined amount of ethylene oxide, reacted at 160 degrees Celsius for 3 h; then at a ratio by molar between $C_8H_{17}COOCH_3$ and the sulfonating agent of 1:5 there was added 3-chloro-2-hydroxyl sodium propanesulfonate, reacted at 190 degrees Celsius for 10 h, finally neutralized with a 5 wt % aqueous HCl solution to a pH value of 2, allowed to stand for layer separation, separated off the aqueous phase, the oil phase was neutralized with a 10 wt % aqueous NaOH solution to a pH value of 8, to obtain an anionic-nonionic surfactant.

Hexadecyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:4 were mixed till homogenous, to obtain the surfactant composition II-8a, the particulars of which were listed in Table II-1a.

Example II-9a $C_{18}H_{35}COOCH_3$ and diisopropanol amine at a ratio by molar of 1:2 were introduced into a reactor, at the same time, there was added NaOH at an amount of 0.8% relative to the total weight of this mass, reacted at 160 degrees Celsius for 8 h; and then excess diisopropanol amine was remove under vacuum; and then there was added a predetermined amount of propylene oxide, reacted at 160 degrees Celsius for 3 h, there was added a predetermined amount of ethylene oxide, reacted at 160 degrees Celsius for 3 h; then at a ratio by molar between $C_{18}H_{35}COOCH_3$ and the sulfonating agent of 1:5 there was added sodium chloropentyl sulfonate, reacted at 120 degrees Celsius for 20 h, finally neutralized with a 5 wt % aqueous HCl solution to a pH value of 2, allowed to stand for layer separation, separated off the aqueous phase, the oil phase was neutralized with a 10 wt % aqueous NaOH solution to a pH value of 8, to obtain an anionic-nonionic surfactant.

Bisoctadecyl dimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:0.1 were mixed till homogenous, to obtain the surfactant composition II-9a, the particulars of which were listed in Table II-1a.

Example II-10a $C_{18}H_{33}COOCH_3$ and diisopropanol amine at a ratio by molar of 1:1.5 were introduced into a reactor, at the same time, there was added KOH at an amount of 0.6% relative to the total weight of this mass, reacted at 160 degrees Celsius for 8 h; and then excess diisopropanol amine was remove under vacuum; and then there was added a predetermined amount of propylene oxide, reacted at 160 degrees Celsius for 3 h, there was added a predetermined amount of ethylene oxide, reacted at 160 degrees Celsius for 3 h; then at a ratio by molar between $C_{18}H_{33}COOCH_3$ and the sulfonating agent of 1:5 there was added a mixture of 3-chloro-2-hydroxyl sodium propanesulfonate and sodium chloroacetate (at a ratio by molar of 1:1), reacted at 180 degrees Celsius for 8 h, finally neutralized with a 5 wt % aqueous HCl solution to a pH value of 2, allowed to stand for layer separation, separated off the aqueous phase, the oil phase was neutralized with a 10 wt % aqueous NaOH solution to a pH value of 8, to obtain an anionic-nonionic surfactant.

Octadecyl dimethyl benzyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.3 were mixed till homogenous, to obtain the surfactant composition II-10a, the particulars of which were listed in Table II-1a.

Example II-11a

The surfactant composition produced by Example II-10a and a 0.15 wt % aqueous solution of polyacrylamide (having a molecular weight of 26000000) were mixed till homogenous, to obtain a flooding fluid composition for tertiary oil recovery.

TABLE II-1a

The particulars of the surfactant composition the structure of the anionic-nonionic surfactant $$RN \begin{matrix} (CHCH_3CH_2O)_{m1}(CH_2CH_2O)_{n1}R_1Y_1 \\ \diagdown \\ (CHCH_3CH_2O)_{m2}(CH_2CH_2O)_{n2}R_2Y_2 \end{matrix}$$

| Example II- | the structure of the cationic surfactant | (anionic-nonionic structure) | ratio by molar between cationic surfactant and anionic-nonionic surfactant |
|---|---|---|---|
| 1a | tetraethyl ammonium chloride | R = —OCC$_5$H$_{11}$, R$_1$ = R$_2$ = CH$_2$, m$_1$ + m$_2$ = 10, n$_1$ + n$_2$ = 0, Y$_1$ = Y$_2$ = —COONa | 1:8 |
| 2a | tetrabutyl ammonium chloride | R = —OCC$_{20}$H$_{41}$, R$_1$ = R$_2$ = CH$_2$, m$_1$ + m$_2$ = 0, n$_1$ + n$_2$ = 6.2, Y$_1$ = Y$_2$ = —COOK | 1:10 |
| 3a | tetraoctyl ammonium chloride | R = —OCC$_{14}$H$_{29}$, R$_1$ = R$_2$ = = C$_5$H$_{10}$, m$_1$ + m$_2$ = 15, n$_1$ + n$_2$ = 33, Y$_1$ = Y$_2$ = —COO(Mg)$_{0.5}$ | 1:1.4 |
| 4a | decyl triethyl ammonium hydroxide | R = —OCC$_{16}$H$_{33}$, R$_1$ = R$_2$ = CH$_2$, m$_1$ + m$_2$ = 28, n$_1$ + n$_2$ = 37, one out of Y$_1$ and Y$_2$ representing —COO(Ca)$_{0.5}$, while the other representing —SO$_3$(Ca)$_{0.5}$. | 1:6 |
| 5a | phenyl trimethyl ammonium chloride | R = —OCC$_{10}$H$_{21}$, R$_1$ = R$_2$ = CH$_2$, n$_1$ + n$_2$ = 6, m$_1$ + m$_2$ = 10, Y$_1$ = Y$_2$ = —COONH$_4$ | 1:0.5 |
| 6a | benzyl triethyl ammonium chloride | R = —OCC$_{18}$H$_{37}$, R$_1$ = R$_2$ = —CH$_2$, m$_1$ + m$_2$ = 12, n$_1$ + n$_2$ = 12.5, x = 1, Y$_1$ = Y$_2$ = —COONa | 1:1.8 |
| 7a | tributyl (polyoxyethylene ether (n = 1.6)) polyoxypropylene ether (n = 2.7) ammonium chloride | R = —OCC$_{12}$H$_{23}$, R$_1$ = R$_2$ = —CH$_2$CH$_2$, m$_1$ + m$_2$ = 18.2, n$_1$ + n$_2$ = 16.5, Y$_1$ = Y$_2$ = —COO(Ca)$_{0.5}$ | 1:2.5 |
| 8a | hexadecyl trimethyl ammonium chloride | R = —OCC$_8$H$_{17}$, R$_1$ = R$_2$ —CH$_2$CH(OH)CH$_2$, m$_1$ + m$_2$ = 12, n$_1$ + n$_2$ = 4, Y$_1$ = Y$_2$ = —COONa | 1:4 |
| 9a | bisoctadecyl dimethyl ammonium chloride | R = —OCC$_{18}$H$_{35}$, R$_1$ = R$_2$ = —C$_5$H$_{10}$, m$_1$ + m$_2$ = 20, n$_1$ + n$_2$ = 50, Y$_1$ = Y$_2$ = —COONa | 1:0.1 |
| 10a | octadecyl dimethyl benzyl ammonium chloride | R = —OCC$_{18}$H$_{33}$, R$_1$ = R$_2$ = —CH$_2$CH(OH)CH$_2$, m$_1$ + m$_2$ = 50, n$_1$ + n$_2$ = 42, one out of R$_1$Y$_1$ and R$_2$Y$_2$ representing —CH$_2$COONa, while the other representing —CH$_2$CH(OH)CH$_2$SO$_3$Na. | 1:1.3 |

Example II-12a Interfacial Performance Test of the Surfactant Composition

TX-500C type spinning drop interfacial tensiometer was used to identify the oil-water interfacial tension between each surfactant composition and the IV5-11 reservoir crude oil from the Henan Shuanghe Oilfield, at a surfactant composition concentration of 0.3 wt %, with a test temperature of 81 degrees Celsius, a formation water of NaHCO$_3$ type, a TDS of 7947 mg/L, a chloride ion content of 2002 mg/L, a Ca$^{2+}$ content of 20 mg/L, a Mg$^{2+}$ content of 12.2 mg/L.

TABLE II-2a

The oil-water interfacial tension between the surfactant composition and the IV5-11 reservoir crude oil from the Henan Shuanghe Oilfield

| Example II- | interfacial tension (mN/m) |
|---|---|
| 1a | 0.0088 |
| 2a | 0.0070 |
| 3a | 0.0054 |
| 4a | 0.0041 |
| 5a | 0.0028 |
| 6a | 0.0004 |
| 7a | 0.0049 |
| 8a | 0.0024 |
| 9a | 0.0009 |
| 10a | 0.0004 |
| 11a | 0.0043 |

As can be seen from Table II-2a, the surfactant composition produced by each of Example II-1a to 10a exhibits desirable interfacial performance with the crude oil from the Henan Oilfield. Example II-11a reveals that, the thus produced surfactant composition still exhibits desirable interfacial performance, even after compounded with a polymer.

The surfactant composition produced by Example II-10a was formulated into different concentrations, each was tested the oil-water interfacial tension with the IV5-11 reservoir crude oil from the Henan Shuanghe Oilfield. The results were listed in Table II-3a.

TABLE II-3a

The oil-water interfacial tension between the surfactant composition 10a (at different concentrations) and the IV5-11 reservoir crude oil from the Henan Shuanghe Oilfield

| surfactant composition concentration (wt %) | | | | | |
|---|---|---|---|---|---|
| 0.01 | 0.02 | 0.05 | 0.1 | 0.2 | 0.3 |

| interfacial tension (mN/m) | | | | | |
|---|---|---|---|---|---|
| 0.008 | 0.005 | 0.002 | 0.001 | 0.0007 | 0.0004 |

These results reveals that, the surfactant composition of this invention exhibits a relatively higher oil-water interfacial activity with the crude oil from the Henan Oilfield.

TX-500C type spinning drop interfacial tensiometer was used to identify the oil-water interfacial tension between the surfactant composition produced by Example II-6a and a crude oil from the third oil plant of the Zhongyuan Oilfield, with a test temperature of 80 degrees Celsius, a formation water with a TDS of 79439 mg/L, a Ca$^{2+}$ content of 592 mg/L, a Mg$^{2+}$ content of 2871 mg/L, a surfactant composition concentration of 0.3 wt %. The oil-water interfacial tension was observed as low as 0.001 mN/m. This reveals that the surfactant composition of this invention shows versatile applicability, not only to a reservoir with a low TDS, but also to a reservoir at elevated temperatures and high salinity, with desirable interfacial performances.

Example II-13a Oil Washing Capability Test of the Surfactant Composition

The IV5-11 reservoir oil sand from the Henan Shuanghe Oilfield at an oil:sand ratio of 1:4 (by weight) was aged at 81 degrees Celsius for 7 days, stirred for 5 minutes every 2 hours. Then 5 g of the thus aged oil sand, and a 0.3 wt % solution of the surfactant composition at an oil sand:solution ratio of 1:10 (by weight) were mixed till homogenous, aged at the reservoir temperature for 48 h, then crude oil in the solution was extracted with petroleum ether, adjusted with a 50 ml colorimetric tube to a metered volume, colorimetric analysized with a spectrophotometer at a wavelength of 430 nm. The concentration of crude oil in the surfactant solution was calculated by referring to the standard curve.

TABLE II-4a

The oil washing performance of the surfactant composition

| Example II- | oil washing rate % |
|---|---|
| 1a | 50.6 |
| 2a | 53.0 |
| 3a | 55.3 |
| 4a | 57.1 |
| 5a | 60.2 |
| 6a | 61.9 |
| 7a | 61.4 |
| 8a | 63.1 |
| 9a | 65.4 |
| 10a | 66.3 |

Example II-14a Study on the Oil Displacement Performance of the Surfactant Composition The oil displacement test was performed on a cylindrical natural core of sandstone having a length of 30 cm, a diameter of 2.5 cm and a permeability of 1.5 μm². The core was firstly injected with the IV5-11 reservoir formation water from the Henan Shuanghe Oilfield till no crude oil was found in the effluent, then with a 0.3 PV (pore volume of the core) of the surfactant composition, then with water till no crude oil was found in the effluent. The results were listed in Table II-5a.

TABLE II-5a

The test results of the oil displacement

| Example II- | increased oil recovery % OOIP |
|---|---|
| 1a | 4.5 |
| 2a | 4.7 |
| 3a | 5.8 |
| 4a | 6.2 |
| 5a | 6.9 |
| 6a | 7.5 |
| 7a | 6.9 |
| 8a | 7.1 |
| 9a | 8.4 |
| 10a | 9.1 |

Example III-1

1-bromododecane, Na₂CO₃, diethylenetriamine at a ratio by molar of 1:1:10 were introduced into a reactor, reacted at 60 degrees Celsius for 1-15 h, and then the intermediate 1-dodecyl diethylenetriamine was purified by extraction. Then at a ratio by molar of 10:1:1, the intermediate, Na₂CO₃ and 1-bromododecane were introduced into a reactor, reacted at 60 degrees Celsius for 1-15 h, to obtain 1,7-di(dodecyl) diethylenetriamine. 1,7-di(dodecyl) diethylenetriamine and KOH at a ratio by molar of 1:6 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between diethylenetriamine and the carboxylating agent of 1:3, reacted at 50 degrees Celsius for 20 h, to obtain an anionic-nonionic surfactant.

Octadecyl dimethyl benzyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:0.1 were mixed till homogenous, to obtain the surfactant composition III-1, the particulars of which were listed in Table III-1.

Example III-2

1-bromododecane, Na₂CO₃, triethylenetetramine at a ratio by molar of 1:1:10 were introduced into a reactor, reacted at 60 degrees Celsius for 1-15 h, and then the intermediate 1-dodecyl triethylenetetramine was purified by extraction. Then at a ratio by molar of 10:1:1, the intermediate, Na₂CO₃ and 1-bromododecane were introduced into a reactor, reacted at 60 degrees Celsius for 1-15 h, to obtain 1,10-di(dodecyl) triethylenetetramine. 1,10-di(dodecyl) triethylenetetramine and NaOH at a ratio by molar of 1:8 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between diethylenetriamine and the carboxylating agent of 1:4, reacted at 50 degrees Celsius for 20 h, to obtain an anionic-nonionic surfactant.

Tetrabutyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:0.5 were mixed till homogenous, to obtain the surfactant composition III-2, the particulars of which were listed in Table III-1.

Example III-3

1-bromocyclohexane, Na₂CO₃, tetraethylenepentamine at a ratio by molar of 1:1:10 were introduced into a reactor, reacted at 60 degrees Celsius for 1-15 h, and then the intermediate 1-cyclohexyl tetraethylenepentamine was purified by extraction. Then at a ratio by molar of 10:1:1, the intermediate, Na₂CO₃ and 1-bromocyclohexane were introduced into a reactor, reacted at 60 degrees Celsius for 1-15 h, to obtain 1,13-di(cyclohexyl) diethylenetriamine. 1,13-di(cyclohexyl) tetraethylenepentamine and NaOH at a ratio by molar of 1:10 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between tetraethylenepentamine and the carboxylating agent of 1:5, reacted at 50 degrees Celsius for 20 h, to obtain an anionic-nonionic surfactant.

Trioctyl (polyoxyethylene ether (n=2)) polyoxypropylene ether (n=3) ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:10 were mixed till homogenous, to obtain the surfactant composition III-3, the particulars of which were listed in Table III-1.

Example III-4

1-bromodecane, $Na_2CO_3$, diethylenetriamine at a ratio by molar of 1:1:10 were introduced into a reactor, reacted at 60 degrees Celsius for 1-15 h, and then the intermediate 1-decanyl diethylenetriamine was purified by extraction. Then at a ratio by molar of 10:1:1, the intermediate, $Na_2CO_3$ and 1-bromodecane were introduced into a reactor, reacted at 60 degrees Celsius for 1-15 h, to obtain 1,7-di(decanyl) diethylenetriamine. 1,7-di(decanyl) diethylenetriamine and NaOH at a ratio by molar of 1:6 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added a mixture of chloromethyl sulfonic acid and chloroacetic acid (at a ratio by molar of 1:1) at a ratio by molar between diethylenetriamine and the carboxylating agent of 1:3, reacted at 50 degrees Celsius for 20 h, to obtain an anionic-nonionic surfactant. Decyl triethyl ammonium hydroxide and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:6 were mixed till homogenous, to obtain the surfactant composition III-4, the particulars of which were listed in Table III-1.

Example III-5

1-bromohexadecane, $Na_2CO_3$, diethylenetriamine at a ratio by molar of 1:1:10 were introduced into a reactor, reacted at 60 degrees Celsius for 1-15 h, and then the intermediate 1-hexadecyl diethylenetriamine was purified by extraction. Then at a ratio by molar of 10:1:1, the intermediate, $Na_2CO_3$ and 1-bromohexadecane were introduced into a reactor, reacted at 60 degrees Celsius for 1-15 h, to obtain 1,7-di(hexadecyl) diethylenetriamine. 1,7-di(hexadecyl) diethylenetriamine and $Ca(OH)_2$ at a ratio by molar of 1:6 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between diethylenetriamine and the carboxylating agent of 1:3, reacted at 50 degrees Celsius for 20 h, to obtain an anionic-nonionic surfactant.

Phenyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.4 were mixed till homogenous, to obtain the surfactant composition III-5, the particulars of which were listed in Table III-1.

Example III-6

Lauroyl chloride, $Na_2CO_3$, triethylenetetramine at a ratio by molar of 1:1:10 were introduced into a reactor, reacted at 60 degrees Celsius for 1-15 h, and then the intermediate 1-lauroyl triethylenetetramine was purified by extraction. Then at a ratio by molar of 10:1:1, the intermediate, $Na_2CO_3$ and lauroyl chloride were introduced into a reactor, reacted at 60 degrees Celsius for 1-15 h, to obtain 1,10-di(lauroyl) triethylenetetramine. 1,10-di(lauroyl) triethylenetetramine, and $Mg(OH)_2$ at a ratio by molar of 1:10 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between triethylenetetramine and the carboxylating agent of 1:5, reacted at 50 degrees Celsius for 20 h, to obtain an anionic-nonionic surfactant.

Benzyl triethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.8 were mixed till homogenous, to obtain the surfactant composition III-6, the particulars of which were listed in Table III-1.

Example III-7

Stearoyl chloride, $Na_2CO_3$, triethylenetetramine at a ratio by molar of 1:1:10 were introduced into a reactor, reacted at 60 degrees Celsius for 1-15 h, and then the intermediate 1-stearoyl triethylenetetramine was purified by extraction. Then at a ratio by molar of 10:1:1, the intermediate, $Na_2CO_3$ and stearoyl chloride were introduced into a reactor, reacted at 60 degrees Celsius for 1-15 h, to obtain 1,10-di(stearoyl) triethylenetetramine. 1,10-di(stearoyl) triethylenetetramine and $NH_4OH$ at a ratio by molar of 1:8 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between triethylenetetramine and the carboxylating agent of 1:4, reacted at 50 degrees Celsius for 20 h, to obtain an anionic-nonionic surfactant.

Dodecyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:2.5 were mixed till homogenous, to obtain the surfactant composition III-7, the particulars of which were listed in Table III-1.

Example III-8

Benzyl chloride, $Na_2CO_3$, tetraethylenepentamine at a ratio by molar of 1:1:10 were introduced into a reactor, reacted at 60 degrees Celsius for 1-15 h, and then the intermediate 1-benzyl tetraethylenepentamine was purified by extraction. Then at a ratio by molar of 10:1:1, the intermediate, Na$_2$CO$_3$ and benzyl chloride were introduced into a reactor, reacted at 60 degrees Celsius for 1-15 h, to obtain 1,12-di(benzyl) tetraethylenepentamine. 1,12-di(benzyl) tetraethylenepentamine and Mg(OH)$_2$ at a ratio by molar of 1:10 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between triethylenetetramine and the carboxylating agent of 1:5, reacted at 50 degrees Celsius for 20 h, to obtain an anionic-nonionic surfactant.

Hexadecyl dimethyl (polyoxyethylene ether (n=2)) polyoxypropylene ether (n=3) ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:8 were mixed till homogenous, to obtain the surfactant composition III-8, the particulars of which were listed in Table III-1.

Example III-9

Benzoyl chloride, Na$_2$CO$_3$, tetraethylenepentamine at a ratio by molar of 1:1:10 were introduced into a reactor, reacted at 60 degrees Celsius for 1-15 h, and then the intermediate 1-benzyl tetraethylenepentamine was purified by extraction. Then at a ratio by molar of 10:1:1, the intermediate, Na$_2$CO$_3$ and benzoyl chloride were introduced into a reactor, reacted at 60 degrees Celsius for 1-15 h, to obtain 1,12-di(benzoyl) tetraethylenepentamine. 1,12-di(benzoyl) tetraethylenepentamine and NaOH at a ratio by molar of 1:10 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between tetraethylenepentamine and the carboxylating agent of 1:5, reacted at 50 degrees Celsius for 20 h, to obtain an anionic-nonionic surfactant.

Bisoctadecyl dimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:4 were mixed till homogenous, to obtain the surfactant composition III-9, the particulars of which were listed in Table III-1.

Example III-10 p-methyl benzoyl chloride, Na$_2$CO$_3$, tetraethylenepentamine at a ratio by molar of 1:1:10 were introduced into a reactor, reacted at 60 degrees Celsius for 1-15 h, and then the intermediate 1-p-methyl benzoyl tetraethylenepentamine was purified by extraction. Then at a ratio by molar of 10:1:1, the intermediate, Na$_2$CO$_3$ and p-methyl benzoyl chloride were introduced into a reactor, reacted at 60 degrees Celsius for 1-15 h, to obtain 1,12-di(p-methyl benzoyl) tetraethylenepentamine. 1,12-di(p-methyl benzoyl) tetraethylenepentamine and NH$_4$OH at a ratio by molar of 1:10 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between tetraethylenepentamine and the carboxylating agent of 1:5, reacted at 50 degrees Celsius for 20 h, to obtain an anionic-nonionic surfactant.

Bisdodecyl dimethyl ammonium chloride and the thus produced anionic-nonionic surfactant were dissolved into water respectively, stirred for 30 minutes, formulated into a 0.3 wt % aqueous solution, and then the thus obtained solutions at a ratio by molar between the cationic surfactant and the anionic-nonionic surfactant of 1:1.3 were mixed till homogenous, to obtain the surfactant composition III-10, the particulars of which were listed in Table III-1.

Example III-11

Benzoyl chloride, Na$_2$CO$_3$, tetraethylenepentamine at a ratio by molar of 1:1:10 were introduced into a reactor, reacted at 60 degrees Celsius for 1-15 h, and then the intermediate 1-benzoyl tetraethylenepentamine was purified by extraction. Then at a ratio by molar of 10:1:1, the intermediate, Na$_2$CO$_3$ and 1-bromodecane were introduced into a reactor, reacted at 60 degrees Celsius for 1-15 h, to obtain 1-benzoyl-2-decanyl tetraethylenepentamine. 1-benzoyl-2-decanyl tetraethylenepentamine and NH$_4$OH at a ratio by molar of 1:10 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between tetraethylenepentamine and the carboxylating agent of 1:5, reacted at 50 degrees Celsius for 20 h, to obtain an anionic-nonionic surfactant.

Benzyl triethyl ammonium chloride and the thus produced anionic-nonionic surfactant were dissolved into water respectively, stirred for 30 minutes, formulated into a 0.3 wt % aqueous solution, and then the thus obtained solutions at a ratio by molar between the cationic surfactant and the anionic-nonionic surfactant of 1:1.1 were mixed till homogenous, to obtain the surfactant composition III-11, the particulars of which were listed in Table III-1.

Example III-12

Stearoyl chloride, Na$_2$CO$_3$, triethylenetetramine at a ratio by molar of 1:1:10 were introduced into a reactor, reacted at 60 degrees Celsius for 1-15 h, and then the intermediate 1-stearoyl triethylenetetramine was purified by extraction. Then at a ratio by molar of 10:1:1, the intermediate, Na$_2$CO$_3$ and lauroyl chloride were introduced into a reactor, reacted at 60 degrees Celsius for 1-15 h, to obtain 1-stearoyl-10-lauroyl triethylenetetramine. 1-stearoyl-10-lauroyl triethylenetetramine and NH$_4$OH at a ratio by molar of 1:10 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between triethylenetetramine and the carboxylating agent of 1:5, reacted at 50 degrees Celsius for 20 h, to obtain an anionic-nonionic surfactant.

Hexadecyl trimethyl ammonium chloride and the thus produced anionic-nonionic surfactant were dissolved into water respectively, stirred for 30 minutes, formulated into a 0.3 wt % aqueous solution, and then the thus obtained solutions at a ratio by molar between the cationic surfactant and the anionic-nonionic surfactant of 1:6 were mixed till homogenous, to obtain the surfactant composition III-12, the particulars of which were listed in Table III-1.

Example III-13

1-bromododecane, $Na_2CO_3$, triethylenetetramine at a ratio by molar of 1:1:10 were introduced into a reactor, reacted at 60 degrees Celsius for 1-15 h, and then the intermediate 1-dodecyl triethylenetetramine was purified by extraction. Then at a ratio by molar of 10:1:1, the intermediate, $Na_2CO_3$ and 1-bromohexadecane were introduced into a reactor, reacted at 60 degrees Celsius for 1-15 h, to obtain 1-dodecyl-10-hexadecyl triethylenetetramine. 1-dodecyl-10-hexadecyl triethylenetetramine and $NH_4OH$ at a ratio by molar of 1:10 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between tetraethylenepentamine and the carboxylating agent of 1:5, reacted at 50 degrees Celsius for 20 h, to obtain an anionic-nonionic surfactant.

Tetraoctyl ammonium chloride and the thus produced anionic-nonionic surfactant were dissolved into water respectively, stirred for 30 minutes, formulated into a 0.3 wt % aqueous solution, and then the thus obtained solutions at a ratio by molar between the cationic surfactant and the anionic-nonionic surfactant of 1:2.4 were mixed till homogenous, to obtain the surfactant composition III-13, the particulars of which were listed in Table III-1.

Example III-14

The surfactant composition produced by Example III-6 and a 0.15 wt % aqueous solution of polyacrylamide (having a molecular weight of 26000000) were mixed till homogenous, to obtain a flooding fluid composition for tertiary oil recovery.

TABLE III-1

The particulars of the surfactant composition the structure of the anionic-nonionic surfactant $$\begin{array}{c} R_1 \quad CH_3 \\ | \quad | \\ N-(CHCH_2O)_m-(CH_2CH_2O)_n-R_4Y \\ | \\ R_3 \quad CH_3 \\ |_x \quad | \\ N-(CHCH_2O)_{m'}-(CH_2CH_2O)_{n'}-R_4Y \\ | \\ R_2 \end{array}$$

| Example III- | the structure of the cationic surfactant | structure details | ratio by molar between cationic surfactant and anionic-nonionic surfactant |
|---|---|---|---|
| 1 | octadecyl dimethyl benzyl ammonium chloride | $R_1 = R_2 = -C_{12}H_{25}$, $R_3 = -CH_2CH_2-$, xm + m' = 30, xn + n' = 40, x = 2, Y = —COOK; x = 2, Y = —COOK | 1:0.1 |
| 2 | tetrabutyl ammonium chloride | $R_1 = R_2 = -C_{12}H_{25}$, $R_3 = -CH_2CH_2-$, $R_4 = CH_2$, xm + m' = 10, xn + n' = 5, x = 3, Y = —COONa | 1:0.5 |
| 3 | trioctyl (polyoxyethylene ether (n = 2)) polyoxypropylene ether (n = 3) ammonium chloride | $R_1 = R_2 = -C_6H_{11}$, $R_3 = -CH_2CH_2-$, $R_4 = CH_2$, xm + m' = 22, xn + n' = 40, x = 4, Y = —COONa | 1:10 |
| 4 | decyl triethyl ammonium hydroxide | $R_1 = R_2 = -C_{10}H_{21}$, $R_3 = -CH_2CH_2-$, $R_4 = CH_2$, xm + m' = 8, xn + n' = 15, x = 2, wherein two Y represent —$SO_3Na$, one Y represents $COONa$ | 1:6 |
| 5 | phenyl trimethyl ammonium chloride | $R_1 = R_2 = -C_{16}H_{33}$, $R_3 = -CH_2CH_2-$, $R_4 = CH_2$, xm + m' = 5, x = 2, Y = —$COO(Ca)_{0.5}$ | 1:1.4 |
| 6 | benzyl triethyl ammonium chloride | $R_1 = R_2 = C_{11}H_{21}CO-$, $R_3 = -CH_2CH_2-$, $R_4 = CH_2$, xm + m' = 8, xn + n' = 2, x = 3, Y = —$COO(Mg)_{0.5}$ | 1:1.8 |
| 7 | dodecyl trimethyl ammonium chloride | $R_1 = R_2 = -C_{17}H_{35}CO-$, $R_3 = -CH_2CH_2-$, $R_4 = CH_2$, xm + m' = 12, xn + n' = 6, x = 3, Y = —$COONH_4$ | 1:2.5 |
| 8 | hexadecyl dimethyl (polyoxyethylene ether (n = 2)) polyoxypropylene ether (n = 3) ammonium chloride | $R_1 = R_2 = C_6H_5CH_2-$, $R_3 = -CH_2CH_2-$, $R_4 = CH_2$, xm + m' = 8, xn + n' = 0, x = 4, Y = —$COO(Mg)_{0.5}$ | 1:8 |
| 9 | bisoctadecyl dimethyl ammonium chloride | $R_1 = R_2 = C_6H_5CO-$, $R_3 = -CH_2CH_2-$, $R_4 = CH_2$, xm + m' = 50, xn + n' = 32, x = 4, Y = —COONa | 1:4 |
| 10 | bisdodecyl dimethyl ammonium chloride | $R_1 = R_2 = CH_3C_6H_5CO-$, $R_3 = -CH_2CH_2-$, $R_4 = CH_2$, xm + m' = 35, xn + n' = 50, x = 2, Y = —$COONH_4$ | 1:1.3 |
| 11 | benzyl triethyl ammonium chloride | $R_1 = C_6H_5CO-$, $R_2 = -C_{10}H_{21}$, $R_3 = -CH_2CH_2-$, $R_4 = CH_2$, xm + m' = 50, xn + n' = 32, x = 4, Y = —COONa | 1:1.1 |
| 12 | hexadecyl trimethyl ammonium chloride | $R_1 = -C_{17}H_{35}CO-$, $R_2 = C_{11}H_{21}CO-$, $R_3 = -CH_2CH_2-$, $R_4 = CH_2CH_2$, xm + m' = 12, xn + n' = 6, x = 3, Y = —$COONH_4$ | 1:6 |
| 13 | tetraoctyl ammonium chloride | $R_1 = -C_{12}H_{25}$, $R_2 = -C_{16}H_{33}$, $R_3 = -CH_2CH_2-$, $R_4 = CH_2$, xm + m' = 10, xn + n' = 5, x = 3, Y = —COONa | 1:2.4 |

Example III-15 Interfacial Performance Test of the Surfactant Composition

TX-500C type spinning drop interfacial tensiometer was used to identify the oil-water interfacial tension between each surfactant composition and the IV5-11 reservoir crude oil from the Henan Shuanghe Oilfield, at a surfactant composition concentration of 0.3 wt %, with a test temperature of 81 degrees Celsius, a formation water of $NaHCO_3$ type, a TDS of 7947 mg/L, a chloride ion content of 2002 mg/L, a $Ca^{2+}$ content of 20 mg/L, a $Mg^{2+}$ content of 12.2 mg/L.

TABLE III-2

The oil-water interfacial tension between the surfactant composition and the IV5-11 reservoir crude oil from the Henan Shuanghe Oilfield

| Example III- | interfacial tension (mN/m) |
|---|---|
| 1 | 0.0061 |
| 2 | 0.0052 |
| 3 | 0.0043 |
| 4 | 0.0090 |
| 5 | 0.0007 |
| 6 | 0.0005 |
| 7 | 0.0023 |
| 8 | 0.0009 |
| 9 | 0.0006 |
| 10 | 0.0004 |
| 11 | 0.0031 |
| 12 | 0.0005 |
| 13 | 0.0007 |
| 14 | 0.0002 |

As can be seen from Table the surfactant composition produced by each of Example III-1 to 10 exhibits desirable interfacial performance with the crude oil from the Henan Oilfield. Example III-14 reveals that, the thus produced surfactant composition still exhibits desirable interfacial performance, even after compounded with a polymer.

The surfactant composition produced by Example III-10 was formulated into different concentrations, each was tested the oil-water interfacial tension with the IV5-11 reservoir crude oil from the Henan Shuanghe Oilfield. The results were listed in Table III-3.

TABLE III-3

The oil-water interfacial tension between the surfactant composition III-10 (at different concentrations) and the IV5-11 reservoir crude oil from the Henan Shuanghe Oilfield

| | surfactant composition concentration (wt %) | | | | | | | |
|---|---|---|---|---|---|---|---|---|
| | 0.01 | 0.02 | 0.05 | 0.1 | 0.2 | 0.3 | 0.4 | 0.5 |
| interfacial tension (mN/m) | 0.009 | 0.005 | 0.001 | 0.0008 | 0.0004 | 0.0005 | 0.0009 | 0.0009 |

These results reveals that, the surfactant composition of this invention exhibits a relatively higher oil-water interfacial activity for the crude oil from the Henan Oilfield.

TX-500C type spinning drop interfacial tensiometer was used to identify the oil-water interfacial tension between the surfactant composition produced by Example III-6 and a crude oil from the third oil plant of the Zhongyuan Oilfield, with a test temperature of 80 degrees Celsius, a formation water with a TDS of 79439 mg/L, a $Ca^{2+}$ content of 592 mg/L, a $Mg^{2+}$ content of 2871 mg/L, a surfactant composition concentration of 0.3 wt %. The oil-water interfacial tension was observed as low as 0.002 mN/m. This reveals that the surfactant composition of this invention shows versatile applicability, not only to a reservoir with a low TDS, but also to a reservoir at elevated temperatures and high salinity, with desirable interfacial performances.

Example III-16 Oil Washing Capability Test of the Surfactant Composition

The IV5-11 reservoir oil sand from the Henan Shuanghe Oilfield at an oil:sand ratio of 1:4 (by weight) was aged at 81 degrees Celsius for 7 days, stirred for 5 minutes every 2 hours; and then 5 g of the thus aged oil sand and a 0.3 wt % solution of the surfactant composition at an oil sand:solution ratio of 1:10 (by weight) were mixed till homogenous, aged at the reservoir temperature for 48 h, then crude oil in the solution was extracted with petroleum ether, adjusted with a 50 ml colorimetric tube to a metered volume, colorimetric analysized with a spectrophotometer at a wavelength of 430 nm. The concentration of crude oil in the surfactant solution was calculated by referring to the standard curve.

TABLE III-4

The oil washing performance of the surfactant composition

| Example III- | oil washing rate % |
|---|---|
| 1 | 58.6 |
| 2 | 54.3 |
| 3 | 63.2 |
| 4 | 66.6 |
| 5 | 58.9 |
| 6 | 62.4 |
| 7 | 63.5 |
| 8 | 68.1 |
| 9 | 49.8 |
| 10 | 57.3 |
| 11 | 76.5 |
| 12 | 82.4 |
| 13 | 79.8 |

Example III-17 Study on the Oil Displacement Performance of the Surfactant Composition The oil displacement test was performed on a cylindrical natural core of sandstone having a length of 30 cm, a diameter of 2.5 cm and a permeability of 1.5 μm². The core was firstly injected with the IV5-11 reservoir formation water from the Henan Shuanghe Oilfield till no crude oil was found in the effluent, then with a 0.3 PV (pore volume of the core) of the surfactant composition, then with water till no crude oil was found in the effluent. The results were listed in Table III-5.

TABLE III-5

Oil displacement test results of the surfactant composition

| Example III- | increased oil recovery % OOIP |
|---|---|
| 1 | 7.1 |
| 2 | 7.2 |
| 3 | 7.5 |
| 4 | 7.9 |
| 5 | 7.9 |
| 6 | 8.5 |

TABLE III-5-continued

Oil displacement test results of the surfactant composition

| Example III- | increased oil recovery % OOIP |
|---|---|
| 7 | 8.4 |
| 8 | 8.7 |
| 9 | 8.2 |
| 10 | 8.4 |
| 11 | 9.1 |
| 12 | 10.4 |
| 13 | 11.2 |

Example III-18

Cyclohexylamine and NaOH at a ratio by molar of 1:3 were introduced into a reactor, stirred for 30 minutes, at a ratio by molar of cyclohexylamine:ethylene oxide:propylene oxide=1:10:34, firstly there was added propylene oxide, reacted at 160 degrees Celsius for 3 h, then there was added ethylene oxide, reacted at 160 degrees Celsius for 7 h; finally there was added sodium chloroacetate at a ratio by molar between cyclohexylamine and the carboxylating agent of 1:1.5, further reacted at 80 degrees Celsius for 8 h, upon completion of the reaction, the reaction mixture was adjusted with a 5 wt % aqueous HCl solution to a pH value of 2, allowed to stand for layer separation, separated off the aqueous phase, while the oil phase was adjusted with a 10 wt % aqueous NaOH solution to a pH value of 9, water was removed by vacuum evaporation, whereby obtaining the following anionic-nonionic surfactant, wherein $m_1+m_2=34$, $n_1+n_2=10$:

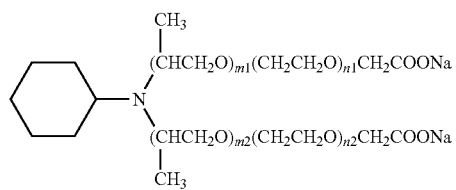

Comparative Example III-1

According to Gong Yujun et. al, Journal of Northwest University (Natural Science Edition), Vol. 30 (1), pp. 28 to 31, February 2000, hexadecyl trimethyl ammonium bromide (CTAB) and sodium dodecyl sulfate (SDS) were combined at a ratio by molar of 1:1.5, and tested at a concentration of 0.3 wt % for its oil-water interfacial tension, oil washing rate and oil displacement performance with the IV5-11 reservoir crude oil from the Henan Shuanghe Oilfield. The results were listed as follows.

TABLE III-6

The performance of the reference flooding fluid

| interfacial tension (mN/m) | oil washing rate % | increased oil recovery % OOIP |
|---|---|---|
| 0.03 | 45.6 | 2.8 |

Comparative Example III-2

According to Huang Hongdu et. al, Journal of Oil and Gas Technology, Vol. 29(4), August 2007 (pp. 101 to 104), 0.01 wt % hexadecyl trimethyl ammonium bromide, 0.02 wt % anionic petroleum sulfonate salt and 1.8 wt % $Na_2CO_3$ were combined, and tested at a concentration of 0.3 wt % for its oil-water interfacial tension, oil washing rate and oil displacement performance with the IV5-11 reservoir crude oil from the Henan Shuanghe Oilfield. The results were listed as follows.

TABLE III-7

The performance of the reference flooding fluid

| interfacial tension (mN/m) | oil washing rate % | increased oil recovery % OOIP |
|---|---|---|
| 0.008 | 56.3 | 4.2 |

Example IV-1

1-bromododecane, $Na_2CO_3$, diethylenetriamine at a ratio by molar of 1:1:10 were introduced into a reactor, reacted at 60 degrees Celsius for 1-15 h, and then the intermediate 1-dodecyl diethylenetriamine was purified by extraction. The intermediate and KOH at a ratio by molar of 1:8 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between diethylenetriamine and the carboxylating agent of 1:4, reacted at 50 degrees Celsius for 20 h, to obtain an anionic-nonionic surfactant.

Octadecyl dimethyl benzyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:0.2 were mixed till homogenous, to obtain the surfactant composition IV-1, the particulars of which were listed in Table IV-1.

Example IV-2

1-bromocyclohexane, $Na_2CO_3$, diethylenetriamine at a ratio by molar of 1:1:10 were introduced into a reactor, reacted at 60 degrees Celsius for 1-15 h, and then the intermediate 1-cyclohexyl diethylenetriamine was purified by extraction. The intermediate and KOH at a ratio by molar of 1:8 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between diethylenetriamine and the carboxylating agent of 1:4, reacted at 50 degrees Celsius for 20 h, to obtain an anionic-nonionic surfactant.

Tetraoctyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:0.5 were mixed till homogenous, to obtain the surfactant composition IV-2, the particulars of which were listed in Table IV-1.

Example IV-3 p-methyl benzoyl chloride, $Na_2CO_3$, tetraethylenepentamine at a ratio by molar of 1:1:10 were introduced into a reactor, reacted at 60 degrees Celsius for 1-15 h, and then the intermediate 1-p-methyl benzoyl tetraethylenepentamine was purified by extraction. 1-p-methyl benzoyltetraethylenepentamine and NaOH at a ratio by molar of 1:12 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between tetraethylenepentamine and the carboxylating agent of 1:6, reacted at 50 degrees Celsius for 20 h, to obtain an anionic-nonionic surfactant.

Trioctyl (polyoxyethylene ether (n=2.2)) polyoxypropylene ether (n=1.8) ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:9 were mixed till homogenous, to obtain the surfactant composition IV-3, the particulars of which were listed in Table IV-1.

Example IV-4

Lauroyl chloride, $Na_2CO_3$, diethylenetriamine at a ratio by molar of 1:1:10 were introduced into a reactor, reacted at 60 degrees Celsius for 1-15 h, and then the intermediate 1-lauroyl diethylenetriamine was purified by extraction. 1-lauroyl diethylenetriamine and NaOH at a ratio by molar of 1:8 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added a mixture of chloromethyl sulfonic acid and chloroacetic acid (at a ratio by molar of 2:1) at a ratio by molar between diethylenetriamine and the carboxylating agent of 1:4, reacted at 50 degrees Celsius for 20 h, to obtain an anionic-nonionic surfactant.

Decyl triethyl ammonium hydroxide and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:6 were mixed till homogenous, to obtain the surfactant composition IV-4, the particulars of which were listed in Table IV-1.

Example IV-5

Benzyl chloride, $Na_2CO_3$, diethylenetriamine at a ratio by molar of 1:1:10 were introduced into a reactor, reacted at 60 degrees Celsius for 1-15 h, and then the intermediate 1-benzyl diethylenetriamine was purified by extraction. The intermediate and $Ca(OH)_2$ at a ratio by molar of 1:8 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between diethylenetriamine and the carboxylating agent of 1:4, reacted at 50 degrees Celsius for 20 h, to obtain an anionic-nonionic surfactant.

Phenyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.4 were mixed till homogenous, to obtain the surfactant composition IV-5, the particulars of which were listed in Table IV-1.

Example IV-6

1-bromooctadecane, $Na_2CO_3$, triethylenetetramine at a ratio by molar of 1:1:10 were introduced into a reactor, reacted at 60 degrees Celsius for 1-15 h, and then the intermediate 1-octadecyl triethylenetetramine was purified by extraction. 1-octadecyl triethylenetetramine and $Mg(OH)_2$ at a ratio by molar of 1:5 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between triethylenetetramine and the carboxylating agent of 1:5, reacted at 50 degrees Celsius for 20 h, to obtain an anionic-nonionic surfactant.

Benzyl triethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.8 were mixed till homogenous, to obtain the surfactant composition IV-6, the particulars of which were listed in Table IV-1.

Example IV-7

1-bromo-cis-9-octadecene, $Na_2CO_3$, triethylenetetramine at a ratio by molar of 1:1:10 were introduced into a reactor, reacted at 60 degrees Celsius for 1-15 h, and then the intermediate 1-(cis-9-octadecenyl) triethylenetetramine was purified by extraction. The intermediate and $NH_4OH$ at a ratio by molar of 1:10 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between triethylenetetramine and the carboxylating agent of 1:5, reacted at 50 degrees Celsius for 20 h, to obtain an anionic-nonionic surfactant.

Trimethyl (polyoxyethylene ether (n=1.6)) polyoxypropylene ether (n=3.7) ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:2.5 were mixed till homogenous, to obtain the surfactant composition IV-7, the particulars of which were listed in Table IV-1.

Example IV-8

1-bromo-cis-9-octadecene, $Na_2CO_3$, hydroxyethyl ethylenediamine at a ratio by molar of 1:1:10 were introduced into a reactor, reacted at 60 degrees Celsius for 1-15 h, and then the intermediate 1-(cis-9-octadecenyl)-2-hydroxyethyl ethylenediamine was purified by extraction. The intermediate and NaOH at a ratio by molar of 1:5 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between hydroxyethyl ethylenediamine and the carboxylating agent of 1:3, reacted at 50 degrees Celsius for 20 h, to obtain an anionic-nonionic surfactant.

Hexadecyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:2.1 were mixed till homogenous, to obtain the surfactant composition IV-8, the particulars of which were listed in Table IV-1.

Example IV-9

1-bromotetradecane, $Na_2CO_3$, hydroxyethyl ethylenediamine at a ratio by molar of 1:1:10 were introduced into a reactor, reacted at 60 degrees Celsius for 1-15 h, and then the intermediate 1-tetradecanyl-2-hydroxyethyl ethylenediamine was purified by extraction. The intermediate and KOH at a ratio by molar of 1:5 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between hydroxyethyl ethylenediamine and the carboxylating agent of 1:3, reacted at 50 degrees Celsius for 20 h, to obtain an anionic-nonionic surfactant.

Bisoctadecyl dimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1.9 were mixed till homogenous, to obtain the surfactant composition IV-9, the particulars of which were listed in Table IV-1.

Example IV-10

Methyl stearate, KOH, hydroxyethyl ethylenediamine at a ratio by molar of 1:1:3 were introduced into a reactor, reacted at 140 degrees Celsius for 1-15 h, and then the intermediate 1-(stearoyl)-2-hydroxyethyl ethylenediamine was purified by extraction. The intermediate and KOH at a ratio by molar of 1:5 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added chloroacetic acid at a ratio by molar between hydroxyethyl ethylenediamine and the carboxylating agent of 1:3, reacted at 50 degrees Celsius for 20 h, to obtain an anionic-nonionic surfactant.

Hexadecyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:1 were mixed till homogenous, to obtain the surfactant composition IV-10, the particulars of which were listed in Table IV-1.

Example IV-11

Methyl benzoate, KOH, hydroxyethyl ethylenediamine at a ratio by molar of 1:1:3 were introduced into a reactor, reacted at 140 degrees Celsius for 1-15 h, and then the intermediate 1-(benzoyl)-2-hydroxyethyl ethylenediamine was purified by extraction. The intermediate and KOH at a ratio by molar of 1:5 were added, and then there was added a predetermined amount of propylene oxide, reacted at 200 degrees Celsius for 1 h, then there was added a predetermined amount of ethylene oxide, reacted at 160 degrees Celsius for 3 h, and then cooled to 50 degrees Celsius, there was added a mixture of chloromethyl sulfonic acid and chloroacetic acid (at a ratio by molar of 1:1) at a ratio by molar between hydroxyethyl ethylenediamine and the carboxylating agent of 1:3, reacted at 50 degrees Celsius for 20 h, to obtain an anionic-nonionic surfactant.

Hexadecyl trimethyl ammonium chloride and the thus produced anionic-nonionic surfactant were dissolved into water respectively, stirred for 30 minutes, and formulated into a 0.3 wt % aqueous solution, and then the thus obtained solutions at a ratio by molar between the cationic surfactant and the anionic-nonionic surfactant of 1:2 were mixed till homogenous, to obtain the surfactant composition IV-11, the particulars of which were listed in Table IV-1.

Example IV-12

The surfactant composition produced by Example IV-7 and a 0.15 wt % aqueous solution of polyacrylamide (having a molecular weight of 26000000) were mixed till homogenous, to obtain a flooding fluid composition for tertiary oil recovery.

TABLE IV-1

The particulars of the surfactant composition the structure of the anionic-nonionic surfactant $$\begin{array}{c} R_1 \quad CH_3 \\ | \quad\quad | \\ N\!\!-\!\!(CHCH_2O)_{\overline{m}}\!(CH_2CH_2O)_{\overline{n}}\!-\!R_2 \\ | \\ R' \quad CH_3 \\ | \quad\quad | \\ Y\!\!-\!\!(CHCH_2O)_{\overline{m'}}\!(CH_2CH_2O)_{\overline{n'}}\!-\!R_2'' \\ | \\ \left( (CHCH_2O)_{\overline{m''}}\!(CH_2CH_2O)_{\overline{n''}}\!-\!R_2''' \!-\! \right)_a \\ | \\ CH_3 \end{array}$$

| Example IV- | the structure of the cationic surfactant | (structure parameters) | ratio by molar between cationic surfactant and anionic-nonionic surfactant |
|---|---|---|---|
| 1 | octadecyl dimethyl benzyl ammonium chloride | $R_1 = -C_{12}H_{25}$, $R' = -CH_2CH_2-$, $xm + m' + m'' = 30$, $xn + n' + n'' = 40$, $x = 2$, $Y = N$, $a = 1$, $R_2 = R_2' = R_2''' = -CH_2COOK$ | 1:0.2 |
| 2 | tetraoctyl ammonium chloride | $R_1 = -C_6H_{11}$, $R' = -CH_2CH_2-$, $xm + m' + m'' = 10$, $xn + n' + n'' = 5$, $x = 3$, $Y = N$, $n = 1$, $R_2 = R_2' = R_2''' = -CH_2COOK$ | 1:0.5 |
| 3 | trioctyl (polyoxyethylene ether (n = 2.2)) polyoxypropylene ether (n = 1.8) ammonium chloride | $R_1 = CH_3C_6H_5CO-$, $R' = -CH_2CH_2-$, $xm + m' + m'' = 22$, $xn + n' + n'' = 40$, $x = 4$, $Y = N$, $a = 1$, $R_2 = R_2' = R_2''' = -CH_2COONa$ | 1:9 |
| 4 | decyl triethyl ammonium hydroxide | $R_1 = C_{11}H_{21}CO-$, $R' = -CH_2CH_2-$, $xm + m' + m'' = 8$, $xn + n' + n'' = 15$, $x = 2$, $Y = N$, $a = 1$, one out of $R_2$, $R_2'$ and $R_2'''$ being $-CH_2COONa$, the other two being $-CH_2SO_3Na$ | 1:6 |
| 5 | phenyl trimethyl ammonium chloride | $R_1 = C_6H_5CO-$, $R' = -CH_2CH_2-$, $xm + m' + m'' = 2$, $xn + n' + n'' = 5$, $x = 2$, $Y = N$, $a = 1$, $R_2 = R_2' = R_2''' = -CH_2COO(Ca)_{0.5}$ | 1:1.4 |
| 6 | benzyl triethyl ammonium chloride | $R_1 = C_{17}H_{37}-$, $R' = -CH_2CH_2-$, $xm + m' + m'' = 2$, $xn + n' + n'' = 5$, $x = 3$, $Y = N$, $a = 1$, $R_2 = R_2' = R_2''' = -CH_2COO(Mg)_{0.5}$ | 1:1.8 |
| 7 | trimethyl (polyoxyethylene ether (n = 1.6)) polyoxypropylene ether (n = 3.7) ammonium chloride | $R_1 = (z)\text{-}9\text{-}C_{17}H_{35}-$, $R_2 = CH_2CH_2$, $xm + m' + m'' = 12$, $xn + n'\, n'' = 6$, $x = 3$, $Y = N$, $a = 1$, $R_2 = R_2' = R_2''' = -CH_2COONH_4$ | 1:2.5 |
| 8 | octadecyl dimethyl benzyl ammonium chloride | $R_1 = -C_{12}H_{25}$, $R' = -CH_2CH_2-$, $xm + m' + m'' = 30$, $xn + n' + n'' = 40$, $x = 2$, $Y = O$, $a = 0$, $R_2 = R_2' = -CH_2COOK$ | 1:2.1 |
| 9 | tetraoctyl ammonium chloride | $R_1 = -C_6H_{11}$, $R' = -CH_2CH_2-$, $xm + m' + m'' = 10$, $xn + n' + n'' = 5$, $x = 3$, $Y = O$, $a = 0$, $R2 = R2' = -CH_2COOK$ | 1:1.9 |
| 10 | tetraoctyl ammonium chloride | $R_1 = CH_3C_6H_5CO-$, $R' = -CH_2CH_2-$, $xm + m' + m'' = 22$, $xn + n' + n'' = 40$, $x = 4$, $Y = O$, $a = 0$, $R_2 = R_2' = -CH_2COONa$ | 1:1 |
| 11 | decyl triethyl ammonium hydroxide | $R_1 = C_{11}H_{21}CO-$, $R' = -CH_2CH_2-$, $xm + m' + m'' = 8$, $xn + n' + n'' = 15$, $x = 2$, $Y = O$, $a = 0$, one out of $R_2$ and $R_2'$ being $-CH_2COONa$, while the other representing $-CH_2SO_3Na$ | 1:2 |

Example IV-13 Interfacial Performance Test of the Surfactant Composition

TX-500C type spinning drop interfacial tensiometer was used to identify the oil-water interfacial tension between each surfactant composition and the IV5-11 reservoir crude oil from the Henan Shuanghe Oilfield, at a surfactant composition concentration of 0.3 wt %, with a test temperature of 81 degrees Celsius, a formation water of $NaHCO_3$ type, a TDS of 7947 mg/L, a chloride ion content of 2002 mg/L, a $Ca^{2+}$ content of 20 mg/L, a $Mg^{2+}$ content of 12.2 mg/L.

TABLE IV-2

The oil-water interfacial tension between the surfactant composition and the IV5-11 reservoir crude oil from the Henan Shuanghe Oilfield

| Example IV- | interfacial tension (mN/m) |
|---|---|
| 1 | 0.0053 |
| 2 | 0.0062 |
| 3 | 0.0085 |
| 4 | 0.0032 |
| 5 | 0.0028 |
| 6 | 0.0014 |
| 7 | 0.0005 |
| 8 | 0.0003 |

TABLE IV-2-continued

The oil-water interfacial tension between the surfactant composition and the IV5-11 reservoir crude oil from the Henan Shuanghe Oilfield

| Example IV- | interfacial tension (mN/m) |
|---|---|
| 9 | 0.0006 |
| 10 | 0.0065 |
| 11 | 0.0009 |

As can be seen from Table 2, the surfactant composition produced by each of Example IV-1 to 11 exhibits desirable interfacial performance with the crude oil from the Henan Oilfield. Example IV-12 reveals that, the thus produced surfactant composition still exhibits desirable interfacial performance, even after compounded with a polymer.

The surfactant composition produced by Example IV-8 was formulated into different concentrations, each was tested the oil-water interfacial tension with the IV5-11 reservoir crude oil from the Henan Shuanghe Oilfield. The results were listed in Table IV-3.

TABLE IV-3

The oil-water interfacial tension between the surfactant composition 8 (at different concentrations) and the IV5-11 reservoir crude oil from the Henan Shuanghe Oilfield

| | surfactant composition concentration (wt %) | | | | | |
|---|---|---|---|---|---|---|
| | 0.01 | 0.02 | 0.05 | 0.1 | 0.2 | 0.3 |
| interfacial tension (mN/m) | 0.005 | 0.002 | 0.0009 | 0.0005 | 0.0004 | 0.0003 |

These results reveals that, the surfactant composition of this invention exhibits a relatively higher oil-water interfacial activity for the crude oil from the Henan Oilfield.

TX-500C type spinning drop interfacial tensiometer was used to identify the oil-water interfacial tension between the surfactant composition produced by Example IV-7 and a crude oil from the third oil plant of the Zhongyuan Oilfield, with a test temperature of 80 degrees Celsius, a formation water with a TDS of 79439 mg/L, a $Ca^{2+}$ content of 592 mg/L, a $Mg^{2+}$ content of 2871 mg/L, a surfactant composition concentration of 0.3 wt %. The oil-water interfacial tension was observed as low as 0.002 mN/m. This reveals that the surfactant composition of this invention shows versatile applicability, not only to a reservoir with a low TDS, but also to a reservoir at elevated temperatures and high salinity, with desirable interfacial performances.

Example IV-13 Oil Washing Capability Test of the Surfactant Composition

The IV5-11 reservoir oil sand from the Henan Shuanghe Oilfield at an oil:sand ratio of 1:4 (by weight) was aged at 81 degrees Celsius for 7 days, stirred for 5 minutes every 2 hours. Then 5 g of the thus aged oil sand and a 0.3 wt % solution of the surfactant composition at an oil sand:solution ratio of 1:10 (by weight) were mixed till homogenous, aged at the reservoir temperature for 48 h, then crude oil in the solution was extracted with petroleum ether, adjusted with a 50 ml colorimetric tube to a metered volume, colorimetric analysized with a spectrophotometer at a wavelength of 430 nm. The concentration of crude oil in the surfactant solution was calculated by referring to the standard curve.

TABLE IV-4

The oil washing performance of the surfactant composition

| Example IV- | oil washing rate % |
|---|---|
| 1 | 57.8 |
| 2 | 62.4 |
| 3 | 82.3 |
| 4 | 81.4 |
| 5 | 65.9 |
| 6 | 71.2 |
| 7 | 78.3 |
| 8 | 76.4 |
| 9 | 75.1 |
| 10 | 72.3 |
| 11 | 77.1 |

Example IV-14 Study on the Oil Displacement Performance of the Surfactant Composition The oil displacement test was performed on a cylindrical natural core of sandstone having a length of 30 cm, a diameter of 2.5 cm and a permeability of 1.5 $\mu m^2$. The core was firstly injected with the IV5-11 reservoir formation water from the Henan Shuanghe Oilfield till no crude oil was found in the effluent, then with a 0.3 PV (pore volume of the core) of the surfactant composition, then with water till no crude oil was found in the effluent. The results were listed in Table III-5.

TABLE IV-5

Oil displacement test results of the surfactant composition

| Example IV- | increased oil recovery % OOIP |
|---|---|
| 1 | 8.2 |
| 2 | 8.3 |
| 3 | 9.3 |
| 4 | 10.1 |
| 5 | 9.7 |
| 6 | 9.9 |
| 7 | 10.3 |
| 8 | 10.4 |
| 9 | 10.3 |
| 10 | 9.5 |
| 11 | 9.6 |

Example IV-15

Cyclohexylamine and NaOH at a ratio by molar of 1:3 were introduced into a reactor, stirred for 30 minutes, at a ratio by molar of cyclohexylamine:ethylene oxide:propylene oxide=1:10:34, firstly there was added propylene oxide, reacted at 160 degrees Celsius for 3 h, then there was added ethylene oxide, reacted at 160 degrees Celsius for 7 h; finally there was added sodium chloroacetate at a ratio by molar between cyclohexylamine and the carboxylating agent of 1:1.5, further reacted at 80 degrees Celsius for 8 h, upon completion of the reaction, the reaction mixture was adjusted with a 5 wt % aqueous HCl solution to a pH value of 2, allowed to stand for layer separation, separated off the aqueous phase, while the oil phase was adjusted with a 10 wt % aqueous NaOH solution to a pH value of 9, water was removed by vacuum evaporation, whereby obtaining the following anionic-nonionic surfactant, wherein $m_1+m_2=34$, $n_1+n_2=10$:

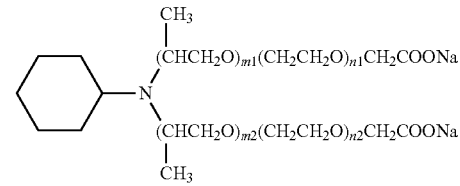

Comparative Example IV-1

According to Gong Yujun et. al, Journal of Northwest University (Natural Science Edition), Vol. 30 (1), pp. 28 to 31, February 2000, hexadecyl trimethyl ammonium bromide (CTAB) and sodium dodecyl sulfate (SDS) were combined at a ratio by molar of 1:1.5, and tested at a concentration of 0.3 wt % for its oil-water interfacial tension, oil washing rate and oil displacement performance with the IV5-11 reservoir crude oil from the Henan Shuanghe Oilfield. The results were listed as follows.

TABLE IV-6

The performance of the reference flooding fluid

| interfacial tension (mN/m) | oil washing rate % | increased oil recovery % OOIP |
|---|---|---|
| 0.03 | 45.6 | 2.8 |

Comparative Example IV-2

According to Huang Hongdu et. al, Journal of Oil and Gas Technology, Vol. 29(4), August 2007 (pp. 101 to 104), 0.01 wt % hexadecyl trimethyl ammonium bromide, 0.02 wt % anionic petroleum sulfonate salt and 1.8 wt % $Na_2CO_3$ were combined, and tested at a concentration of 0.3 wt % for its oil-water interfacial tension, oil washing rate and oil displacement performance with the IV5-11 reservoir crude oil from the Henan Shuanghe Oilfield. The results were listed as follows.

TABLE IV-7

The performance of the reference flooding fluid

| interfacial tension (mN/m) | oil washing rate % | increased oil recovery % OOIP |
|---|---|---|
| 0.008 | 56.3 | 4.2 |

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A surfactant composition, comprising a cationic surfactant and an anionic-nonionic surfactant,
wherein a molar ratio of the cationic surfactant and the anionic-nonionic surfactant is 1:0.01 to 1:100,
wherein the cationic surfactant is one or more compound of formula (II),

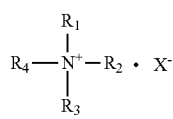

(II)

wherein, in formula (II),
$N^+$ represents a quaternary nitrogen cation;
$R_1$, $R_2$, $R_3$, and $R_4$ are identical or different, each independently selected from the group consisting of an optionally substituted $C_{1-50}$ linear or branched alkyl, an optionally substituted $C_{5-50}$ monocyclic or polycyclic cycloalkyl, an optionally substituted $C_{2-50}$ linear or branched alkenyl, an optionally substituted $C_{6-20}$ aryl, and a compound of formula $L_2$-(O—Ru'-)$_{y'}L_1$-, with the proviso that at least one of $R_1$, $R_2$, $R_3$, and $R_4$ is an optionally substituted $C_{8-50}$ linear or branched alkyl or an optionally substituted $C_{8-50}$ linear or branched alkenyl;
$L_1$ is a single bond or a $C_{1-5}$ linear or branched alkylene oxy;
y' is a value of from 0 to 200, excluding 0;
Ru' is identical with or different from one another, each independently being a $C_{2-6}$ linear or branched alkylene;
$L_2$ is hydrogen, an optionally substituted $C_{1-10}$ linear or branched alkyl, an optionally substituted $C_{2-10}$ linear or branched alkenyl, or an optionally substituted $C_{6-10}$ aryl;
$X^-$ is a halogen ion or hydroxide ion ($OH^-$),
wherein the anionic-nonionic surfactant is a compound of formula (I-2),

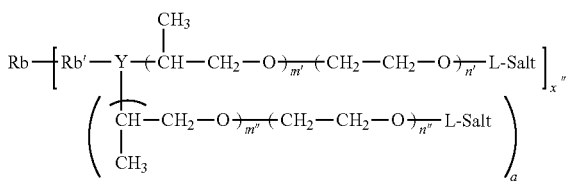

(I-2)

wherein $R_b$ is a $C_{1-50}$ linear or branched alkyl, a $C_{5-50}$ monocyclic or polycyclic cycloalkyl, or a $C_{2-50}$ linear or branched alkenyl;
$R_b$' is identical to or different from one another, each independently selected from the group consisting of a single bond and carbonyl; and
x" is an integer from 1 to 10,
m' is identical with or different from one another, each independently being a value of from 0 to 100;
n' is identical with or different from one another, each independently being a value of from 0 to 100;
m" is identical with or different from one another, each independently being a value of from 0 to 100;
n" is identical with or different from one another, each independently being a value of from 0 to 100, with the proviso that a sum of all numerical values m' and all numerical values m" is greater than 0 but not greater than 100, and a sum of all numerical values n' and all numerical values n" is greater than 0 but not greater than 100;
L is identical with or different from one another, each independently being an $C_{1-5}$ linear or branched alkylene;
Salt is identical with or different from one another, each having a formula -$A^-(M)_r^+$, wherein $A^-$ is a carboxylate ion ($COO^-$) or a sulfonate ion ($SO_3^-$), with the proviso that $A^-$ in at least one of the Salt groups is the carboxylate ion ($COO^-$);
M is alkali metal, alkaline earth metal, or ammonium ($NH_4$), when M is alkali metal or ammonium, r=1; when M is alkaline earth metal, r=0.5.

2. A surfactant composition, produced by mixing the cationic surfactant recited in claim 1 and the anionic-nonionic surfactant recited in claim 1 at a molar ratio of 1:0.01 to 1:100.

3. A flooding fluid composition for tertiary oil recovery, comprising the surfactant composition according to claim 1, and water, wherein the surfactant composition accounts for 0.001-10 wt %, relative to a total weight of the flooding fluid composition for tertiary oil recovery.

4. The flooding fluid composition for tertiary oil recovery according to claim 3, comprising no inorganic alkali.

5. A process for producing a flooding fluid composition for tertiary oil recovery, comprises mixing the surfactant composition according to claim 1 with at least water, wherein the surfactant composition accounts for 0.001-10 wt %, relative to a total weight of the flooding fluid composition for tertiary oil recovery.

6. The surfactant composition according to claim 1, wherein M represents an alkali metal or alkaline-earth metal.

* * * * *

UNITED STATES PATENT AND TRADEMARK OFFICE
CERTIFICATE OF CORRECTION

PATENT NO. : 10,723,936 B2  
APPLICATION NO. : 14/899541  
DATED : July 28, 2020  
INVENTOR(S) : Yingcheng Li et al.

Page 1 of 1

It is certified that error appears in the above-identified patent and that said Letters Patent is hereby corrected as shown below:

On the Title Page

Item (72) Line 4, the fourth inventor's name reading:  
-Xining Bao-

Should be changed to:  
-Xinning Bao-.

Signed and Sealed this  
First Day of December, 2020

Andrei Iancu  
*Director of the United States Patent and Trademark Office*